United States Patent
Hamada et al.

(10) Patent No.: US 7,428,883 B2
(45) Date of Patent: Sep. 30, 2008

(54) HEAT EXCHANGER AND WATER HEATER

(75) Inventors: Tetsurou Hamada, Hyogo (JP); Hitoshi Hara, Hyogo (JP); Hideaki Yoshitomi, Hyogo (JP); Kozo Uehara, Hyogo (JP); Hiroaki Takashima, Hyogo (JP); Mitufuku Asakawa, Hyogo (JP)

(73) Assignee: Noritz Corporation, Hyogo (JP)

( * ) Notice: Subject to any disclaimer, the term of this patent is extended or adjusted under 35 U.S.C. 154(b) by 121 days.

(21) Appl. No.: 11/596,062

(22) PCT Filed: May 10, 2005

(86) PCT No.: PCT/JP2005/008541

§ 371 (c)(1),
(2), (4) Date: Nov. 9, 2006

(87) PCT Pub. No.: WO2005/108875

PCT Pub. Date: Nov. 17, 2005

(65) Prior Publication Data

US 2007/0221143 A1   Sep. 27, 2007

(30) Foreign Application Priority Data

May 11, 2004 (JP) ............................ 2004-141335
May 11, 2004 (JP) ............................ 2004-141337

(51) Int. Cl.
*F22B 1/02* (2006.01)
(52) U.S. Cl. ........................ 122/31.1; 122/33
(58) Field of Classification Search ............... 122/18.1, 122/28, 31.1, 33, 235.11, 235.17, 250 R, 122/251, 271

See application file for complete search history.

(56) References Cited

U.S. PATENT DOCUMENTS 4,403,572 A * 9/1983 Gerstmann et al. ......... 122/20 B
4,502,626 A * 3/1985 Gerstmann et al. ......... 122/44.2

(Continued)

FOREIGN PATENT DOCUMENTS

JP        37-8883  B1   7/1962

(Continued)

OTHER PUBLICATIONS

International Search Report (Jun. 28, 2005).

(Continued)

*Primary Examiner*—Gregory A Wilson
(74) *Attorney, Agent, or Firm*—Rader, Fishman & Grauer, PLLC

(57) ABSTRACT

A heat exchanger A1 includes a coiled tube 60 including a plurality of loops 60a, and a space 35 surrounded by the coiled tube 60 and having an end closed by a partition 19. The heat exchanger is so designed that combustion gas flows from the space 35 to a combustion gas path 36 by passing through clearances 61 of the loops 60a of the coiled tube 60. The loops 60a are made of a tube having a thickness t1 and a width L1 which is larger than the thickness, so that the amount of heat recovery when the combustion gas passes through the clearances 61 is large. Therefore, the heat exchange efficiency is enhanced while simplifying the overall structure of the heat exchanger A1 and reducing the size of the heat exchanger.

30 Claims, 73 Drawing Sheets

U.S. PATENT DOCUMENTS

| | | | | |
|---|---|---|---|---|
| RE33,082 | E | * 10/1989 | Gerstmann et al. | 122/20 B |
| 7,281,497 | B2 | * 10/2007 | Le Mer et al. | 122/31.2 |
| 7,302,916 | B2 | * 12/2007 | LeMer et al. | 122/18.1 |

FOREIGN PATENT DOCUMENTS

| | | |
|---|---|---|
| JP | 48-3648 U | 1/1973 |
| JP | 51-21156 U | 2/1976 |
| JP | 53-43253 U | 4/1978 |
| JP | 55-48241 U | 3/1980 |
| JP | 55-127944 U | 9/1980 |
| JP | 57-85687 A | 5/1982 |
| JP | 57-161484 A | 10/1982 |
| JP | 57-200853 U | 12/1982 |
| JP | 58-12944 A | 1/1983 |
| JP | 59-1943 A | 1/1984 |
| JP | 59-066646 A | 4/1984 |
| JP | 59-67748 U | 5/1984 |
| JP | 59-170642 A | 9/1984 |
| JP | 59-172945 U | 11/1984 |
| JP | 61-69676 U | 5/1986 |
| JP | 61-74779 U | 5/1986 |
| JP | 62-288446 A | 12/1987 |
| JP | 63-220091 A | 9/1988 |
| JP | 03-7741 B2 | 2/1991 |
| JP | 06-42812 A | 2/1994 |
| JP | 06-331220 A | 11/1994 |
| JP | 07-77397 A | 3/1995 |
| JP | 09-033103 A | 2/1997 |
| JP | 10-48168 A | 2/1998 |
| JP | 11-23067 A | 1/1999 |
| JP | 2000-055466 A | 2/2000 |
| JP | 2000-074418 A | 3/2000 |
| JP | 2001-065801 A | 3/2001 |
| JP | 2001-141308 A | 5/2001 |
| JP | 2002-323291 A | 11/2002 |
| JP | 2004-610 A | 1/2004 |
| JP | 2004-44914 A | 2/2004 |

OTHER PUBLICATIONS

English Translation of Form PCT/IPEA/409 for PCT/JP2005/008541, File Ref. #2005-001WO, Int'l Filing Date May 10, 2005 (4 pages).

* cited by examiner

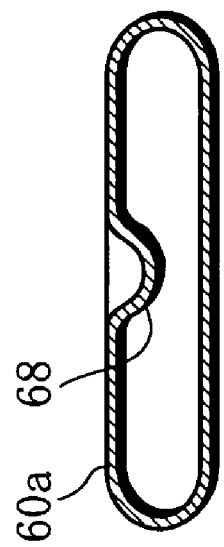
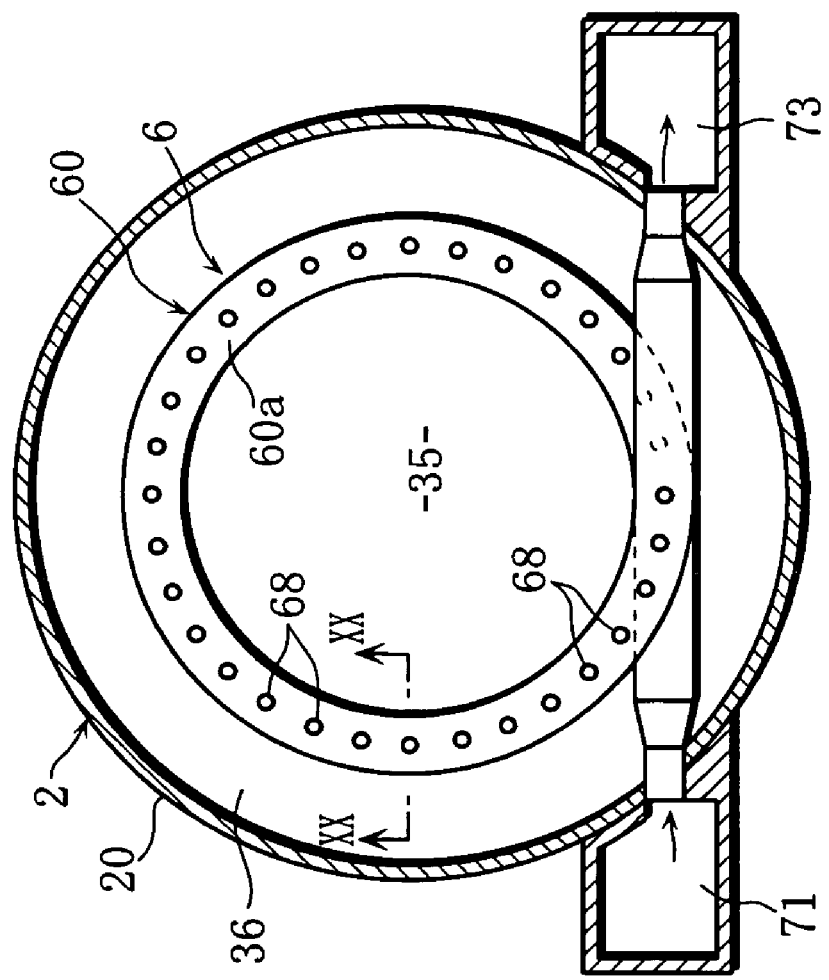

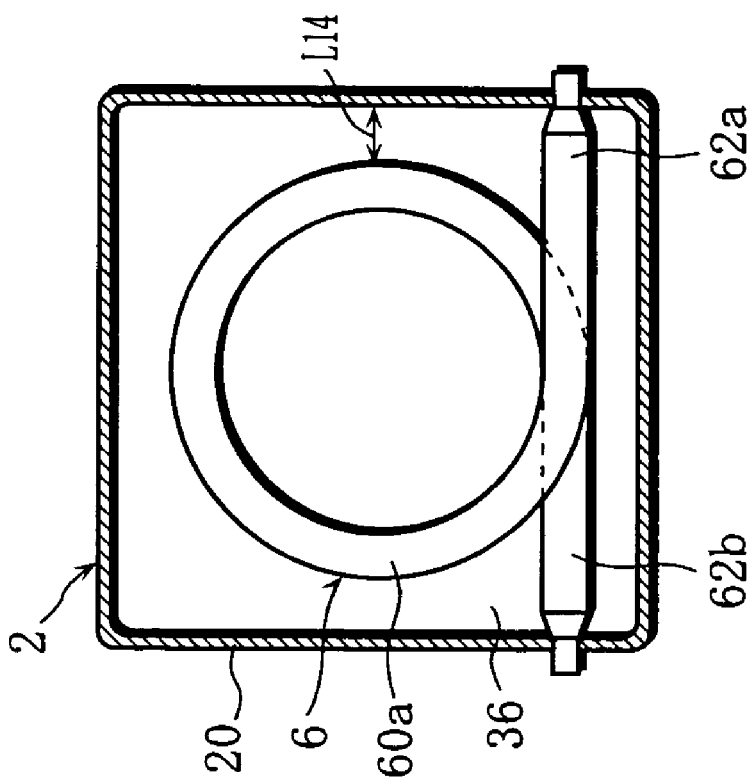
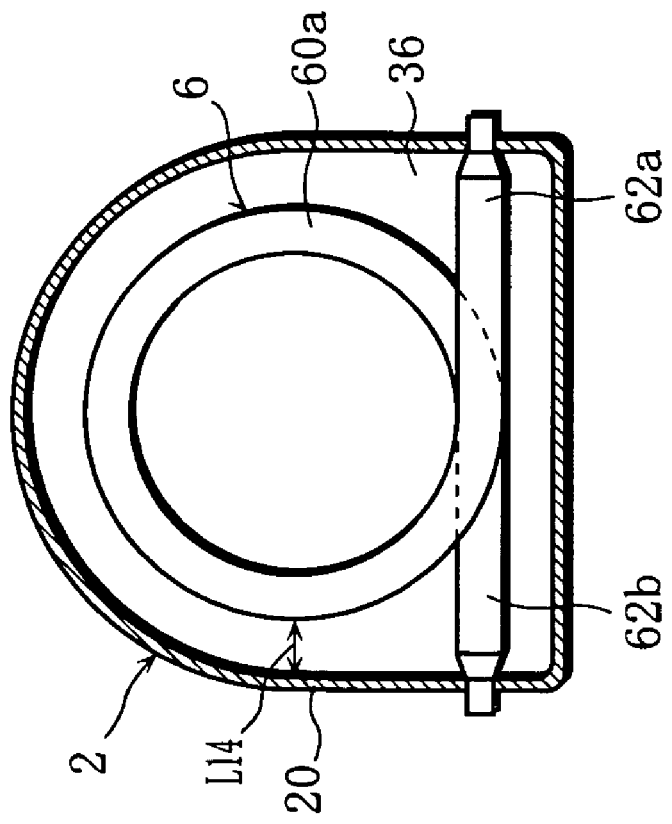

US 7,428,883 B2

HEAT EXCHANGER AND WATER HEATER

TECHNICAL FIELD

The present invention relates to a heat exchanger for recovering heat from combustion gas and to a water heater incorporating a heat exchanger.

BACKGROUND ART

An example of heat exchanger is disclosed in Patent Document 1. As shown in FIG. 93, the heat exchanger disclosed in this document includes a heat exchange coiled tube 40e placed in a housing 2e. The bottom of the space 3e surrounded by the coiled tube 40e is closed by a partition 6e. In the heat exchanger, when combustion gas is introduced from the top of the housing 2e, the combustion gas flows out from the space 3e by passing through the clearances of the coiled tube 40e and is discharged to the outside through the bottom opening of the housing 2e. On the other hand, a medium is supplied to the coiled tube 40e through one end thereof, and the medium is heated by the combustion gas. The heated medium flows out of the coiled tube 40e through the other end thereof.

With this structure, since the coiled tube 40e comprises a single helical tube, the structure is simple as compared with a heat exchanger utilizing a large number of finned tubes. Therefore, this structure is suitable for reducing the manufacturing cost and the size of the entire heat exchanger.

However, the above-described conventional structure has the following problems.

Since the heat exchange coiled tube 40e comprises a single helical tube, the degree of contact between the combustion gas introduced into the space 3e and the coiled tube 40e is small. Particularly, the degree of contact when the combustion gas passes through the clearances of the coiled tube 40e is small, so that the amount of heat transfer is small. Therefore, the heat exchange efficiency is low in the conventional structure. In recent years, for the purpose of environmental protection by fuel saving, reduction of the running cost and so on, the enhancement of the heat exchange efficiency of a heat exchanger is strongly needed. As effective means to enhance the heat exchange efficiency, it may be considered to recover latent heat from combustion gas (more precisely, latent heat of water vapor in combustion gas) in addition to sensible heat. However, with the conventional structure, it is difficult to recover such latent heat.

Patent Document 1: JP-U 61-69676

DISCLOSURE OF THE INVENTION

Problems to be Solved by the Invention

An object of the present invention is to solve or lessen the above-described problems of the conventional structure.

Means for solving the Problems

According to a first aspect of the present invention, there is provided a heat exchanger comprising a housing including a cylindrical circumferential wall and axially opposite ends formed with a burner opening and a combustion gas outlet, respectively, a heat-exchange coiled tube including a plurality of loops arranged in the housing along the axial direction via a plurality of clearances, a space surrounded by the coiled tube and having one end communicating with the burner opening, a partition for preventing combustion gas supplied into the space from directly flowing through another end of the space and for causing the combustion gas to flow to the clearances; and a combustion gas path formed around the coiled tube and surrounded by the circumferential wall of the housing for guiding the combustion gas flowed thereto from the space by passing through the clearances to the combustion gas outlet. The loops comprise a tube having a thickness in the axial direction and a width in a direction perpendicular to the axial direction, and the width is larger than the thickness. One of the axially opposite ends of the housing is provided with a drain receiving portion for receiving drain when the drain is generated at the coiled tube, and the drain receiving portion is in the form of a ring having a center portion formed with an opening corresponding to either one of the combustion gas outlet and the burner opening and positioned below the coiled tube and the combustion gas path.

Preferably, the loops comprise a flat tube.

Preferably, the width of the loops is non-uniform so that width at a location close to the burner opening and width at a location away from the burner opening differ from each other.

Preferably, the coiled tube is formed with a plurality of projections projecting inward so that water flowing through the coiled tube forms turbulence.

Preferably, the heat exchanger according to the present invention further comprises an additional coiled tube including a plurality of loops held in contact with the loops of the coiled tube, and water inflow and hot-water outflow with respect to the plurality of coiled tubes are performed individually for enabling hot-water supply to a plurality of destinations.

Preferably, the plurality of coiled tubes overlap each other in either one of the axial direction and a direction perpendicular to the axial direction.

Preferably, the coiled tube has a double tube structure including an inner tube and an outer tube, and water flow in the inner tube and water flow in a space between the inner tube and the outer tube are capable of being performed individually.

Preferably, the heat exchanger according the present invention further comprises a plurality of tube modules each including an opposite pair of first and second ends for connection and an intermediate portion in a form of a loop, and water flow means connected to the opposite ends of the plurality of tube modules for enabling water flow in the tube modules, with the tube modules arranged along the axial direction in the housing. The coiled tube is made up of the tube modules.

Preferably, the water flow means comprises a water inflow chamber arranged in the housing and including a water inflow port, a hot-water outflow chamber arranged in the housing and including a hot-water outflow port, and a common chamber which is arranged in the housing and to which respective first ends of the tube modules are connected so that the tube modules communicate with each other. The tube modules include a first tube module of which second end is connected to the water inflow chamber, and a second tube module of which second end is connected to the hot-water outflow chamber. The water supplied into the water inflow chamber flows through the first tube module into the common chamber and then flows through the second tube module into the hot-water outflow chamber.

Preferably, the coiled tube is made of stainless steel.

According to a second aspect of the present invention, there is provided a water heater comprising a burner and a heat exchanger for recovering heat from combustion gas generated by the burner. The heat exchanger comprises a housing including a cylindrical circumferential wall and axially opposite ends formed with a burner opening and a combustion gas outlet, respectively, a heat-exchange coiled tube including a plurality of loops arranged in the housing along the axial direction via a plurality of clearances, a space surrounded by the coiled tube and having one end communicating with the burner opening, a partition for preventing combustion gas supplied from the burner into the space from directly flowing through another end of the space and for causing the combustion gas to flow to the clearances, and a combustion gas path formed around the coiled tube and surrounding by the circumferential wall of the housing for guiding the combustion gas flowed thereto from the space by passing through the clearances to the combustion gas outlet. The loops comprise a tube having a thickness in the axial direction and a width in a direction perpendicular to the axial direction, and the width is larger than the thickness. One of the axially opposite ends of the housing is provided with a drain receiving portion for receiving drain when the drain is generated at the coiled tube, and the drain receiving portion is in the form of a ring having a center portion formed with an opening corresponding to either one of the combustion gas outlet and the burner opening and positioned below the coiled tube and the combustion gas path.

According to a third aspect of the present invention, there is provided a heat exchanger comprising a housing including a cylindrical circumferential wall and axially opposite ends formed with a burner opening and a combustion gas outlet, respectively, a heat-exchange coiled tube including a plurality of loops arranged in the housing along the axial direction, a space surrounded by the coiled tube and having one end communicating with the burner opening, a partition for preventing combustion gas supplied into the space from directly flowing through another end of the space, a combustion gas path formed around the coiled tube and surrounded by the circumferential wall of the housing for guiding the combustion gas flowed thereto to the combustion gas outlet, at least one additional coiled tube which differs from said coiled tube in either one of diameter of the loops and width of the loops, the plurality of coiled tubes being arranged in a lap winding manner to form a tube lap winding structure in which the plurality of loops are arranged along the axial direction and along a direction perpendicular to the axial direction, a plurality of clearances formed between the loops for passing combustion gas so that the combustion gas flows from the space to the combustion gas path by passing through the tube lap winding structure, and a drain receiving portion provided at one of the axially opposite ends of the housing for receiving drain when the drain is generated at the tube lap winding structure. The drain receiving portion is in the form of a ring having a center portion formed with an opening corresponding to either one of the combustion gas outlet and the burner opening and positioned below tube lap winding structure and the combustion gas path.

Preferably, each of the coiled tubes comprises a helical tube in which the plurality of loops are helically connected to each other.

Preferably, unheated water which has not passed through inner one of the coiled tubes is supplied to outer one of the coiled tubes.

Preferably, the heat exchanger according to the present invention further comprises a spacer for defining the clearances. The spacer includes a base portion having a length in the axial direction, and a plurality of projections projecting from the base portion like teeth of a comb and interposed between the loops.

Preferably, each of the loops has an outer surface formed with a projection, and adjacent loops in the axial direction are held in contact with each other via the projection to define each of the clearances.

Preferably, each of the loops has an outer surface formed with a recess, and each of the clearances comprises a portion between recesses of adjacent loops in the axial direction.

Preferably, each of the loops has an outer surface formed with at least one helical groove, and part of the helical groove defines the clearance.

Preferably, dimension of the clearances is non-uniform so that dimension at a location close to the burner opening and dimension at a location away from the burner opening differ from each other.

Preferably, the plurality of coiled tubes are equal to each other in tube diameter of the loops, and the loops arranged along the direction perpendicular to the axial direction do not form a stepped portion in the axial direction.

Preferably, the loops arranged along the direction perpendicular to the axial direction form a stepped portion in the axial direction.

Preferably, the plurality of coiled tubes are unequal to each other in tube diameter, and the innermost coiled tube has largest tube diameter.

Preferably, the heat exchanger according to the present invention further comprises a water inflow header including a connection port for a water inflow tube and connected to one end of each of the plurality of coiled tubes so that water supplied to the connection port is distributed to the plurality of coiled tubes, and a hot-water outflow header including a connection port for a hot-water outflow tube and connected to another end of each of the plurality of coiled tubes so that hot water coming through the plurality of coiled tubes merge at the connection port.

Preferably, the hot-water outflow header is connected to one of the ends of each of the coiled tubes which is closer to the burner opening, whereas the water inflow header is connected to another one of the ends, and water flow in the coiled tubes is performed from a portion away from the burner opening toward a portion close to the burner opening.

Preferably, in the heat exchanger according to the present invention, a plurality of bent tubes are provided each including a first end and a second end and penetrating through the circumferential wall of the housing so that the first end is fitted and connected to an end of each of the coiled tubes and the second end is positioned outside the housing. At least one of the water inflow header and the hot-water outflow header is connected to the second ends of the plurality of bent tubes and arranged outside the housing.

Preferably, arrangement pitch of the portions penetrating through the circumferential wall and second ends of the bent tubes is larger than arrangement pitch of the ends of the coiled tubes and the first ends of the plurality of bent tubes.

Preferably, the heat exchanger according to the present invention further comprises a plate member formed with a plurality of holes for inserting the bent tubes and including an opposite pair of edges bent to form projections. The circumferential wall of the housing is provided by forming the plate member into a cylindrical shape and bonding the projections at opposite edges together.

Preferably, the heat exchanger according to the present invention further comprises a first plate member formed with a plurality of holes for inserting the bent tubes, and a second plate member separate from the first plate member. The circumferential wall of the housing is provided by bonding an opposite pair of edges of the second plate member to the first plate member so that the first and the second plate members form a continuous cylindrical shape.

Preferably, the plurality of coiled tubes provide a plurality of water paths for individually performing water inflow and hot-water outflow to supply hot water produced by passing through the water paths to a plurality of destinations. The coiled tubes providing the plurality of water paths are held in contact with each other.

Preferably, at least one of the coiled tubes has a double tube structure including an inner tube and an outer tube, and water flow into the inner tube and water flow into a space between the inner tube and the outer tube are capable of being performed individually.

Preferably, each of the coiled tubes comprises a plurality of generally C-shaped tube portions arranged along the axial direction, and at least one header for performing water flow with respect to the tube portions is connected to opposite ends of the tube portions.

According to a fourth aspect of the present invention, there is provided a water heater comprising a burner and a heat exchanger for recovering heat from combustion gas generated by the burner. The heat exchanger comprises a housing including a cylindrical circumferential wall and axially opposite ends formed with a burner opening and a combustion gas outlet, respectively, a heat-exchange coiled tube including a plurality of loops arranged in the housing along the axial direction, a space surrounded by the coiled tube and having one end communicating with the burner opening, a partition for preventing combustion gas supplied from the burner into the space from directly flowing through another end of the space, and a combustion gas path formed around the coiled tube and surrounded by the circumferential wall of the housing for guiding the combustion gas flowed thereto to the combustion gas outlet. The water heater further comprises at least one additional coiled tube which differs from said coiled tube in either one of diameter of the loops and width of the loops, and the plurality of coiled tubes are arranged in a lap winding manner to form a tube lap winding structure in which the plurality of loops are arranged along the axial direction and along a direction perpendicular to the axial direction. The water heater further comprises a plurality of clearances formed between the loops for passing combustion gas so that the combustion gas flows from the space to the combustion gas path by passing through the tube lap winding structure, and a drain receiving portion provided at one of the axially opposite ends of the housing for receiving drain when the drain is generated at the tube lap winding structure. The drain receiving portion is in the form of a ring having a center portion formed with an opening corresponding to either one of the combustion gas outlet and the burner opening and positioned below the tube lap winding structure and the combustion gas path.

Preferably, the heat exchanger is so oriented that the burner opening is positioned higher than the combustion gas outlet, and the burner is connected to an upper portion of the heat exchanger and burns fuel downward.

Preferably, each of the loops is circular, and the circumferential wall of the housing is generally cylindrical to surround the loops.

Preferably, the heat exchanger is so oriented that the burner opening is positioned lower than the combustion gas outlet, and the burner is connected to a lower portion of the heat exchanger and burns fuel upward.

Preferably, each of the loops is rectangular, and the circumferential wall of the housing is in the form of a rectangular cylinder to surround the loops.

Other features and advantages of the present invention will become more apparent from description of embodiments of the present invention given below with reference to the accompanying drawings.

BRIEF DESCRIPTION OF THE DRAWINGS

FIG. 3A is a plan view showing an example of tube module constituting a heat-exchange water tube, whereas

FIG. 17A is a sectional view showing a principal portion of another example of heat-exchange water tube, whereas

FIG. 20A is a horizontal sectional view of a principal portion of an example of heat-exchange water tube formed with projections for forming turbulence, whereas FIG. 20B is a sectional view taken along lines XX-XX in FIG. 20A.

FIG. 21A is a horizontal sectional view of a principal portion of another example of heat-exchange water tube formed with projections for forming turbulence, whereas

FIG. 22A is a horizontal sectional view of a principal portion of another example of heat-exchange water tube formed with projections for forming turbulence, whereas

FIG. 23A is a horizontal sectional view of a principal portion of another example of heat-exchange water tube formed with projections for forming turbulence, whereas

FIG. 24A is a horizontal sectional view of a principal portion of another example of heat-exchange water tube formed with projections for forming turbulence, whereas

FIG. 25A is a sectional view showing a principal portion of an example of structure in which a plurality of heat-exchange water tubes are held in contact with each other, whereas

FIG. 26A is a sectional view showing a principal portion of another example of structure in which a plurality of heat-exchange water tubes are held in contact with each other, whereas

FIG. 29A is a sectional view showing a principal portion of an example of heat-exchange water tube having a double tube structure, whereas

FIGS. 30A and 30B each is a schematic horizontal sectional view showing a principal portion of another example of housing of a heat exchanger.

FIG. 75A is a side view showing a principal portion of another example of means for forming clearances between loops of a coiled tube in the present invention, whereas

FIG. 83A is a horizontal sectional view showing another example of heat exchanger according to the present invention, whereas

BEST MODE FOR CARRYING OUT THE INVENTION

Preferred embodiments of the present invention will be described below in detail with reference to the accompanying drawings.

Figure 1:
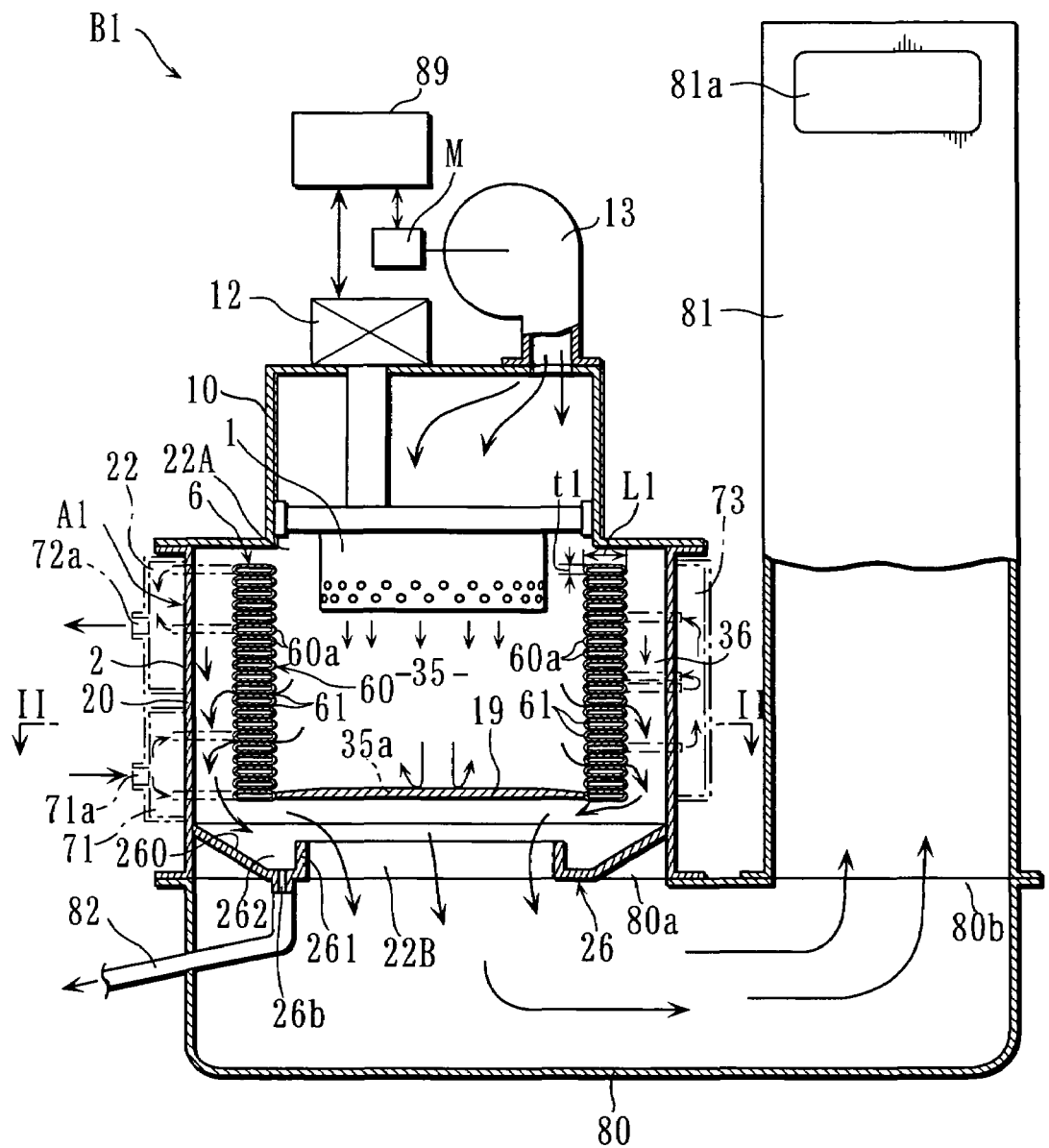
FIG. 1 is a schematic sectional view showing an example of heat exchanger and water heater incorporating the heat exchanger according to the present invention.

FIG. 1 shows an example of heat exchanger and water heater incorporating the heat exchanger according to the present invention. FIGS. 2-6 show the structure of the heat exchanger shown in FIG. 1 and the related parts thereof. As better shown in FIG. 1, the water heater B1 of this embodiment includes a burner 1, a bottom casing 80, an exhaust duct 81 and a controller 89 in addition to the heat exchanger A1.

The burner 1 is a reverse-combustion burner in which the gas obtained by vaporizing kerosene as the fuel is burned downward or kerosene is jetted downward for burning. On the heat exchanger A1, a housing 10 which is generally in the form of a box having an open bottom is placed. The burner 1 is arranged in and supported by the housing 10. A fan 13 for supplying air for combustion downwardly into the housing 10 is provided on the housing 10. The air supply by the fan 13 is helpful for causing the air for combustion to flow in the heat exchanger A1 along a predetermined path, which will be described later. On the housing 10, a fuel supply unit 12 is also mounted which serves to supply fuel to the burner 1 and is capable of adjusting the supply. The controller 89 comprises a microcomputer including a CPU and a memory coupled thereto. The controller 89 determines the combustion power level of the burner 1 in accordance with certain conditions and controls the fuel supply from the fuel supply unit 12 to the burner 1 and the number of revolutions of the motor M of the fan 13 so that the burner 1 can be driven at the determined combustion power level, which will be described later in detail.

The heat exchanger A1 includes a housing 2 and a heat-exchange water tube 6. Both of the housing 2 and the water tube 6 are made of stainless steel so as not to be easily corroded by the drain which is produced when latent heat is recovered from combustion gas by utilizing the water tube 6. Specifically, when the latent heat is recovered from the combustion gas, water vapor in the combustion gas is condensed to produce drain (condensate water). Generally, the drain, which has absorbed sulfur oxide, nitrogen oxide and soon contained in the combustion gas, has a strong acidity of about pH 3. Therefore, the housing 2 and the water tube 6 are made of a material having an excellent acid resistance. A drain receiving portion 26, a partition 19 and spacers 18, which will be described later, are also made of stainless steel.

The housing 2 of the heat exchanger A1 is connected to a bottom of the housing 10 and includes a generally cylindrical circumferential wall 20. The housing 2 has an upper portion and a lower portion respectively formed with a burner opening 22A and a combustion gas outlet 22B. The burner opening 22A is utilized for introducing combustion gas from the burner 1 or inserting and mounting the burner 1 in the housing 2. In this embodiment, the burner 1 is partially inserted in the housing 2 through the burner opening 22a. As the water flow means for the water tube 6, the housing 2 is provided with an water inflow chamber 71 formed with a water inlet 71a, an hot-water outflow chamber 72 formed with a hot-water outlet 72a, and a common chamber 73. For example, the chambers 71-73 may be formed by welding appropriate casing members to the outer side of the circumferential wall 20. The specific connection structure between the chambers 71-73 and the water tube 6 will be described later.

Figure 2:
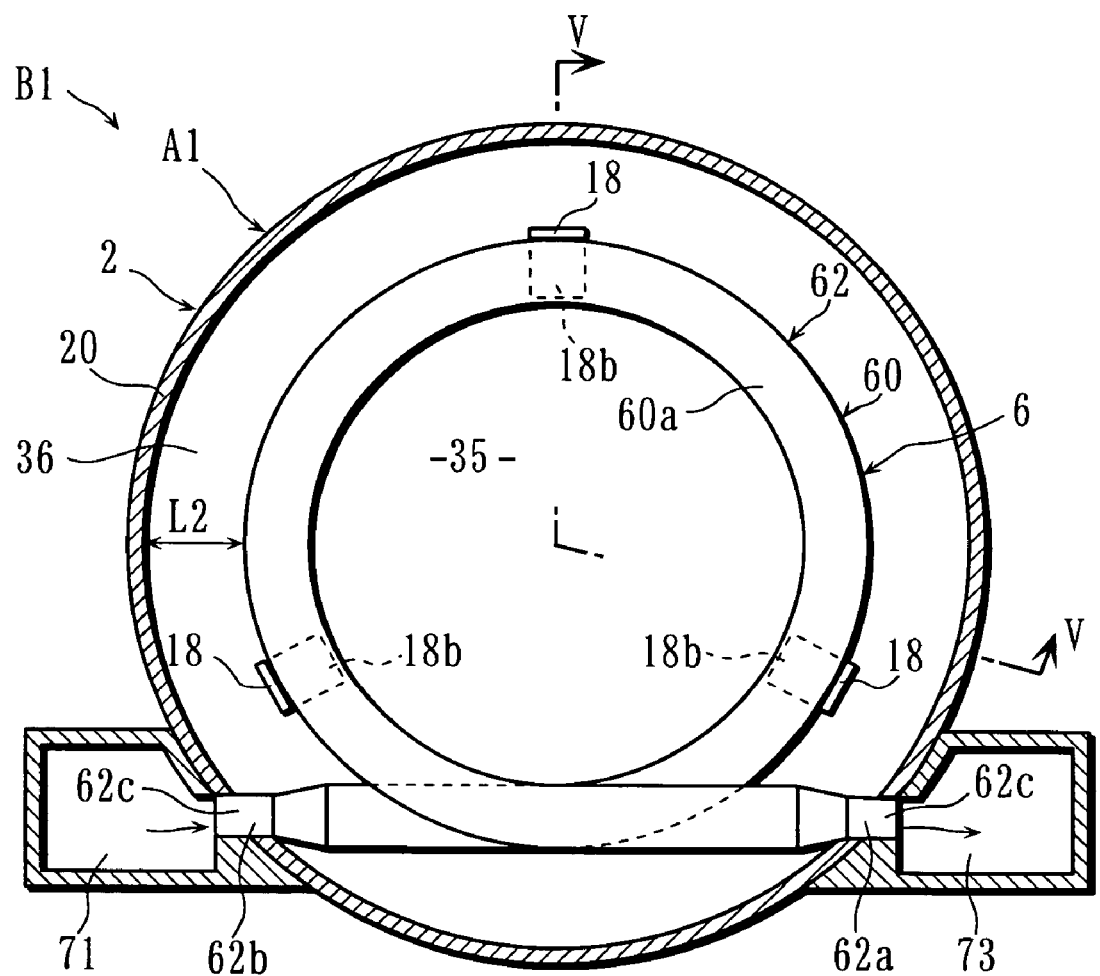
FIG. 2 is a sectional view taken along lines II-II in FIG. 1.

The water tube 6 includes a coiled tube 60 arranged in the housing 2. The coiled tube 60 includes a plurality of helical loops 60a connected to each other and arranged along the height direction of the housing 2 via clearances 61. Each of the loops 60a is flat. The burner 1 is positioned on top of a space 35 surrounded by the coiled tube 60. Between the outer circumference of the coiled tube 60 and the circumferential wall 20 of the housing 2 is defined a combustion gas path 36 extending in the height direction of the housing 2. As shown in FIG. 2, each of the loops 60a is generally annular, whereas the circumferential wall 20 of the housing 2 is generally cylindrical. The width L2 of the combustion gas path 36 in the radial direction of the housing 2 is generally uniform.

Figure 3A:
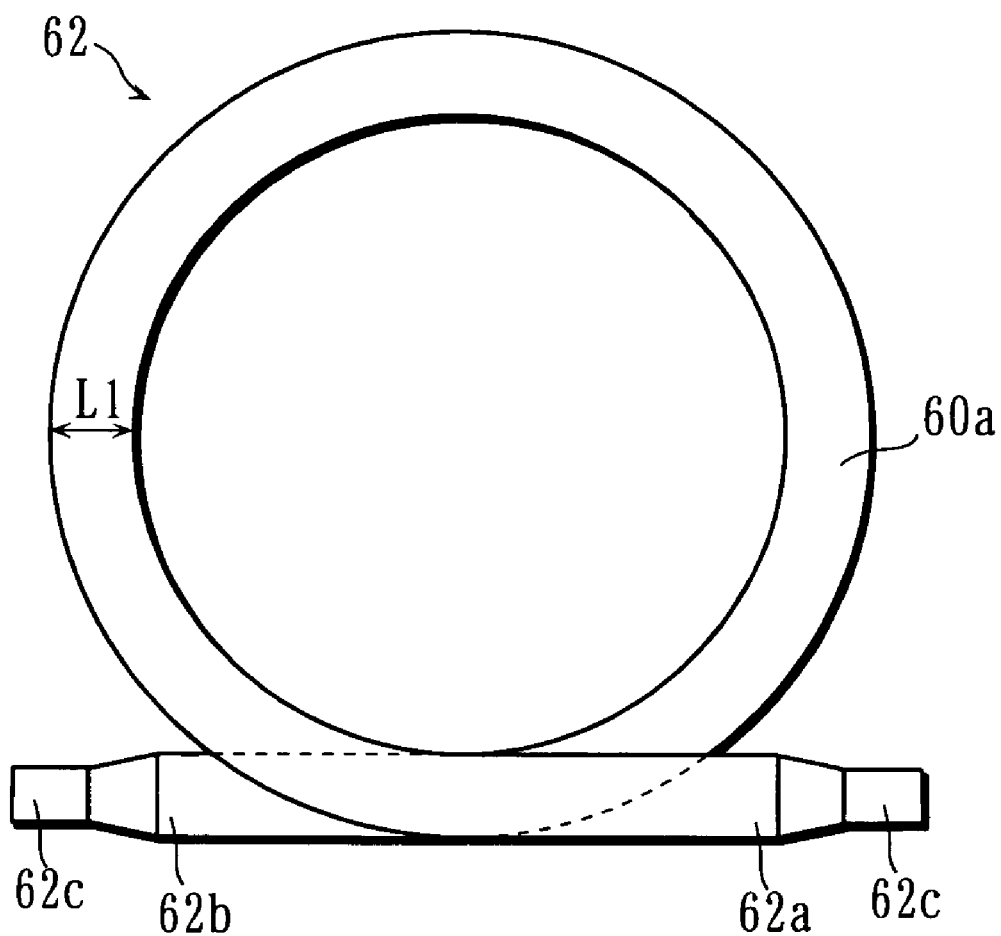
Figure 3B:
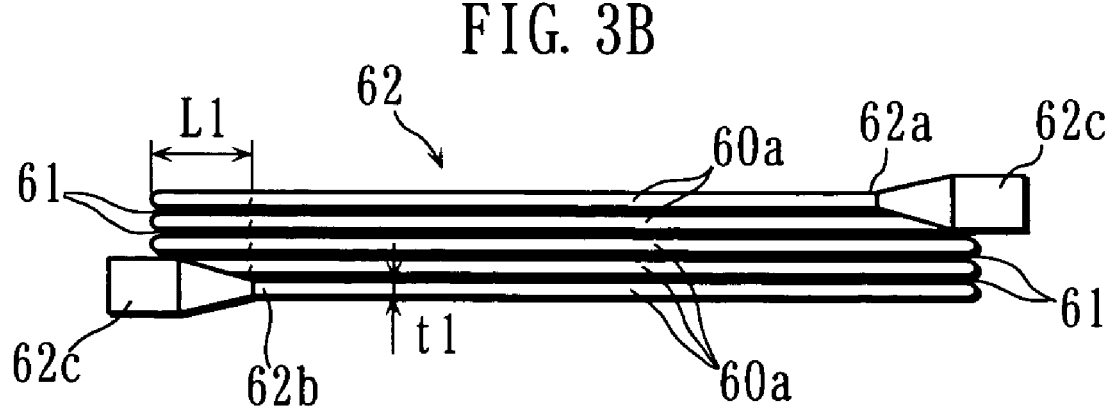
FIG. 3B is a front view thereof.

The water tube 6 is formed by stacking a plurality of tube modules 62 having the same size and shape in the housing 2. Specifically, as shown in FIGS. 3A and 3B, each of the tube modules 62 includes a part made up of a plurality of (five, for example) generally annular loops 60a helically connected to each other and stacked in the thickness direction. This part has a first and a second ends 62a and 62b each of which is provided with a connection plug 62c. The entirety of the tube module 62 except for the portions provided with the connection plugs 62c is made of a flat stainless tube whose width L1 is larger than the thickness t1. Specifically, the thickness t1 may be about 5 mm, whereas the width L1 may be about 25 mm, for example.

Figure 4:
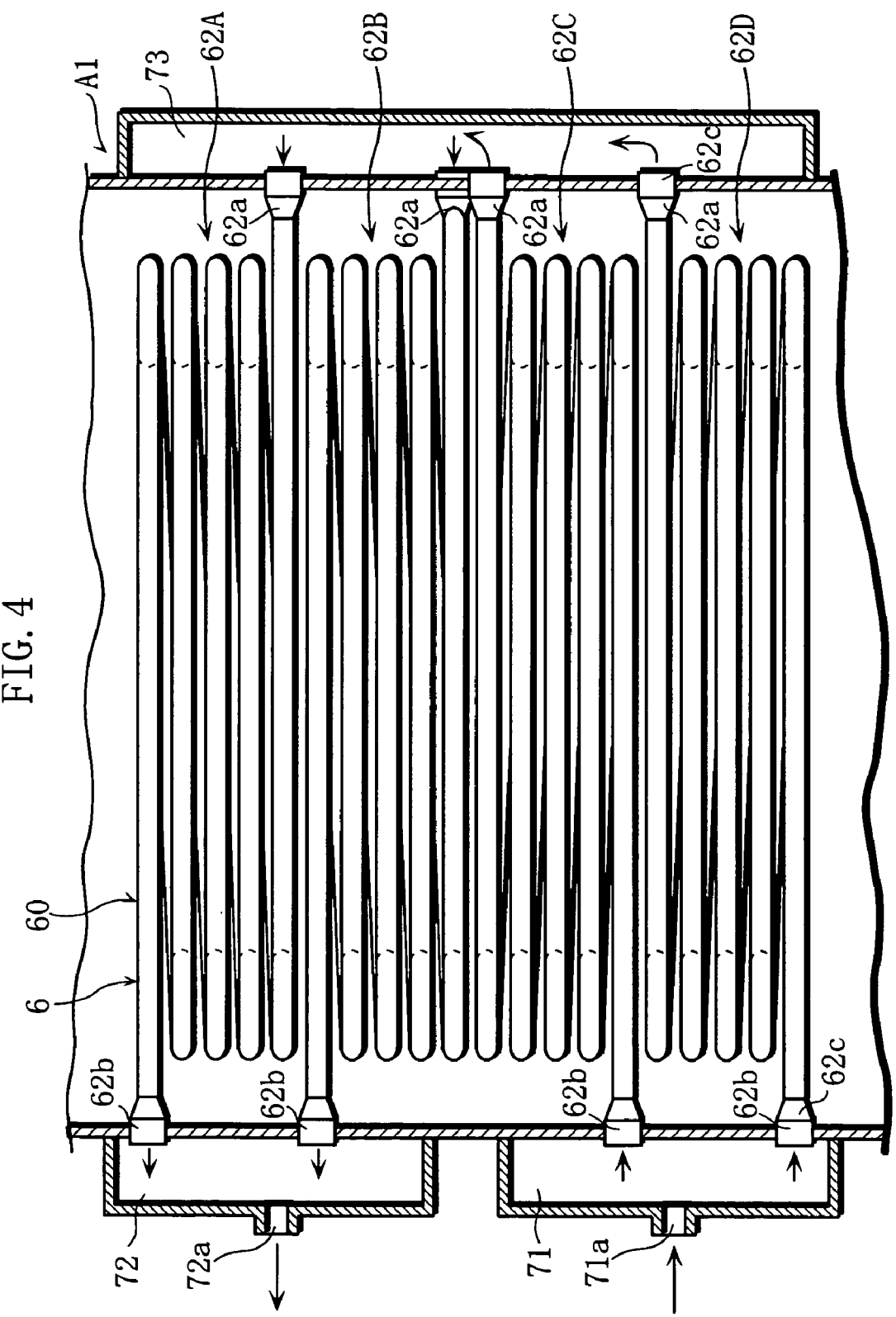
FIG. 4 is a sectional view showing a principal portion of the water heater shown in FIG. 1.

As shown in FIG. 4, for example, the water tube 6 includes four tube modules 62 (62A-62D) stacked vertically in the height direction. The first end 62a of each tube module is connected to and supported by the common chamber 73. The description of four tube modules 62 is just for easier understanding, and the number of the tube modules is not limited to four. The second end 62b of each of the two lower tube modules 62C and 62D is connected to and supported by the water inflow chamber 71. The second end 62b of each of the two upper tube modules 62A and 62B is connected to and supported by the hot-water outflow chamber 72. Therefore, the water entered the water inlet 71a flows from the water inflow chamber 71 into the common chamber 73 through the tube modules 62C, 62D, flows into the tube modules 62A, 62B through the first ends 62a to reach the hot-water outflow chamber 72, and is then supplied to the desired destination through the hot-water outlet 72a.

Figure 5:
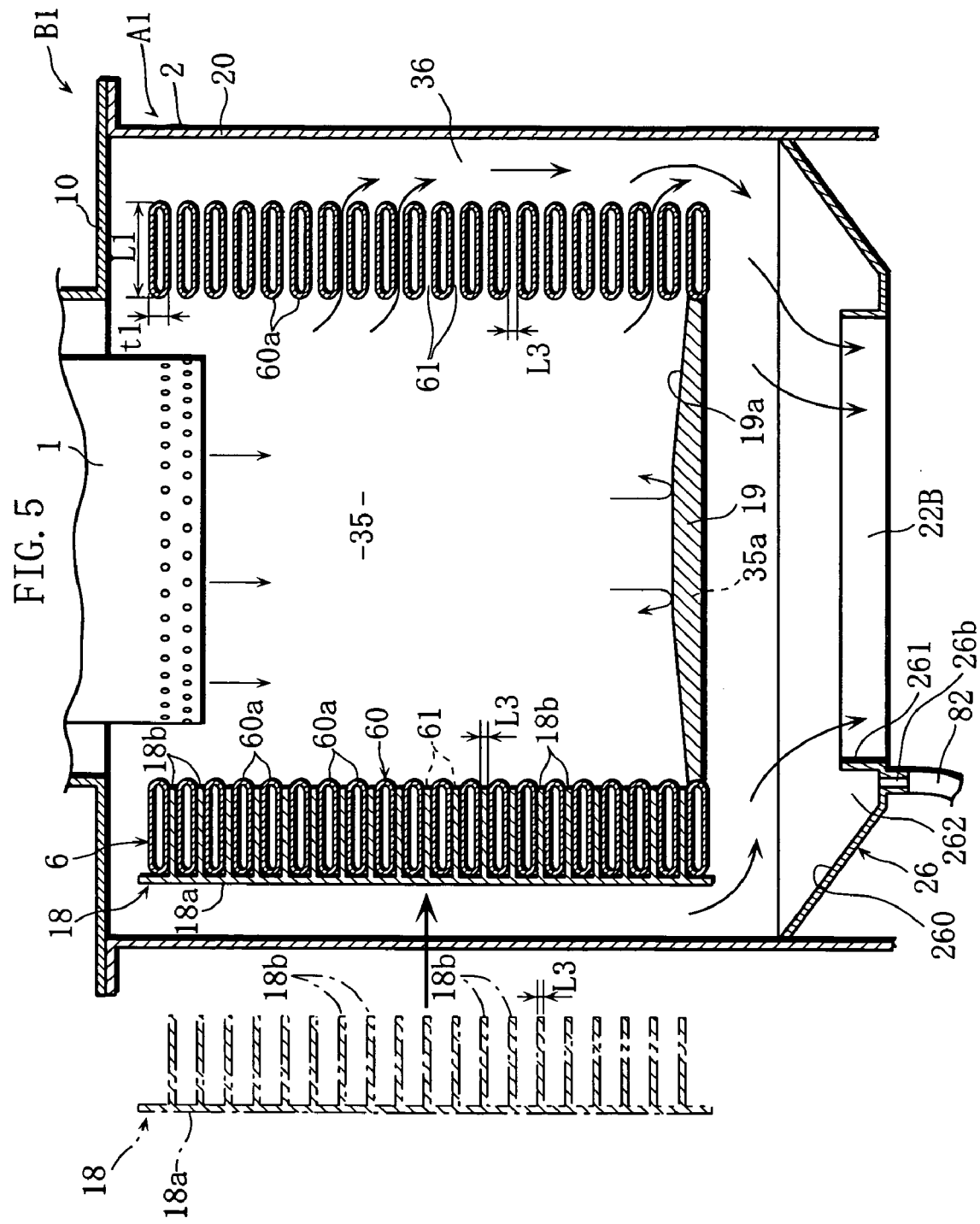
FIG. 5 is a sectional view taken along lines V-V in FIG. 2.

As better shown in FIG. 5, the partition 19 and a plurality of spacers 18 are provided in the heat exchanger 1. The partition 19 serves to close the bottom of the space 35 and is in the form of a circular plate, for example. Like the partition 19 which will be described later in the embodiments shown in FIGS. 35-39, the partition 19 may have a laminated structure obtained by covering a surface of a metal plate with a heat insulating material or a structure in which the upper surface which contacts the combustion gas is dented. The partition 19 is mounted by welding the partition 19 to the water tube 6, for example. Alternatively, the partition 19 may be supported by utilizing an appropriate stay (not shown) mounted to the bottom of the housing 2.

Figure 6:
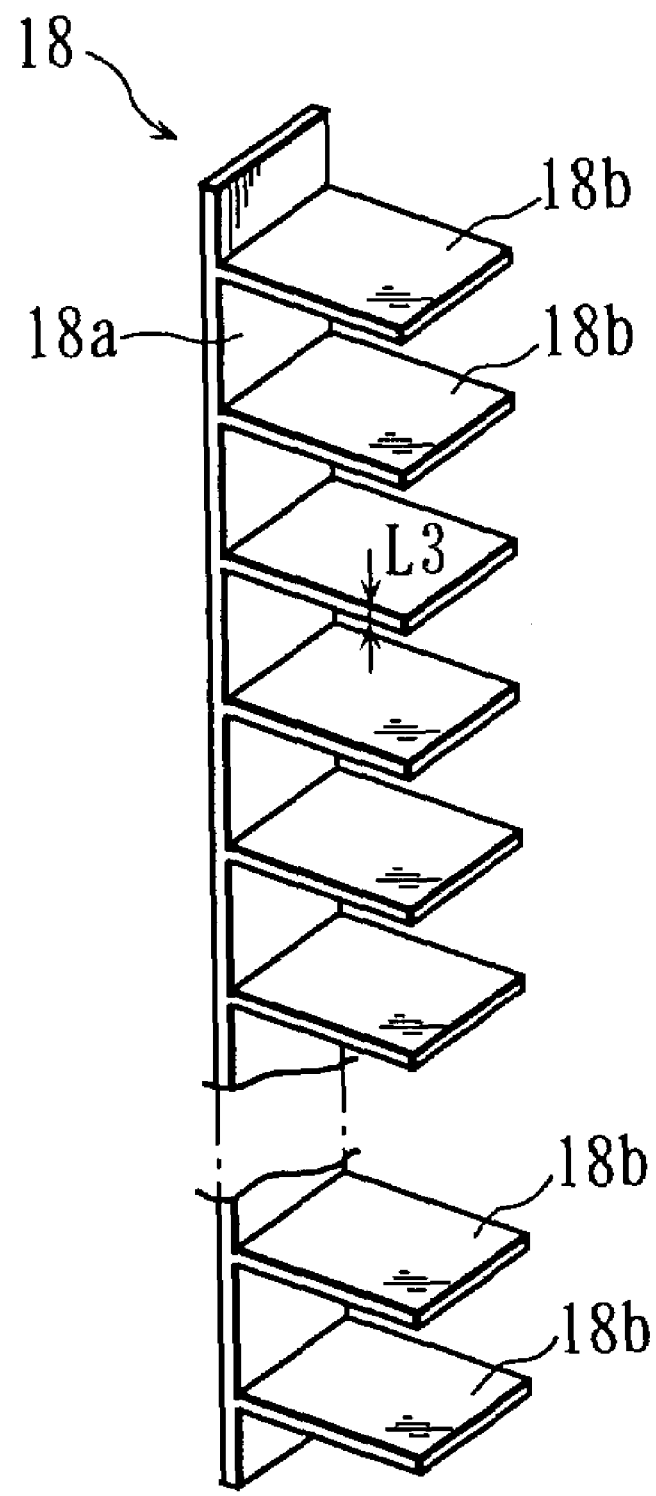
FIG. 6 is a perspective view, partially omitted, showing an example of spacer used in the water heater shown in FIG. 1.

As shown in FIG. 6, each of the spacers 18 includes a base portion 18a in the form of an elongated rectangle and a plurality of projections 18b projecting from the base portion 18a like teeth of a comb. The spacer 18 can be formed by skiving of metal or welding of a plurality of metal plates. Alternatively, the spacer may be formed by cutting and bending a metal plate. The specific examples will be given later. As shown in FIG. 5, each of the projections 18b is inserted between adjacent loops 60a, whereby the clearances 61 are formed. Therefore, the dimension L3 of the clearances is equal to the thickness L3 of the projections 18b. The plurality of projections 18b have the same thickness L3, so that the plurality of clearances 61 have the same dimension. However, as will be described later, the clearances 61 may have different dimensions. While the thickness t1 of the water tube 6 is about 5 mm as noted above, the dimension L3 of the clearances 61 is about 0.8 to 2.0 mm, for example. For example, as better shown in FIG. 2, the spacers 18 are provided at three locations along the outer circumference of the coiled tube 60 at approximately regular intervals. To reliably mount the spacers 18, the spacers 18 may be welded to appropriate portions of the coiled tube 60 or the housing 2.

As better shown in FIG. 1, the heat exchanger A1 includes a drain receiving portion 26. The drain receiving portion 26 serves to receive the drain dropping from the water tube 6 and is positioned below the coiled tube 60. The drain receiving portion 26 is in the form of a ring at the center of which the combustion gas outlet 22B is formed, and the outer circumference thereof is welded to the circumferential wall 20 of the housing 2. The drain receiving portion 26 includes an inclined surface 260 which becomes lower as proceeding from the outer circumference toward the combustion gas outlet 22B, and a standing wall 261 standing upward along the circumference of the combustion gas outlet 22B. The standing wall 261 and the inclined surface 260 define a groove 262 into which drain is collected. The bottom of the drain receiving portion 26 is formed with a discharge port 26b. A pipe 82 for discharging the drain out of the housing 2 or the bottom casing 80 is connected to the discharge port 26b.

The bottom casing 80 is generally in the form of a hollow rectangular parallelepiped. The heat exchanger A1 and the exhaust duct 81 are mounted side by side on the bottom casing 80. The bottom casing 80 includes an upper wall formed with openings 80a and 80b respectively communicating with the combustion gas outlet 22B of the heat exchanger A1 and the bottom opening of the exhaust duct 81. Therefore, the combustion gas flowing downward from the combustion gas outlet 22B of the heat exchanger A1 toward the bottom casing 80 passes through the bottom casing 80 and then flows upward into the exhaust duct 81 from below. Thereafter, the combustion gas passes through the exhaust duct 81 and is discharged to the outside through an exhaust port 81a as exhaust gas. The exhaust duct 81 contains therein a sound absorbing material (not shown) such as glass wool and serves as a silencer for reducing the exhaust noise.

The operation and advantages of the water heater B1 will be described below.

When the burner 1 is driven while supplying air for combustion downward from the fan 13, combustion gas is generated in the space 35 which serves as the combustion chamber. Although the combustion gas tries to flow downward, the downward flow is hindered, because the bottom of the space 35 is closed by the partition 19. Therefore, the combustion gas passes through the plurality of clearances 61 of the coiled tube 60 into the combustion gas path 36. Thereafter, the combustion gas flows downward through the combustion gas path 36 and then enters the bottom casing 80 through the combustion gas outlet 22B. Then, the combustion gas passes through the exhaust duct 81a and is discharged, as exhaust gas, to the outside through the exhaust port 81a. In the water heater B1, the combustion gas smoothly flows along the above-described predetermined route. Therefore, the combustion gas is prevented from being partially retained within the heat exchanger A1. Therefore, the combustion gas successively generated by the driving of the burner 1 is effectively utilized for heat exchange.

Since the coiled tube 60 surrounds the space 35 as a combustion chamber and includes the clearances 61 through which the combustion gas passes, the coiled tube recovers heat from the combustion gas. Each of the loops 60a of the coiled tube 60 is made of a flat tube whose width L1 is large. Therefore, when the combustion gas passes through the clearances 61, the contact time between the loop 60a and the combustion gas is long. As a result, the amount of heat which the coiled tube 60 recovers from the combustion gas is large.

In the heat exchanger A1, since the width L1 is large, not only the sensible heat but also the latent heat can be recovered from the combustion gas. By utilizing the spacers 18, the dimension of the clearances 61 can be set to a dimension which is optimum for the heat transfer. The combustion gas transfers heat to the coiled tube 60 also in flowing downward through the combustion gas path 36. Therefore, the heat exchange efficiency of the heat exchanger A1 is very high, which enhances the hot water supply performance.

In addition to the enhancement of the heat exchange efficiency, the use of the coiled tube 60 made of a flat tube can advantageously increase the amount of water in the water tube 6. Specifically, since the thickness t1 of each of the loops 60a is small, the number of loops 60a can be increased without increasing the entire height of the coiled tube 60, whereby the amount of water in the water tube 6 can be increased. Particularly, the amount of water can be further increased by increasing the width L1 of the flat tube.

In the heat exchanger A1, the heat exchange efficiency is enhanced without using a finned tube as the water tube, and the structure of the water tube 6 is simple. Therefore, although the heat exchanger A1 is made of stainless steel, the manufacturing cost is relatively low. Since the water tube 6 is formed by using a plurality of tube modules 62 having a uniform shape and size, the manufacturing cost is further reduced as compared with the structure which utilizes a water tube made by forming a single tube into a continuous helical shape. Further, since the total length and volume of the water tube 6 can be changed by changing the number of the tube modules 62, the specifications of the heat exchanger A1 can be easily changed.

The combustion gas generates drain when it comes into contact with the coiled tube 60 and performs heat exchange. However, the drain drops from the coiled tube 60 and is then received by the drain receiving portion 26 to be discharged to the outside through the pipe 82. Therefore, such a problem that a large amount of drain is retained within the housing 2 does not occur. Further, the bottom casing 40 is prevented from being contaminated by the drain. Since the portion with which the drain may come into contact is made of stainless steel, corrosion due to the contact with acidic drain is also prevented. Moreover, since the water tube 6 of the heat exchanger A1 is made of stainless steel, well water containing copper or iron, for example, can be introduced into the water tube 6 for use, which increases the range of use of the heat exchanger.

In the water heater B1 of this embodiment, the combustion power level in driving the burner 1 can be determined by a conventionally known method. As noted before, in the water heater B1, the amount of water in the water tube 6 can be increased, and the water tube 6 is made of stainless steel which has higher thermal conductivity than copper, for example. In the water heater B1, therefore, as the means for enhancing the hot water supply performance and quickly supplying hot water of high temperature at the beginning of driving of the burner 1, for example, the controller 89 performs any of the processes shown in FIGS. 7-9 and the process shown in FIG. 10. This point will be described below.

Figure 7:
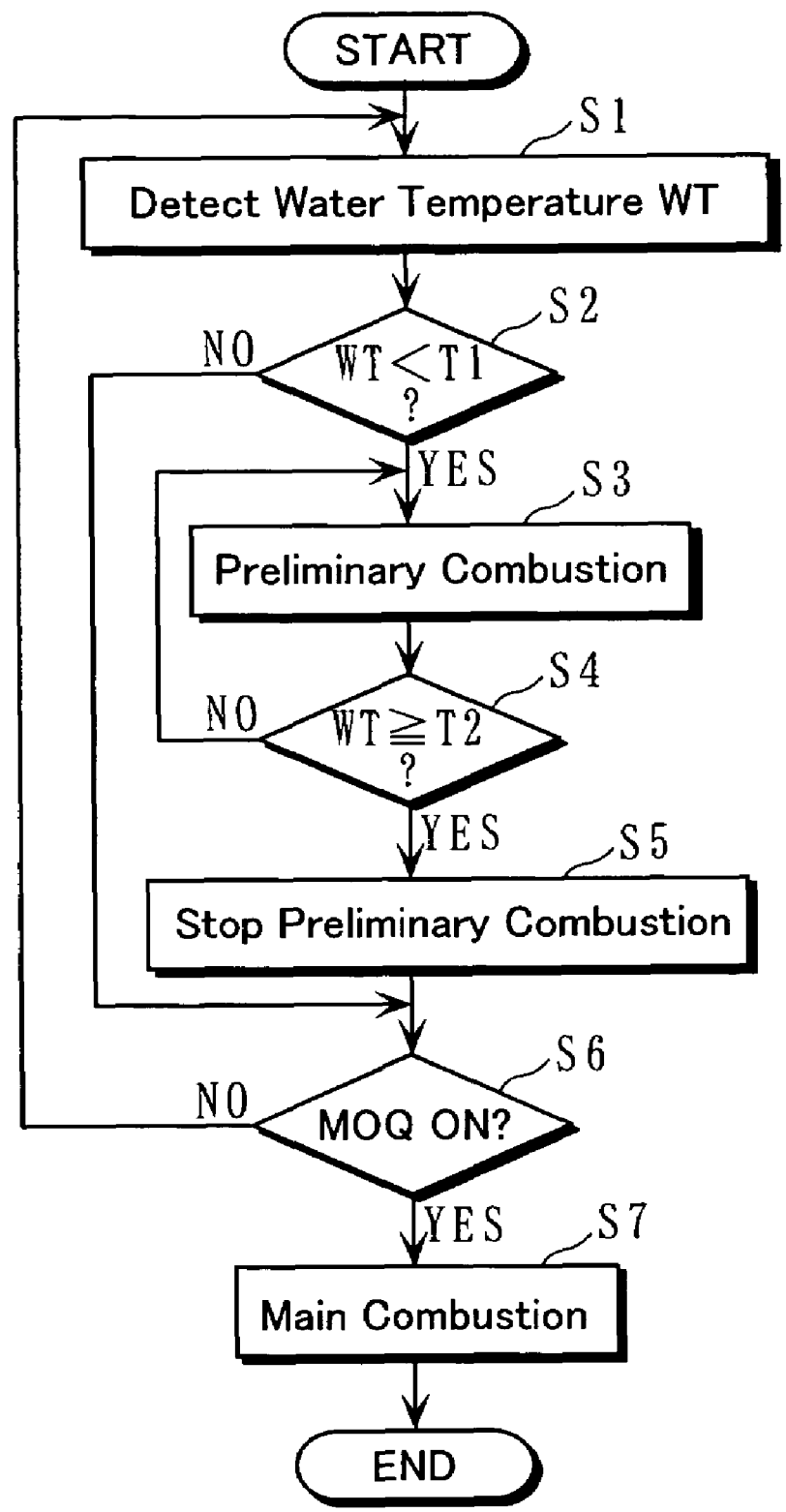
FIG. 7 is a flow chart showing an example of operation process of a controller of the water heater shown in FIG. 1.

In the process shown in FIG. 7, the controller 89 detects and monitors the temperature WT of the water in the water tube 6 regardless of whether the burner 1 is driven or not driven (S1). The water temperature WT can be detected by utilizing one or a plurality of temperature sensors (not shown) provided at appropriate portions of the heat exchanger A1 such as the portions within the housing 2. As the temperature sensor, use may be made of one utilizing a thermistor, for example. When the water temperature WT is relatively low and lower than a first preset temperature T1, the controller 89 drives the burner 1 and causes the burner to perform preliminary combustion (S2:YES, S3). The preliminary combustion in this embodiment is the concept opposed to the combustion for performing hot water outflow (main combustion) and means the combustion just for raising the temperature of the water stored in the water tube 6. The preliminary combustion is performed with thermal power which is considerably smaller than that for the main combustion. Instead, however, the preliminary combustion may be performed with about the same degree of thermal power as that for the main combustion.

When the water temperature WT is raised by the preliminary combustion and reaches a second preset temperature T2 or higher, the controller 89 finishes the preliminary combustion (S4: YES, S5). The second preset temperature T2 is higher than the first preset temperature T1. However, the second preset temperature T2 may be equal to the first preset temperature T1. In this case, however, the preliminary combustion is started when the water temperature WT is reduced to a temperature slightly below the preset temperature, and the preliminary combustion is stopped when the water temperature Wt is raised slightly. Therefore, hunting phenomenon in which the starting and stopping of the preliminary combustion is frequently repeated occurs. Therefore, it is desirable that measures against such a phenomenon are taken. The water heater B1 is provided with a remote control panel (not shown), and preferably, the first and the second preset temperatures T1, T2 can be changed by the switching operation of the remote control panel by the user. After the stopping of the preliminary combustion, the process shifts to the main combustion mode at the point of time when the MOQ becomes ON (S6: YES, S7). Herein, the MOQ means the minimum water supply quantity to the water tube 6 which is necessary for the water heater B1 to perform the hot water supply operation, and that the MOQ is ON means that the water not less than the minimum water supply quantity has been supplied to the water tube 6.

By the above-described process, the water temperature WT is maintained within the range from the first preset temperature T1 to the second preset temperature T2 and can be maintained at a relatively high temperature. Therefore, when the main combustion for hot water supply is started, high-temperature hot water can be soon supplied.

Figure 8:
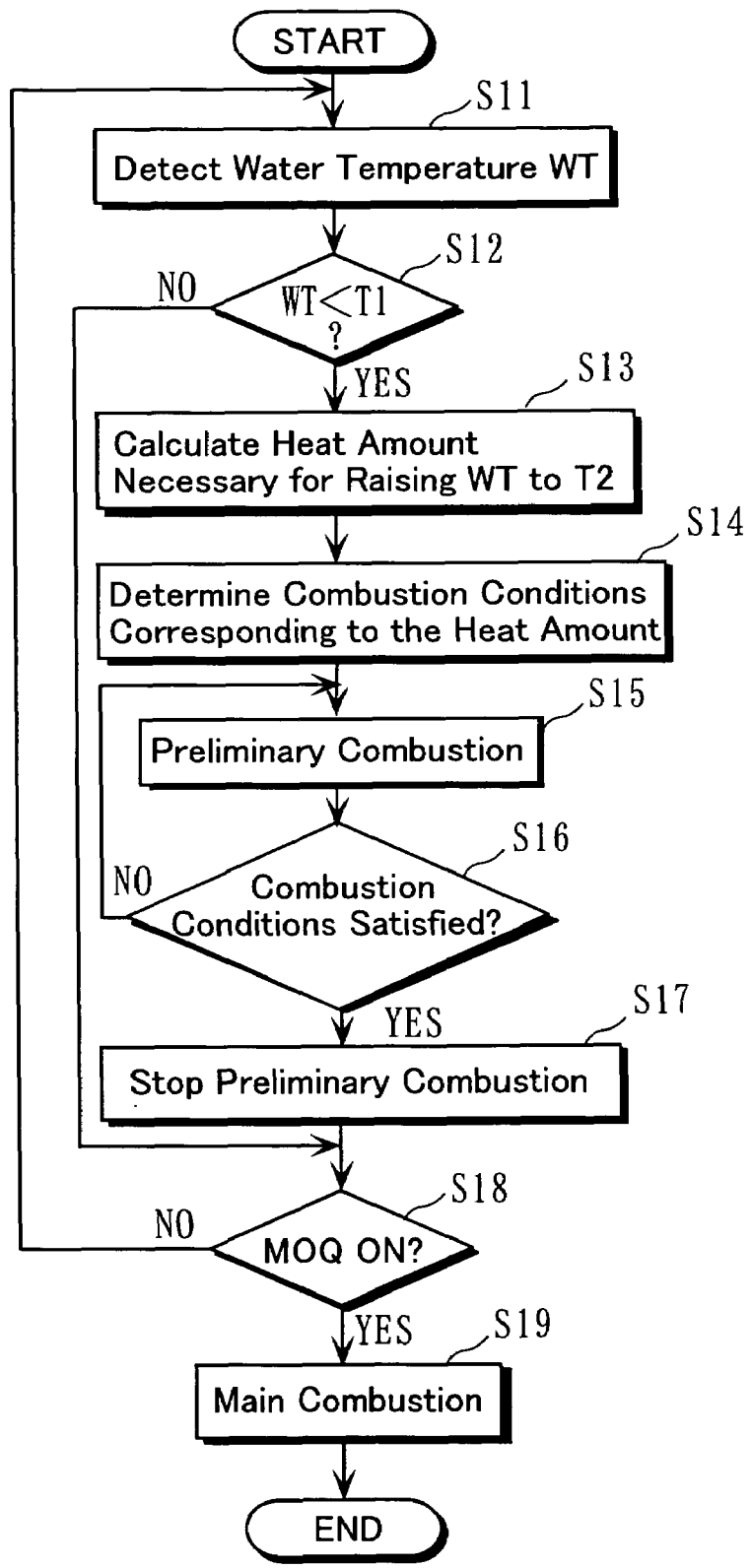
FIG. 8 is a flowchart showing another example of operation process of the controller of the water heater shown in FIG. 1.

In the process shown in FIG. 8, similarly to the process shown in FIG. 7, the controller 89 detects the water temperature WT (S11). When the water temperature WT is lower than the first preset temperature T1 (S12: YES), the controller 89 calculates the amount of heat necessary for raising the water temperature WT to the second preset temperature T2 and determines the combustion conditions necessary for obtaining that amount of heat (S13, S14). The combustion conditions are the combustion power level and the combustion time. Subsequently, the controller 89 causes the burner 1 to perform the preliminary combustion at the determined combustion power level. Thereafter, when the preliminary combustion satisfies the combustion conditions, the controller stops the preliminary combustion (S15, S16: YES, S17). The subsequent process steps S18 and S19 are performed similarly to the process steps S6 and S7 shown in FIG. 7.

By the above-described process, similarly to the process shown in FIG. 7, the water temperature WT is maintained within the range from the first preset temperature T1 to the second preset temperature T2 and can be maintained at a relatively high temperature. Therefore, when the main combustion for hot water supply is started, high-temperature hot water can be soon supplied.

Figure 9:
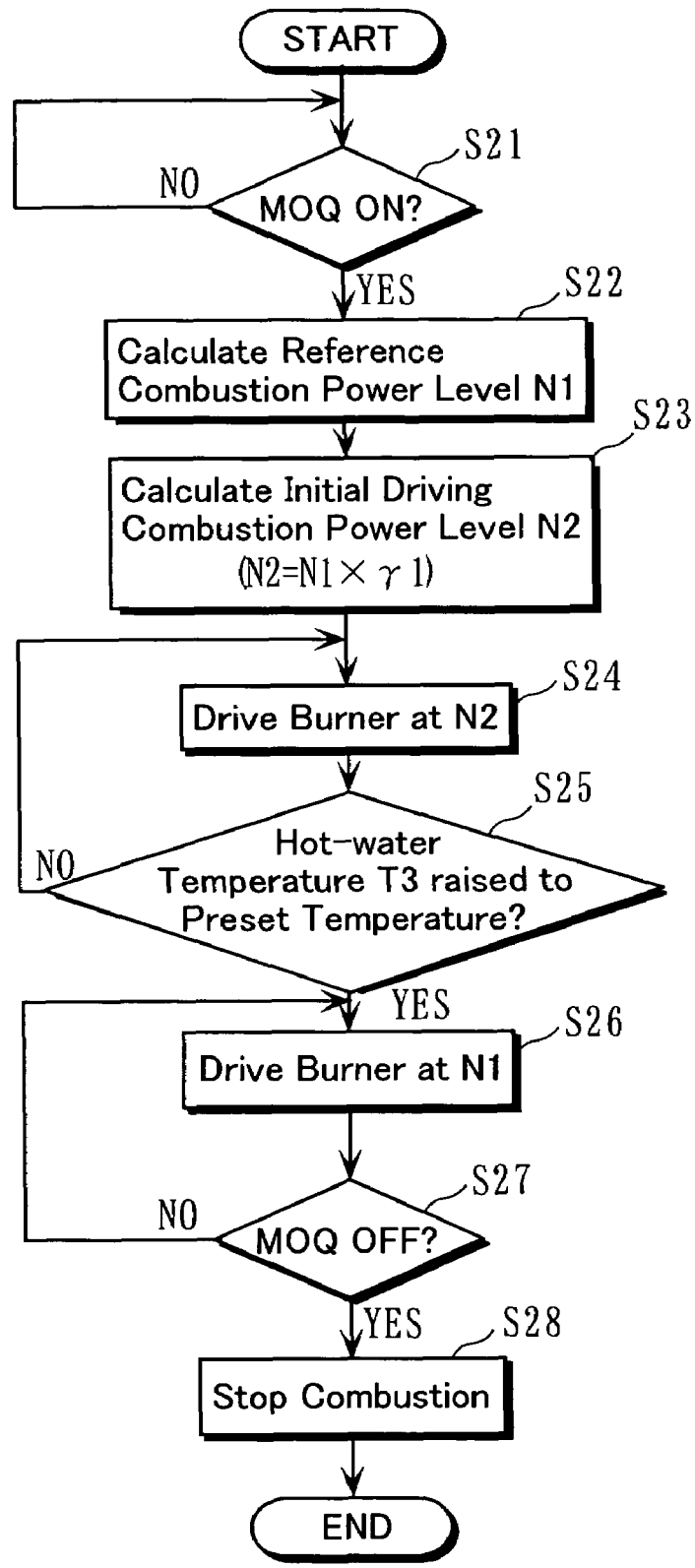
FIG. 9 is a flowchart showing another example of operation process of the controller of the water heater shown in FIG. 1.

In the process shown in FIG. 9, when the MOQ becomes ON and the combustion at the burner 1 is to be started (S21: YES), the controller 89 calculates a reference combustion power level N1 and determines an initial driving combustion power level N2 based on the reference combustion power level N1 and a predetermined correction coefficient $\gamma 1$ (S22, S23). The reference combustion power level N1 is the combustion power level which is considered to be optimum for the period except for the beginning of driving and determined based on the inflow water temperature, the target outflow hot-water temperature and the target amount of outflow hot-water. The reference combustion power level N1 may be calculated by using a computation program used in a conventional water heater as it is. The initial driving combustion power level N2 is the combustion power level used only at the beginning of driving of the burner 1 and may be obtained by the formula N2=N1×$\gamma 1$, for example. The correction coefficient $\gamma 1$ is predetermined and inputted in advance in the memory of the controller 89 as a datum and is a value which is greater than 1. Therefore, the relationship N2>N1 is established. Preferably, similarly to the first and the second preset temperatures T1 and T2, the correction coefficient $\gamma 1$ can be changed by the switching operation of the remote control panel, for example. This holds true for correction coefficients $\gamma 2$ and $\gamma 3$, which will be described later.

After the calculation is finished, the controller 89 drives the burner 1 at the initial driving combustion power level N2 (S24). Subsequently, when the outflow of hot-water is started and the outflow hot-water temperature T3 is raised to the target outflow hot-water temperature or to a predetermined temperature close to the target temperature, the controller 89 switches the combustion power level of the burner 1 to the reference combustion power level N1 (S25:YES, S26). Thereafter, when the MOQ becomes OFF, the combustion is stopped (S27:YES, S28).

In the above-described process, at the beginning of the driving of the burner 1, the burner 1 is driven at the initial driving combustion power level N2 whose thermal power is larger than that of the reference combustion power level N1. Therefore, the time taken for the actual outflow hot-water temperature to reach the target outflow hot-water temperature is shortened. Moreover, since the initial driving combustion power level N2 is switched to the reference combustion power level N1 when the outflow hot-water temperature reaches or becomes close to the target outflow hot-water temperature, the subsequent overheat can be avoided, and the outflow of hot water under desired conditions can be continued properly. The timing when the combustion is switched from the initial driving combustion power level N2 to the reference combustion power level N1 ("YES" in step S25) is not limited to the timing when the outflow hot-water temperature has reached the predetermined temperature. For example, a timer maybe set in starting the hot-water outflow so that the switching is performed when the timer goes off. Alternatively, the switching may be performed at the point of time when the actual hot-water outflow amount has exceeded a predetermined amount.

Figure 10:
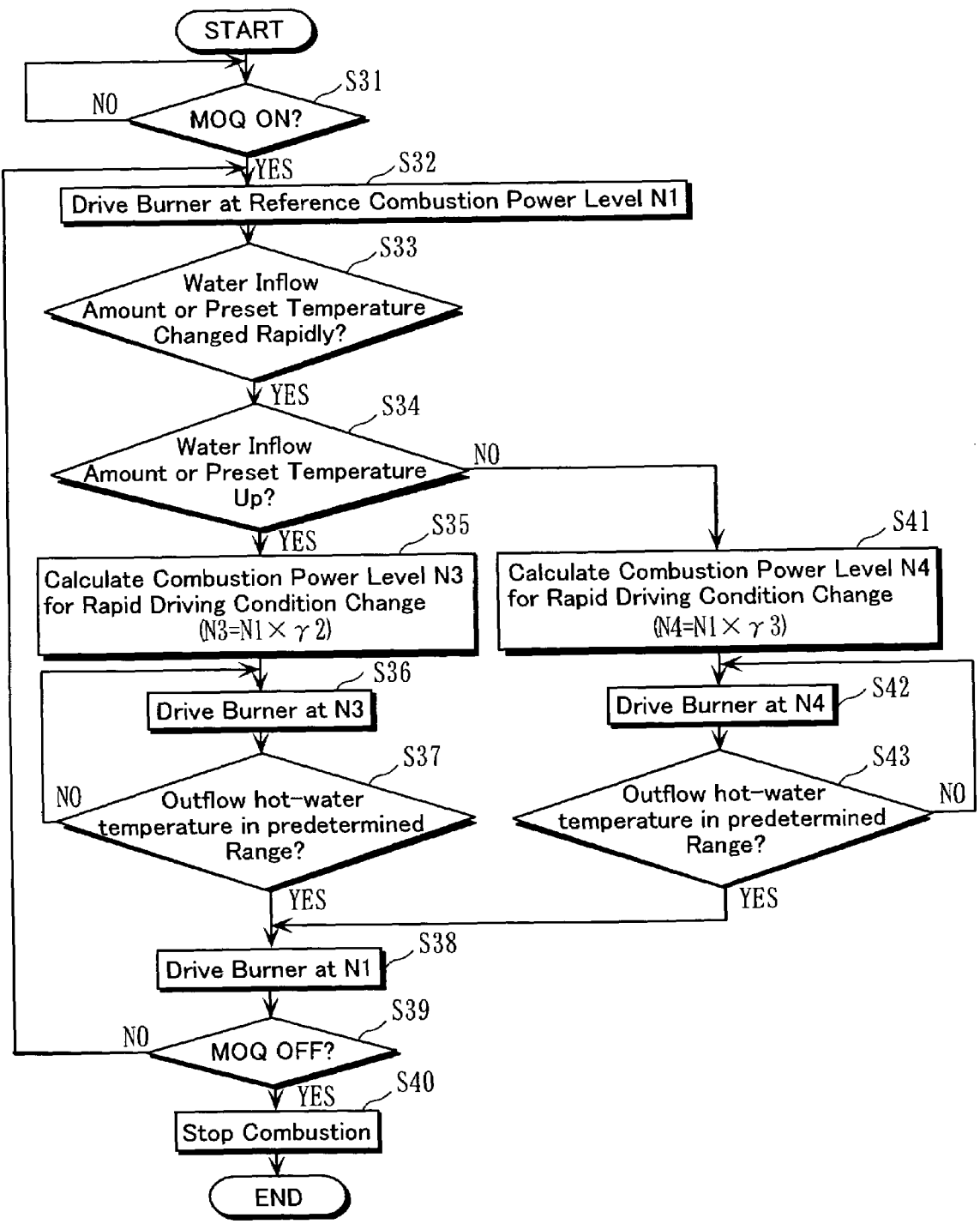
FIG. 10 is a flowchart showing another example of operation process of the controller of the water heater shown in FIG. 1.

The process shown in FIG. 10 copes with the situation where the amount of water inflow to the water tube 6 or the preset target outflow hot-water temperature is changed rapidly during the hot-water outflow. First, in this process, when the MOQ becomes ON, the controller 89 drives the burner 1 at the reference combustion power level N1 (S31, S32). Though not illustrated in the figure, at this beginning stage of the combustion, the process steps shown in FIGS. 7-9 may be performed. During the combustion at the reference combustion power level N1, when the amount of water inflow to the water tube 6 or the preset value of the target outflow hot-water temperature is changed rapidly over a predetermined range (S33: YES), the controller 89 changes the reference combustion power level N1 to a corrected combustion power level to quickly cope with the situation.

Specifically, when the inflow water amount or the preset target outflow hot-water temperature is increased (S34:YES), the controller 89 determines the combustion power level N3 for rapid change of driving conditions and drives the burner 1 at the combustion power level N3 (S35, S36). The combustion power level N3 may be obtained by the formula N3=N1×$\gamma 2$, for example. Herein, $\gamma 2$ is a correction coefficient predetermined and inputted in advance in the memory of the controller 89 and is a value which is greater than 1. Therefore, the combustion power level N3 is greater than the reference combustion power level N1. On the other hand, when the inflow water quantity or the preset target outflow hot-water temperature is decreased (S34: No), the controller 89 determines the combustion power level N4 for sudden change of driving conditions by the formula N4=N1×$\gamma 3$ and drives the burner 1 at the combustion power level N4 (S41, S42). Herein, $\gamma 3$ is a correction coefficient inputted in the memory similarly to $\gamma 2$ but comprises a value which is smaller than 1. Therefore, the combustion power level N4 is smaller than the reference combustion power level N1.

When the outflow hot-water temperature reaches the target outflow hot-water temperature or a predetermined temperature range around the target temperature during the driving of the burner 1 at the combustion power level N3 or N4, the controller 89 returns the combustion power level of the burner 1 to the reference combustion power level N1 (S37: YES, S43: YES, S38). Thereafter, when the MOQ becomes OFF, the combustion is stopped (S39: YES, S40).

In the above-described process, when the inflow water amount to the water tube 6 is suddenly increased or the target outflow hot-water temperature is suddenly raised considerably, combustion is performed at the combustion power level N3 for rapid change of driving conditions whose thermal power is larger than that of the reference combustion power level N1 which is the original combustion power level, whereby the heating rate is increased. Therefore, hot water having a temperature lower than the target outflow hot-water temperature is prevented from flowing out by a large amount. Conversely, when the inflow water amount to the water tube 6 is suddenly reduced or the target outflow hot-water temperature is suddenly reduced considerably, combustion is performed at the combustion power level N4 for rapid change of driving conditions whose thermal power is smaller than that of the reference combustion power level N1. Therefore, so-called post-boiling can be reliably prevented. As a result, hot water having a temperature higher than the target outflow hot-water temperature is prevented from flowing out by a large amount.

The process shown in FIG. 10 is applicable not only to the situation where the water inflow amount or the preset target outflow hot-water temperature is rapidly changed but also to the situation where the inflow water temperature is rapidly changed. When the inflow water temperature is dropped rapidly, the process steps similar to S35 and S36 are performed. When the inflow water temperature is raised rapidly, the process steps similar to S41 and S42 are performed. Similarly to the description given of the process step S25 of FIG. 9, the combustion power level may be switched from the level N3, N4 to the level N1 when a predetermined time period has lapsed.

Figure 11:
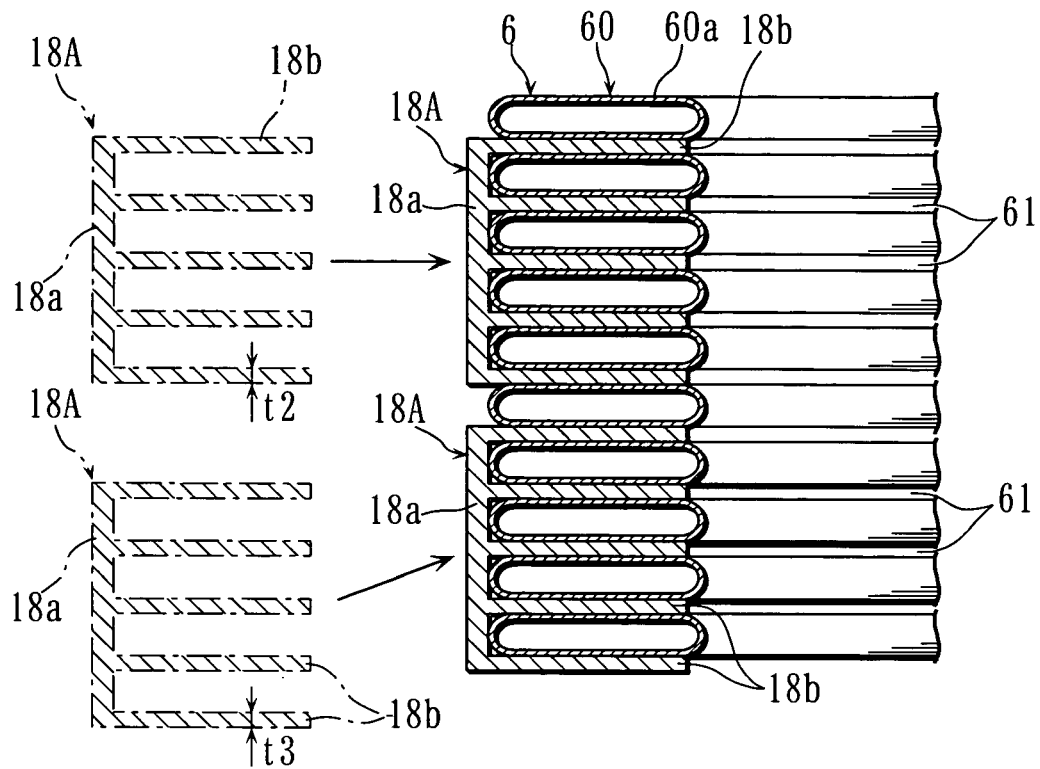
FIG. 11 is a sectional view showing a principal portion of another example of spacer.
Figure 92:
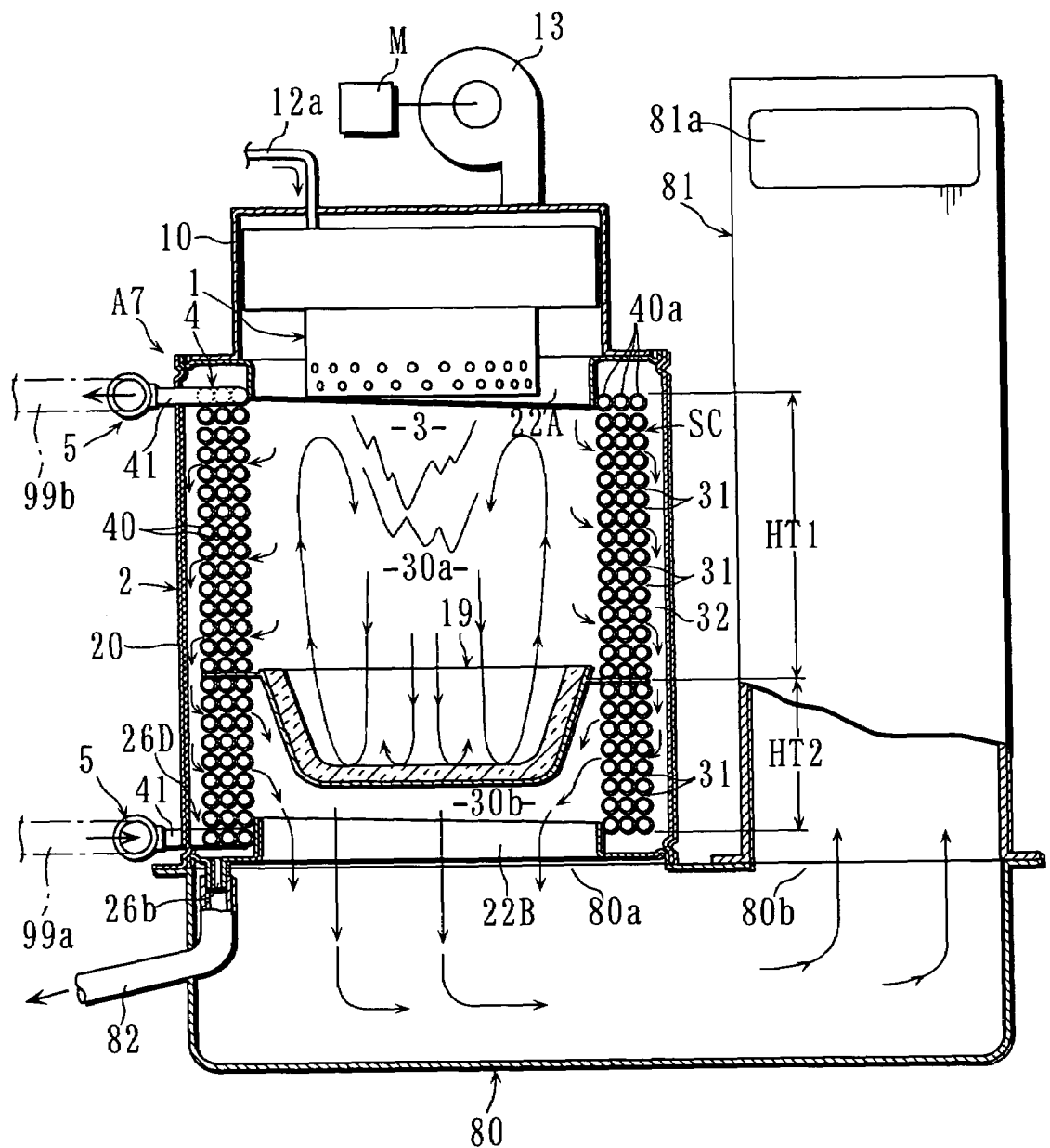
FIG. 92 is a schematic sectional view showing another example of heat exchanger and water heater incorporating the heat exchanger according to the present invention.
Figure 93:
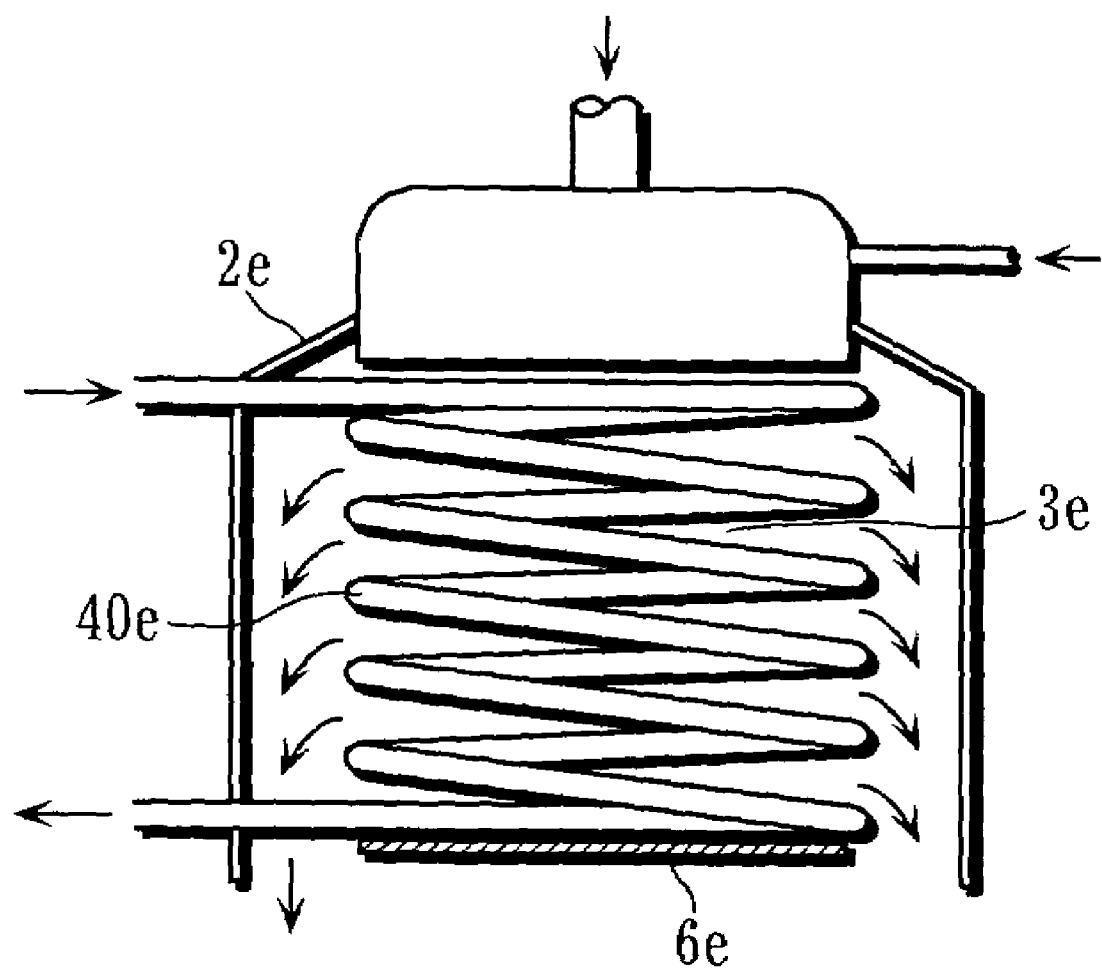
FIG. 93 is a view for describing an example of prior art structure.

FIGS. 11 to 92 (excluding FIG. 32 and FIG. 60) show other embodiments of the present invention. In these figures, the elements which are identical or similar to those of the foregoing embodiment are designated by the same reference signs as those used for the foregoing embodiment.

In the embodiment shown in FIG. 11, the coiled tube 60 of the water tube 6 is provided with a plurality of spacers 18A spaced from each other in the height direction. As compared with the spacer 18 shown in FIGS. 5 and 6, the base portion 18a of each of the spacers 18A has a shorter length, and the number of projections 18b is small. With such an arrangement, although the dimensions of all the clearances 61 of the coiled tube 60 cannot be determined collectively by a single spacer 18A, the dimensions of a certain number of clearances 61 can be determined collectively, which is convenient. When two spacers 18A which are different from each other in thicknesses t2 and t3 of the projections 18b are used, clearances 61 having different dimensions can be formed properly, as will be described later.

Figure 12:
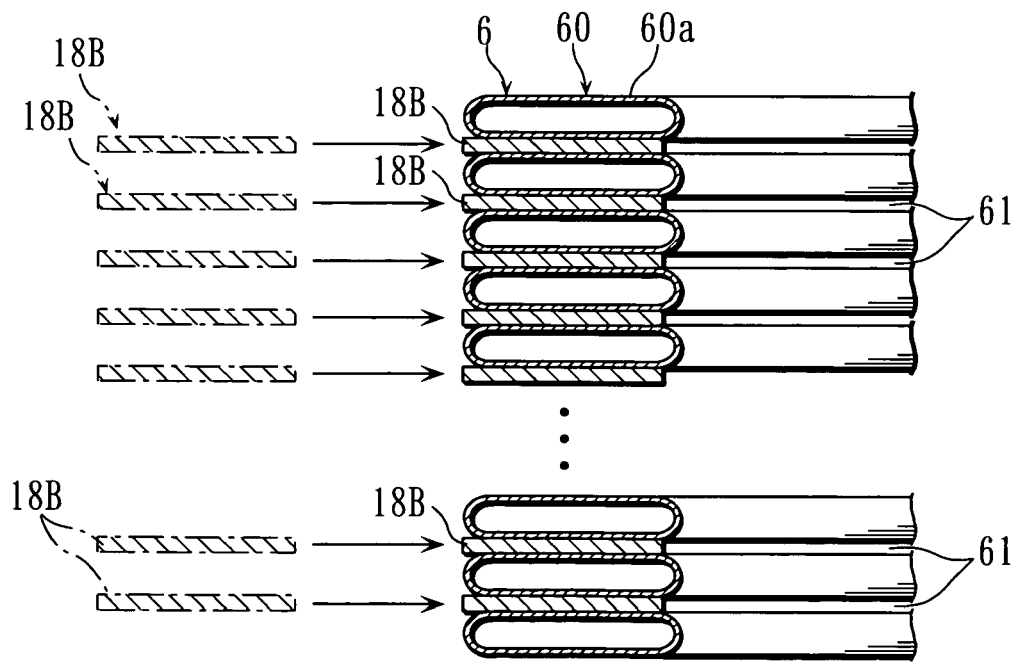
FIG. 12 is a sectional view showing a principal portion of another example of spacer.

In the embodiment shown in FIG. 12, a plurality of spacers 18B each of which is in the form of a flat plate or a chip are inserted individually between the loops 60a. In the present invention, this arrangement may be employed, although the insertion of the plural spacers 18b between the loops 60a is troublesome. Even with this arrangement, clearances 61 of desired dimensions can be formed properly by the spacers 18B. Since it is easy to make a plurality of spacers 18B having different thicknesses, this arrangement is suitable for forming clearances 61 having different dimensions.

In the embodiments shown in FIGS. 13-16, the spacer is manufactured by cutting and bending a metal plate. The spacer 18C shown in FIG. 13A includes projections 18b provided by forming cuts 18c in a base portion 18a and bending the portions surrounded by the cuts upward. With this structure, the spacer 18C can be easily made from a single metal plate, which is advantageous for reducing the manufacturing cost.

Figure 13A:
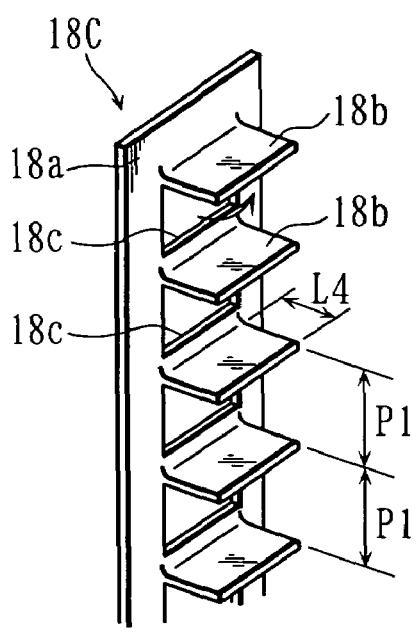
FIGS. 13A and 13B each is a perspective view showing a principal portion of another example of spacer.
Figure 13B:
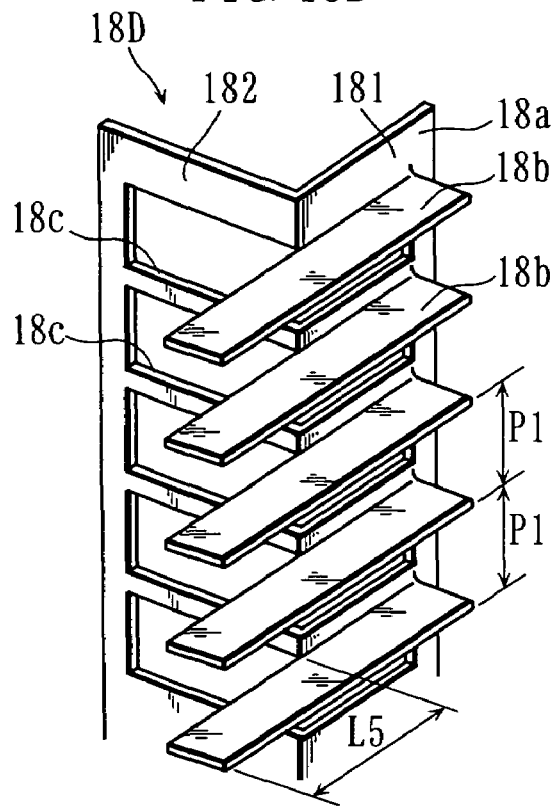

In the spacer 18D shown in FIG. 13B, the base portion 18a has an L-shaped cross section made up of a first and a second plate portions 181 and 182. Cuts 18c are formed continuously over the first and the second plate portions 181 and 182. The projections 18b formed by the cutting and bending are separated from the second plate portion 182 to partially project from the first plate portion 181. In the spacer 18C shown in FIG. 13A, to increase the projection dimension L4 of each projection 18b is difficult when the distance P1 between adjacent projections 18b is small. On the other hand, in the spacer 18D shown in FIG. 13B, the projection dimension L5 of each projection 18b can be increased regardless of the distance P1.

Figure 14A:
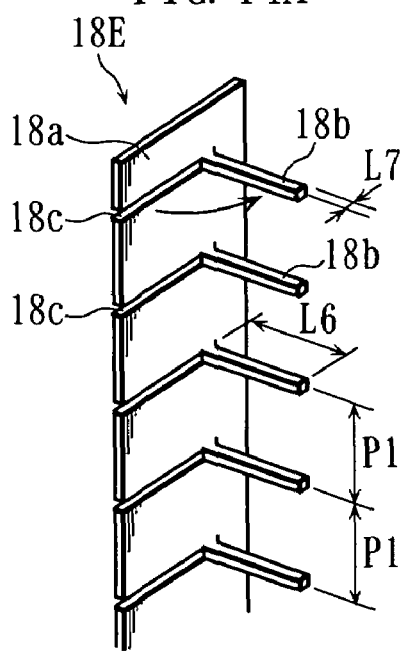
FIGS. 14A and 14B each is a perspective view showing a principal portion of another example of spacer.

The spacer 18E shown in FIG. 14A includes projections 18b provided by forming cuts 18c in the base portion 18a and bending the portions surrounded by the cuts 18c horizontally. With this structure, the projection dimension L6 can be increased regardless of the distance P1 between the projections 18b. Although the width L7 of each projection 18b is small, there is no problem because the width L7 does not need to be large.

Figure 14B:
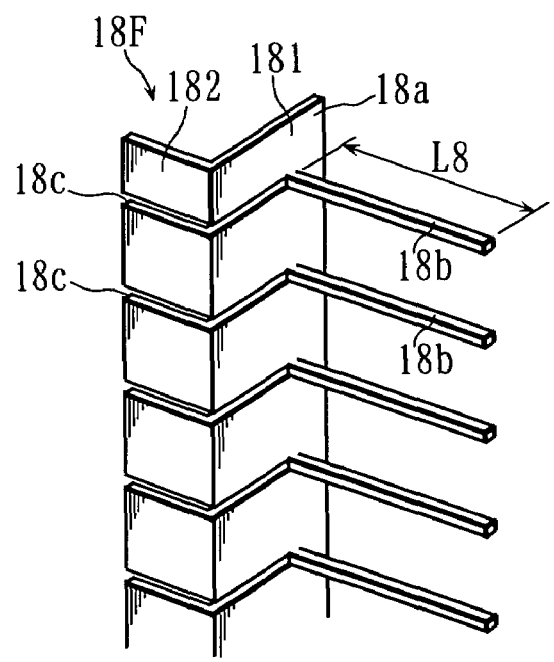

Similarly to the spacer 18D shown in FIG. 13B, the base portion 18a of the spacer 18F shown in FIG. 14B has an L-shaped cross section made up of a first and a second plate portions 181 and 182. The cuts 18c for forming the projections 18a by bending are formed over the first and the second plate portions 181 and 182. With this structure, the projection dimension L8 of each projection 18b can be further increased without increasing the entire width of the base portion 18a.

Figure 15:
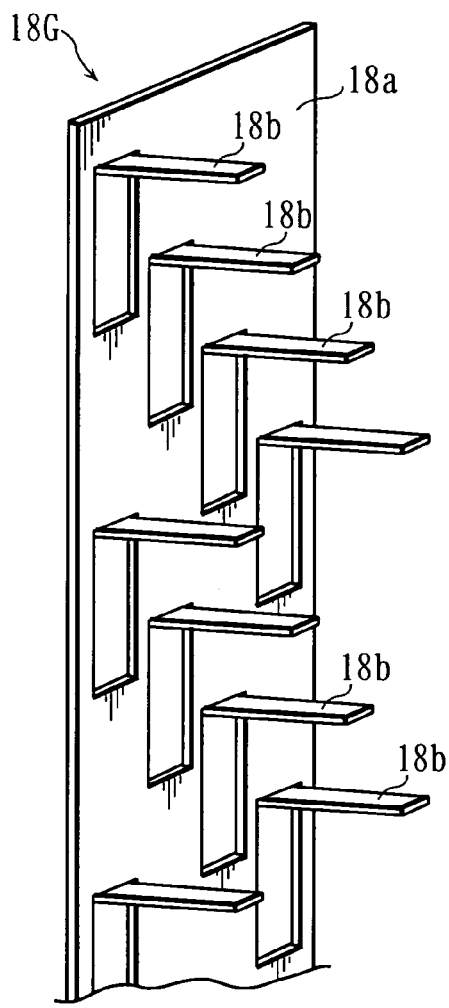
FIG. 15 is a perspective view showing a principal portion of another example of spacer.

In the spacer 18G shown in FIG. 15, a plurality of projections 18b provided by cutting and bending the base portion 18a are grouped into sets of e.g. four projections. The projections 18b in each set are arranged obliquely. With this structure, a large number of projections 18b can be arranged like teeth of a comb in a space-saving manner without increasing the entire width of the spacer 18.

Figure 16:
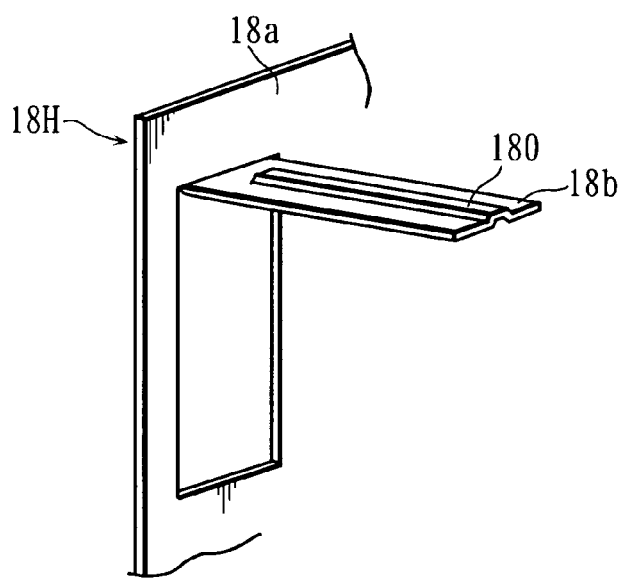
FIG. 16 is a perspective view showing a principal portion of another example of spacer.

The spacer 18H shown in FIG. 16 includes projections 18b each formed with a stepped portion 180 formed by press-working the projection. With this structure, the maximum thickness of the projection 18b can be made larger than the thickness of the base portion 18a. Further, by forming the stepped portions 180 having different heights, clearances 61 having different dimensions can be formed similarly to the embodiments described later.

Figure 17B:
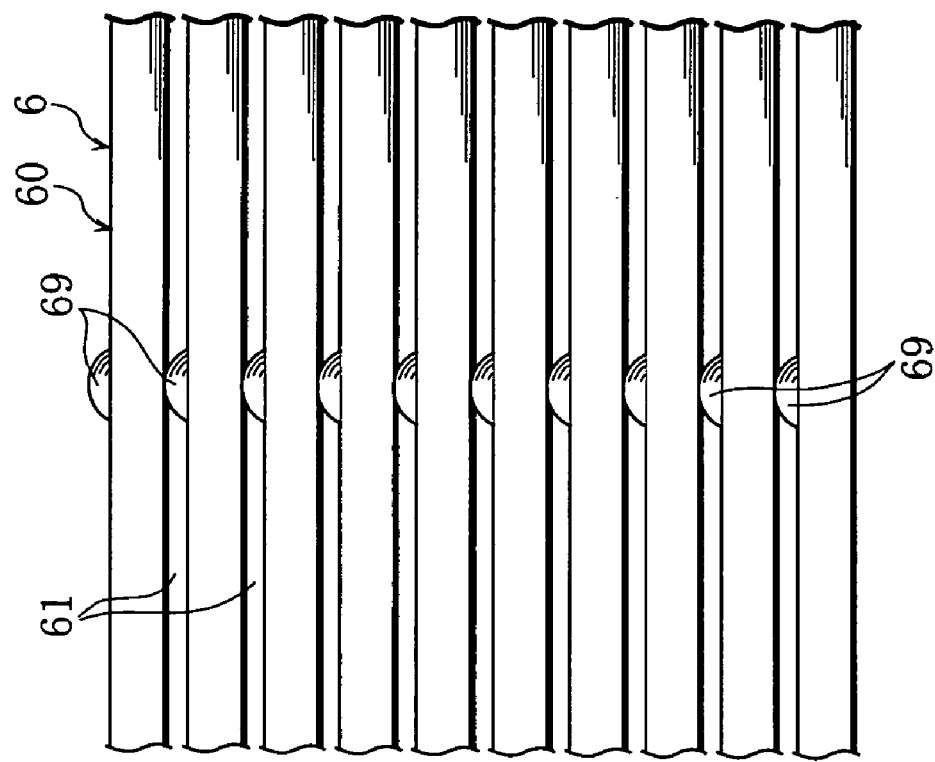
FIG. 17B is a left side view of a principal portion of FIG. 17A.
Figure 17A:
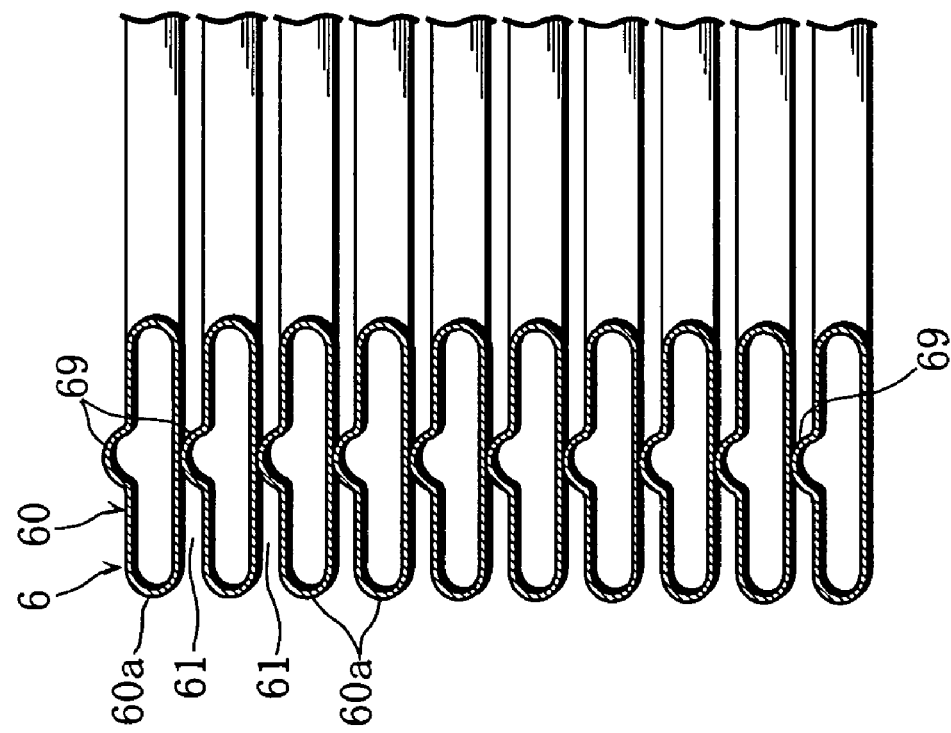

In the embodiment shown in FIGS. 17A and 17B, each of the loops 60 of the coiled tube 60 has an outer surface formed with a projection 69. The loops 60a which are adjacent to each other in the height direction are held in contact with each other via the projection 69.

With this structure, a clearance 61 of a desired dimension can be defined between adjacent loops 60a without using a spacer. Therefore, the mounting of a spacer is unnecessary, which facilitates the assembling of the heat exchanger. The specific shape, size and number of the projections 69 are not limitative.

Figure 18A:
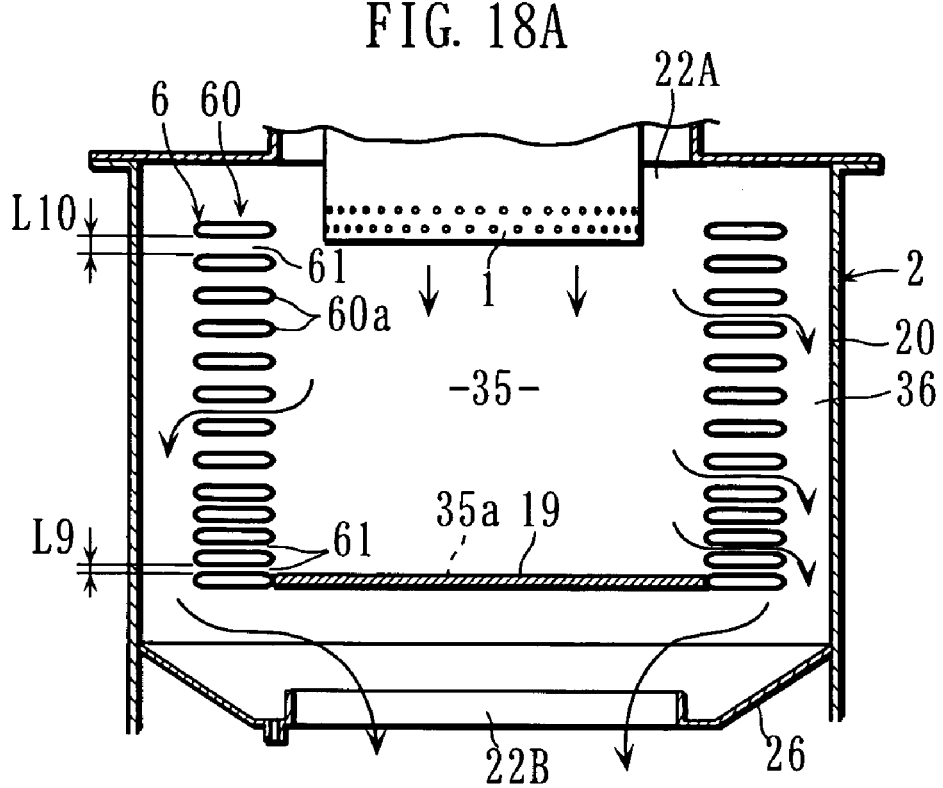
FIGS. 18A and 18B each is a sectional view showing an example of non-uniform pitch of a coiled tube.

In the embodiment shown in FIG. 18A, the plurality of clearances 61 of the coiled tube 60 have different dimensions. Specifically, the dimension L9 of the clearances 61 in a lower region of the coiled tube 60 is smaller than the dimension L10 of the clearances 61 in an upper region. In the temperature distribution in the space 35, the temperature in a lower region is likely to be higher than the temperature in an upper region, because the burner 1 performs combustion downwardly. Therefore, by forming clearances 61 of a smaller dimension L9 in the region which is likely to become hot, the high-temperature combustion gas can sufficiently come into contact with the coiled tube 60, whereby the amount of heat transfer is increased.

Figure 18B:
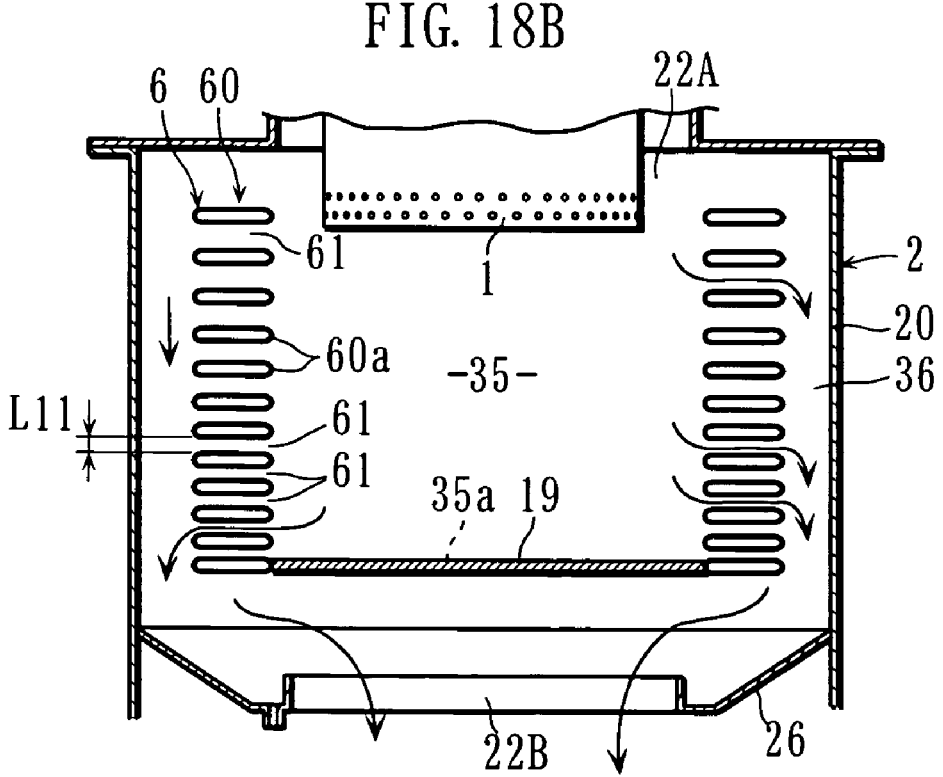

In the embodiment shown in FIG. 18B, the dimension L11 of the clearances 61 gradually reduces as proceeding downward from top to bottom of the coiled tube 60. With this structure, the same advantages as those of the embodiment shown in FIG. 18A are obtained. In the present invention, clearances 61 of different dimensions may be provided in a manner other than those described above. For example, the dimension of the clearances 61 may be changed in three steps of large, medium and small or in a larger number of steps. Depending on the characteristics of the burner 1 or other conditions, the temperature in the lower region of the space 35 may not necessarily be higher than that in the upper region, and the temperature in the upper region may be higher. In such a case, conversely to the foregoing embodiment, the dimension of the clearances 61 in the upper region of the coiled tube 60 may be made smaller than that of the clearances 61 in the lower region.

Figure 19A:
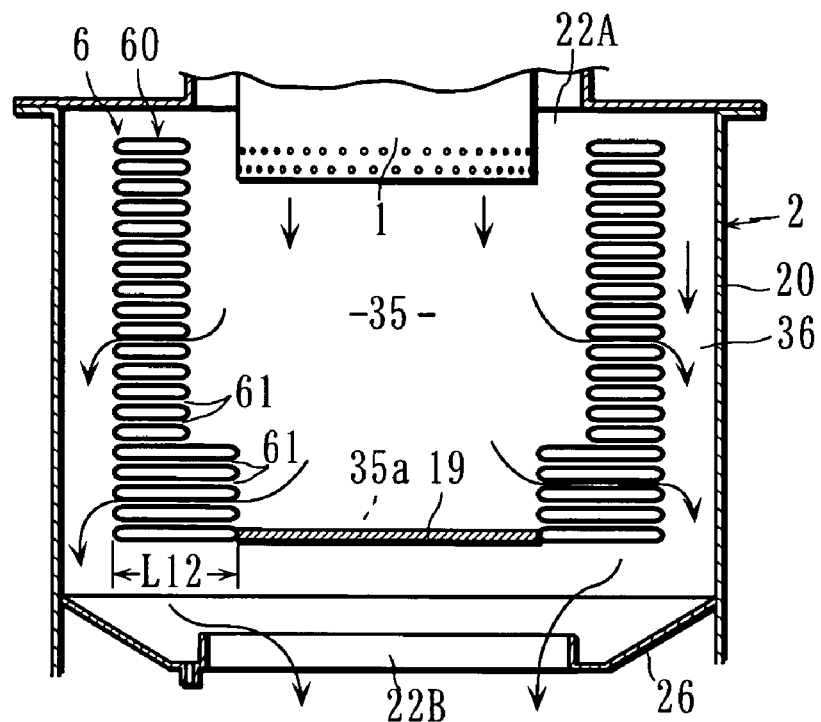
FIGS. 19A and 19B each is a sectional view showing an example of non-uniform width of a coiled tube.

In the embodiment shown in FIG. 19A, the width L12 of the flat tube, which forms the coiled tube 60, is larger in a lower region than in an upper region of the coiled tube 60. With this structure again, the high-temperature combustion gas at a lower region of the coiled tube 60 can sufficiently come into contact with the lower region of the coiled tube 60, whereby the amount of heat transfer is advantageously increased.

Figure 19B:
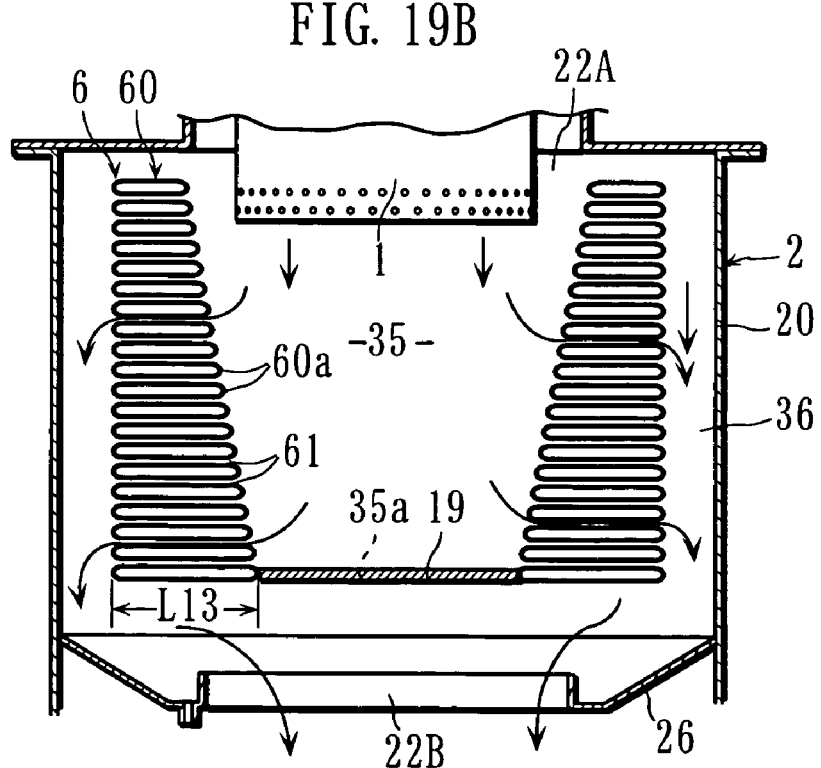
Figure 21A:
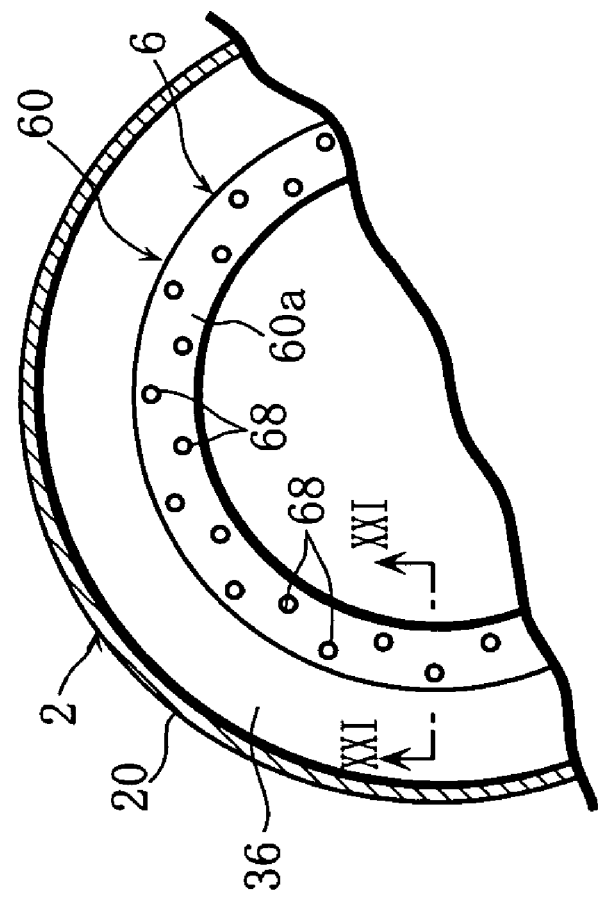
Figure 21B:
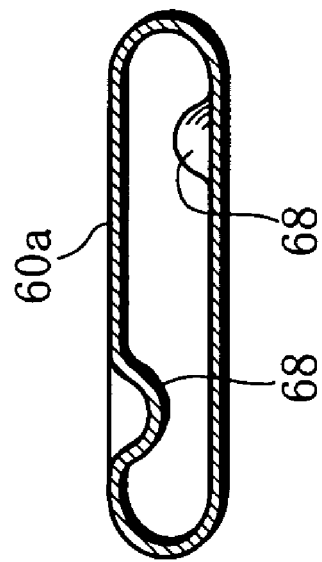
FIG. 21B is a sectional view taken along lines XXI-XXI in FIG. 21A.
Figure 22A:
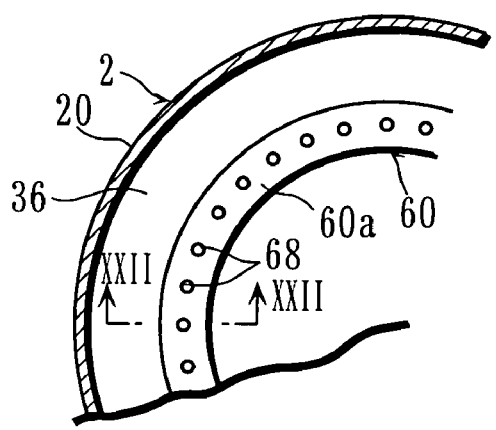
Figure 22B:
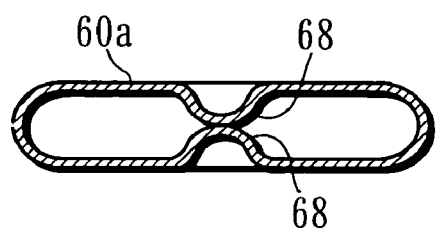
FIG. 22B is a sectional view taken along lines XXII-XXII in FIG. 22A.
Figure 23A:
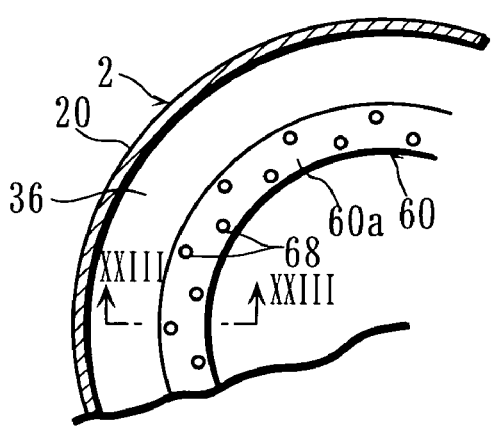
Figure 23B:
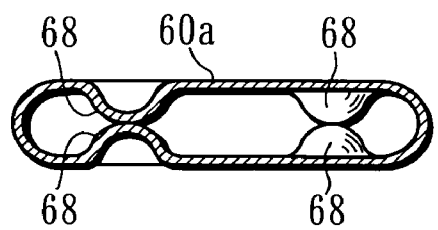
FIG. 23B is a sectional view taken along lines XXIII-XXIII in FIG. 23A.
Figure 24A:
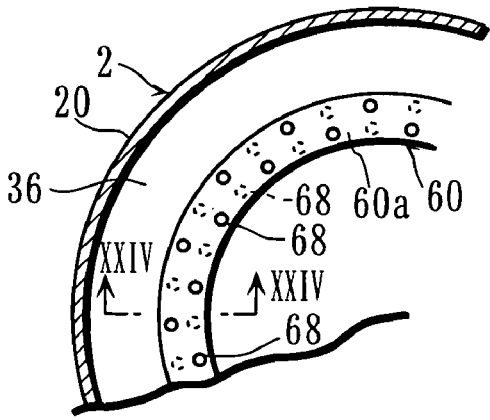
Figure 24B:
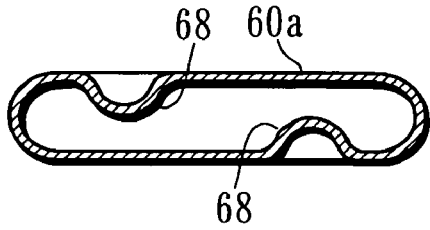
FIG. 24B is a sectional view taken along lines XXIV-XXIV in FIG. 24A.

In the embodiment shown in FIG. 19B, the width L13 of the flat tube gradually increases as proceeding from top to bottom of the coiled tube 60. With this structure again, the same advantages as those of the embodiment shown in FIG. 19A are obtained. Similarly to the instance in which clearances 61 of different sizes are provided, the flat tube of non-uniform width may be provided in various ways. Depending on the temperature distribution of the combustion gas, the width may be made larger in the upper region than in the lower region of the coiled tube 60.

In the embodiment shown in FIGS. 20A and 20B, the loop 60a of the coiled tube 60 is formed with a plurality of projections 68 projecting inward and appropriately spaced from each other. With this structure, the water flowing through the loop 60a forms turbulence, so that the film coefficient in the tube is increased. Therefore, the heat exchange efficiency is enhanced.

FIGS. 21-24 show other examples of projections 68 formed in the coiled tube 60 to form turbulence therein. In the structure shown in FIGS. 21A and 21B, a plurality of projections 68 are formed on each of the upper and the lower surfaces of the loop 60a in a staggered arrangement. In the structure shown in FIGS. 22A and 22B, projections 68 formed on the upper surface of the loop 60a and those formed on the lower surface of the loop face each other to come into contact or locate close to each other. In the structure shown in FIGS. 23A and 23B, a plurality of pairs of projections 68, each pair consisting of projections facing each other and held in contact with or close to each other, are provided in a staggered arrangement. In the structure shown in FIGS. 24A and 24B, a plurality of projections 68 are formed in a staggered arrangement on each of the upper and the lower surfaces of the loop 60a. The projections on the upper surface and those on the lower surface of the loop are positionally deviated so as not to face each other. As will be understood from these examples, the projections 68 for forming turbulence can be provided in various manners, and any manner can be employed in the present invention.

Figure 25A:
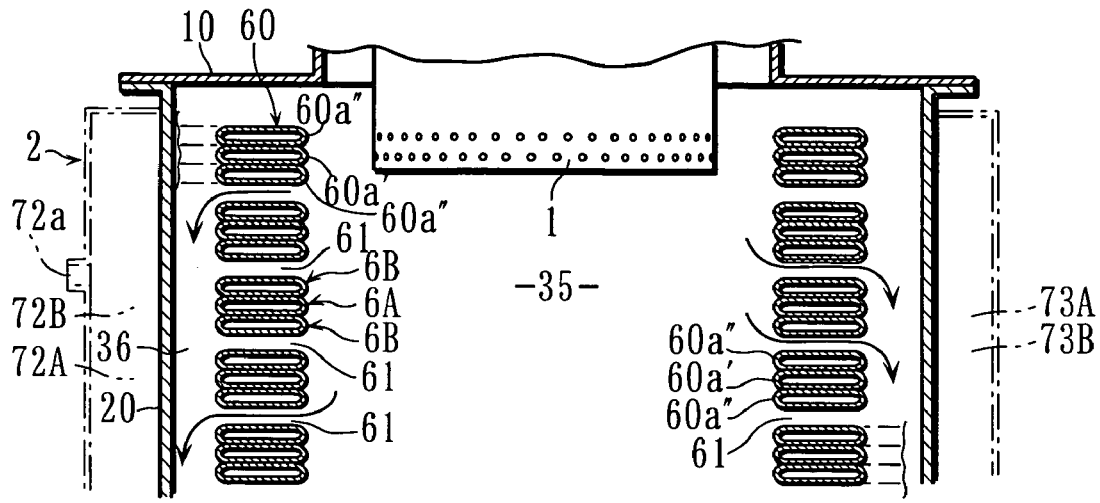
Figure 25B:
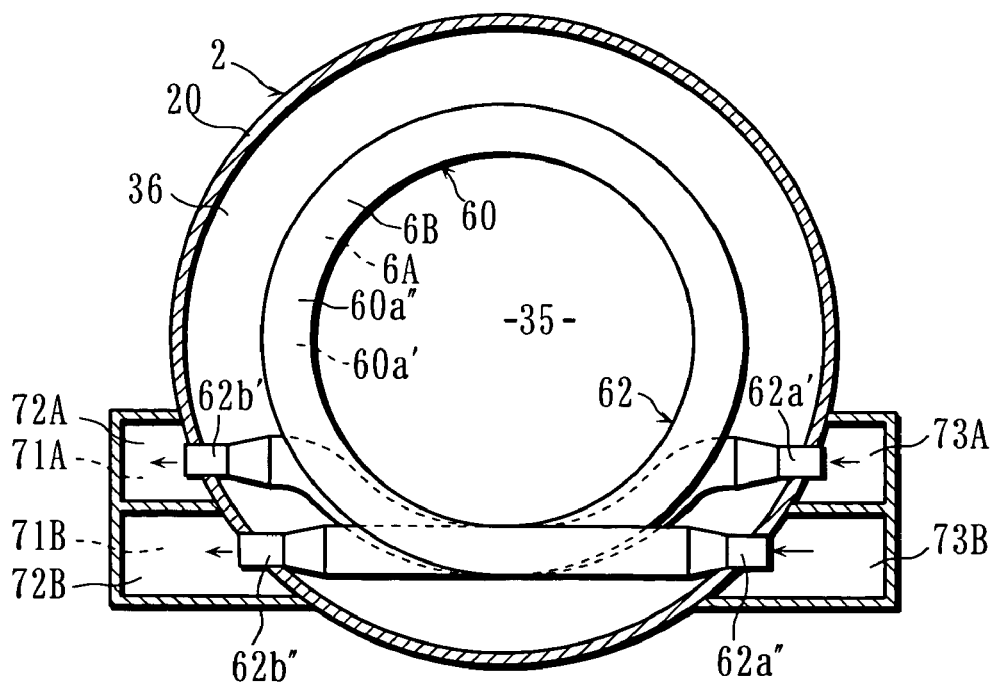
FIG. 25B is a horizontal sectional view of the principal portion.

FIGS. 25A and 25B show a heat exchanger with one housing and two water paths, which includes a water tube 6A and two water tubes 6B for different hot-water supply destinations. For example, the water tube 6A may be utilized for supplying hot-water to a kitchen, whereas the water tubes 6B may be utilized for supplying hot-water to a bath. Each of the loops 60a' of the water tube 6A is sandwiched between and held in contact with the loops 60a" of the two water tubes 6B. In this embodiment, three loops 60a', 60a" in all are combined into one set, and a clearance 61 for passing the combustion gas is defined between the adjacent sets. As better shown in FIG. 25B, the header for the water tubes includes a water inflow chamber 71A, a hot-water outflow chamber 72A and a common chamber 73A, to which opposite ends 62a', 62b' of a plurality of tube modules 62 constituting the water tube 6A are connected. The header further includes a water inflow chamber 71B, a hot-water outflow chamber 72B and a common chamber 73B, to which opposite ends 62a", 62b" of a plurality of tube modules 62 constituting the water tubes 6B are connected. With this structure, water flowing through the water tubes 6A and 6B are prevented from mixing.

In the above-described structure, when hot water is to be supplied only to the kitchen, for example, water flow is performed only in the water tube 6A, and the water in the water tubes 6B remains in the tube. Conceivably, when the burner 1 is driven to perform hot water supply to the kitchen, the water remaining in the water tubes B may be heated and boil. In this embodiment, however, heat transfer is performed between the water tubes 6A and 6B, so that such boiling is properly prevented. Conversely, when water flow is performed only in the water tubes 6B, the boiling of the water in the water tube 6A is prevented in a similar way. Since the water tubes 6A, 6B are made of flat tubes, the heat transfer area is advantageously large. For a heat exchanger with one housing and two water paths, it is sometimes necessary to perform water flow in both of the two kinds of water tubes to supply hot water to e.g. both of a kitchen and a bath at the same time. Since the heat exchanger and the water heater according to the present invention have high heat exchange efficiency and are capable of increasing the amount of hot water to be supplied, the structure with one housing and two water paths can be suitably employed.

Figure 26A:
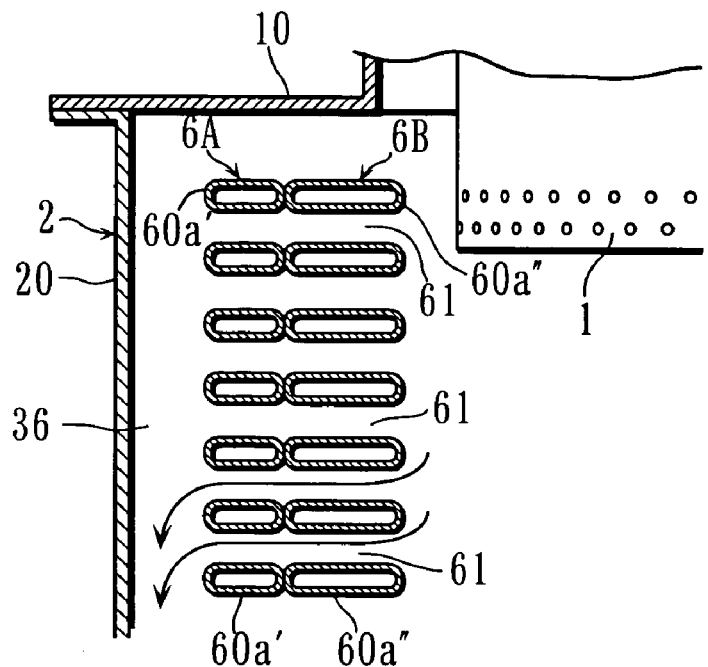
Figure 26B:
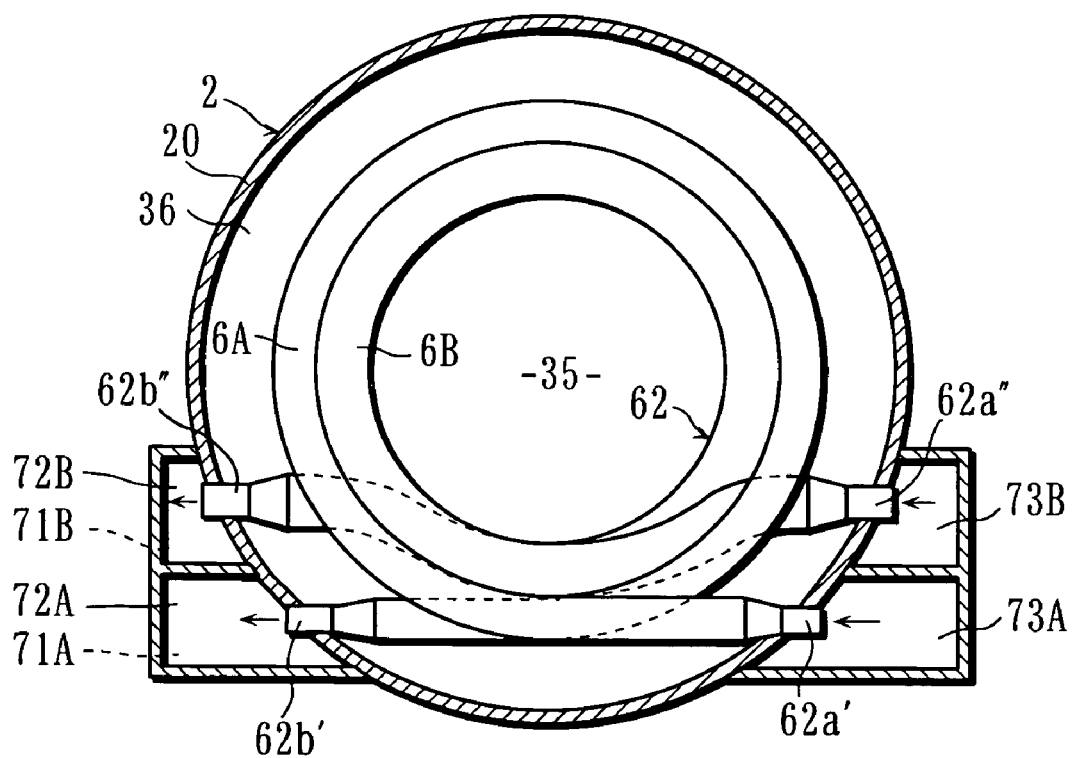
FIG. 26B is a horizontal sectional view of the principal portion.
Figure 27:
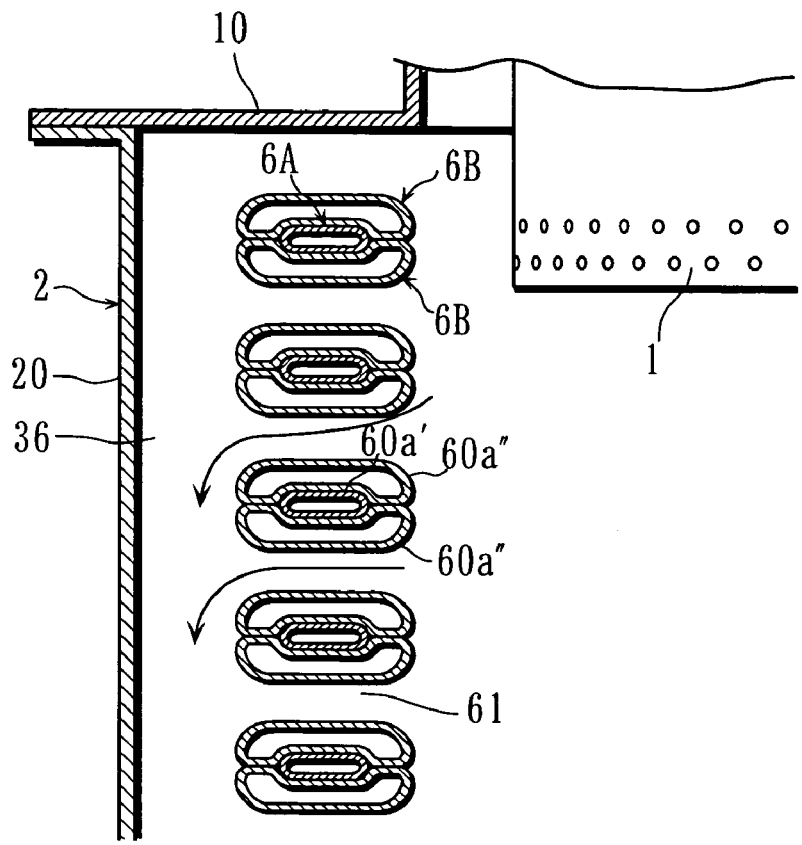
FIG. 27 is a sectional view showing a principal portion of another example of structure in which a plurality of heat-exchange water tubes are held in contact with each other.
Figure 28:
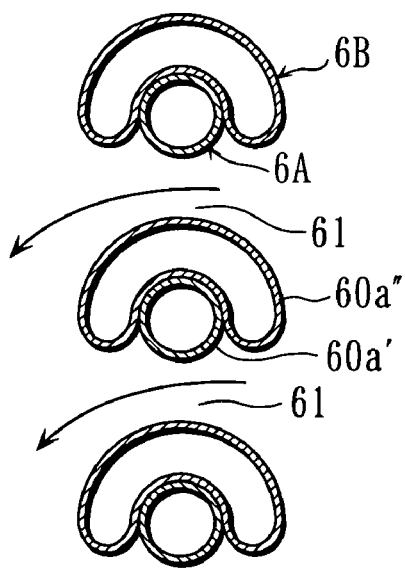
FIG. 28 is a sectional view showing a principal portion of another example of structure in which a plurality of heat-exchange water tubes are held in contact with each other.

In the embodiment shown in FIGS. 26A and 26B, loops 60a' and 60a" of two kinds of water tubes 6A and 6B are paired and arranged side by side in contact with each other in the radial direction of the coiled tube 60. As better shown in FIG. 26B, the structure of a header for connecting the water tubes 6A, 6B is basically the same as that of the foregoing embodiments, although the positional relationship of each part is different. In the structure shown in FIG. 27, the loops 60a" of two water tubes 6B surround the entire circumference of the loop 60a' of the water tube 6A in contact with the loop 60a'. In the structure shown in FIG. 28, the water tube 6A comprises a circular pipe, and the water tube 6B surrounds approximately half of the circumference of the water tube 6A in contact therewith. As will be understood from these embodiments, in the present invention, the two kinds of tubes 6A and 6B can be held in contact with each other in various ways. However, a structure in which the contact area between the two kinds of tubes is large is preferable, because a larger contact area provides a larger amount of heat transfer and more reliably prevents boiling of water in a water tube which is not used.

Figure 29A:
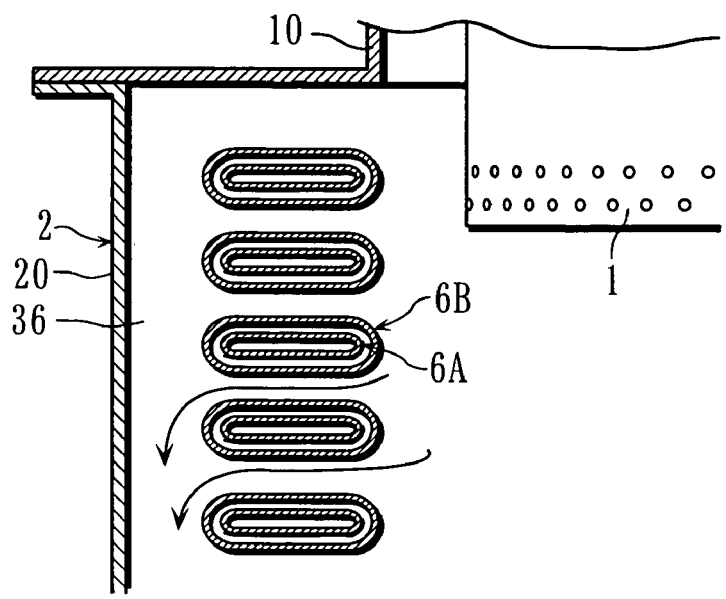
Figure 29B:
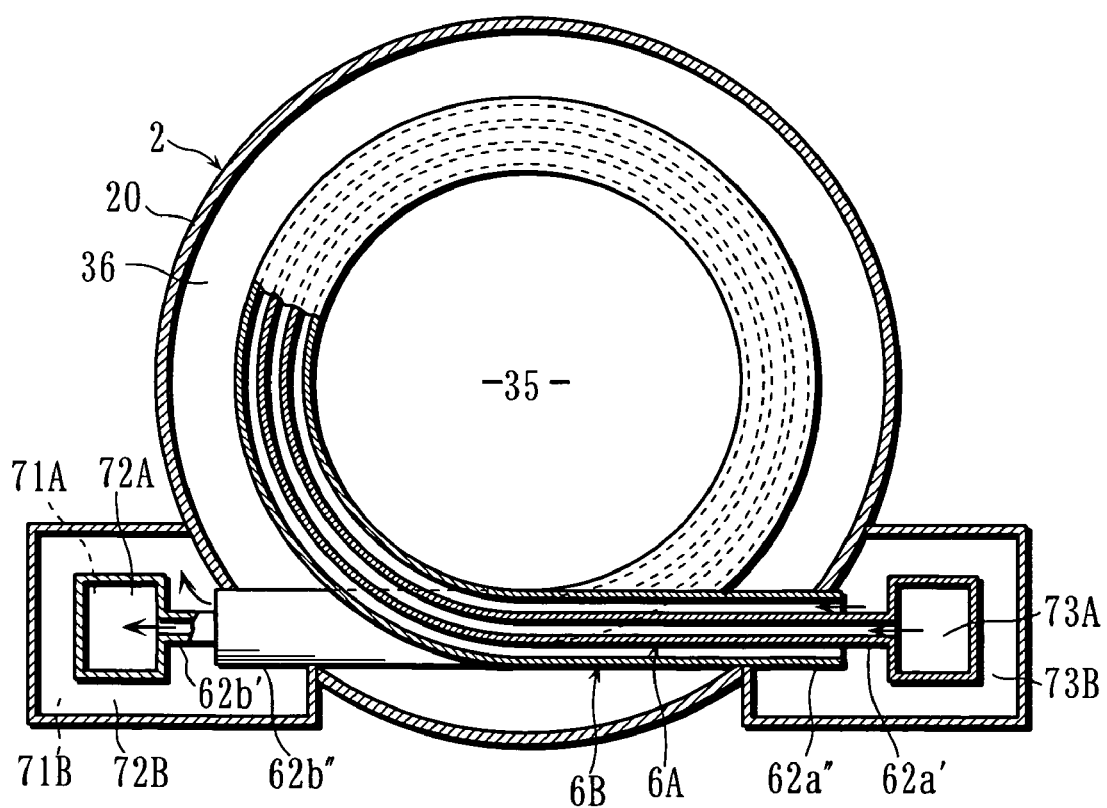
FIG. 29B is a horizontal sectional view thereof partially cut away.

In the embodiment shown in FIGS. 29A and 29B, the water tube has a double tube structure including an inner tube 6A and an outer tube 6B. Since the water flow in the inner tube 6A and the water flow in the space between the inner tube 6A and the outer tube 6B need to be performed individually, the water inflow chambers 71A, 71B, the hot-water outflow chambers 72A, 72B and the common chambers 73A, 73B, to which opposite ends of the tubes are connected, also have a double structure, respectively.

With such a structure again, hot water can be supplied individually to two destinations. The water existing between the inner tube 6A and the outer tube 6B performs heat transfer with the water in the inner tube 6A via the inner tube 6A. Therefore, when the water in either location only is utilized for hot water supply, boiling of the water in the other location can be properly prevented.

In the embodiment shown in FIG. 30A, the circumferential wall 20 of the housing 2 is generally semi-cylindrical or close to semi-cylindrical. In the embodiment shown in FIG. 30B, the circumferential wall 20 of the housing 2 is in the form of a rectangular cylinder. In both of the embodiments, the loop 60a of the water tube 6 is generally annular.

With such a structure, the width L14 of the combustion gas path 36 is different between locations, and the combustion gas path includes a wider portion and a narrower portion. In the foregoing embodiments shown in FIGS. 1 to 5, since the circumferential wall 20 of the housing 2 is generally cylindrical, the width of the combustion gas path 36 is generally uniform, so that the flow rate and flow velocity of the combustion gas are generally equal at any portion of the combustion gas path 36. In this embodiment, on the other hand, the flow rate and flow velocity of the combustion gas in the combustion gas path 36 can be caused to be non-uniform so as to meet with the actual use conditions of the water heater. Further, since the opposite ends 62a and 62b of the water tube 6 and the neighboring portions extend across the combustion gas path 36 by a relatively long distance, these portions can also be utilized for heat exchange.

Figure 31:
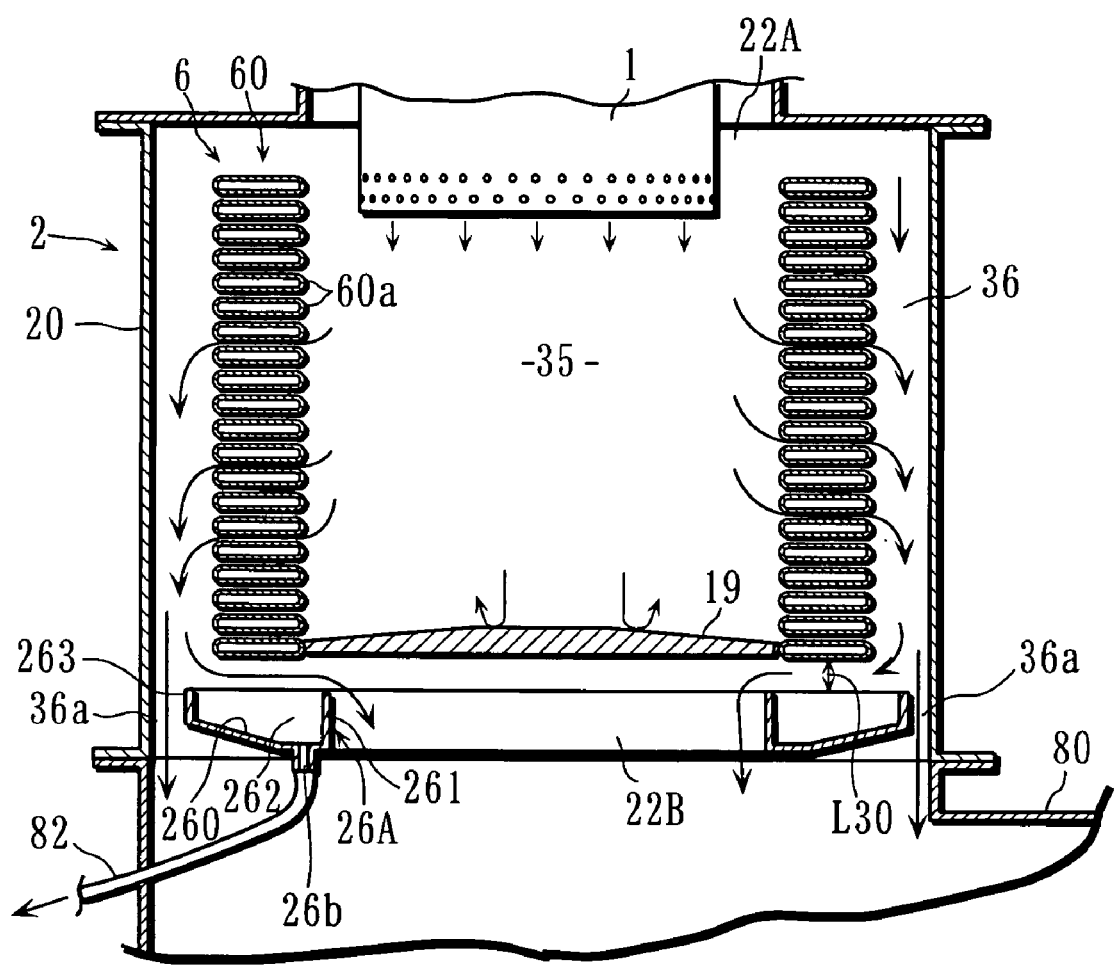
FIG. 31 is a sectional view showing a principal portion of another example of drain receiving portion of the heat exchanger.

In the embodiment shown in FIG. 31, the standing wall 263 formed at the outer circumference of the drain receiving portion 26A is spaced from the circumferential wall 20 of the housing 2 to define therebetween a clearance 36a serving as a combustion gas outlet. With this structure, the combustion gas flowing downward through the combustion gas path 36 can pass through the clearance 36a and the combustion gas outlet 22B to enter the bottom casing 80. Therefore, even when the dimension L30 of the space between the coiled tube 60 and the drain receiving portion 26A is reduced to reduce the entire height, for example, and hence, the amount of the combustion gas flowing toward the combustion gas outlet 22B is reduced, the combustion gas can be smoothly discharged through the clearance 36a.

Figure 32:
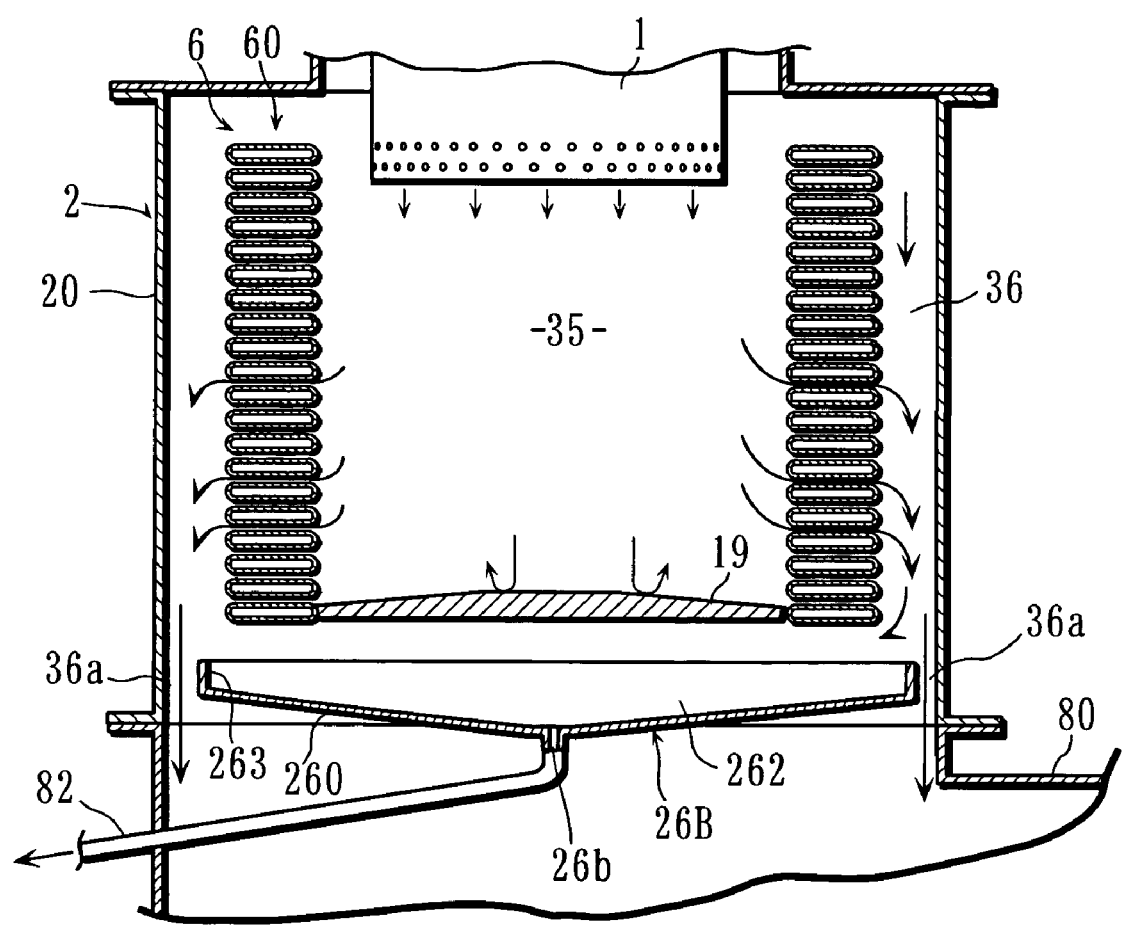
FIG. 32 is a sectional view showing a principal portion of another example of drain receiving portion of the heat exchanger.

In the embodiment shown in FIG. 32, while a clearance 36a is defined between the drain receiving portion 26B and the circumferential wall 20, the drain receiving portion 26B does not include a portion corresponding to the above-described combustion gas outlet 22B. Also with this structure, the combustion gas can be smoothly discharged by utilizing the clearance 36a as a combustion gas outlet.

Figure 33:
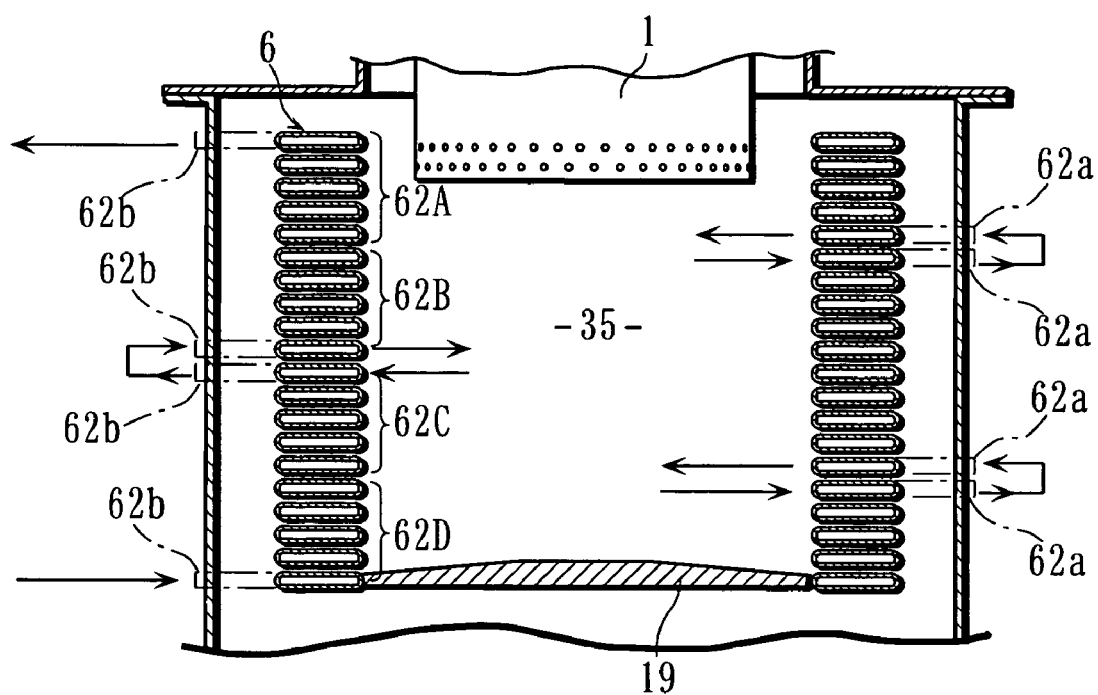
FIG. 33 is a sectional view showing a principal portion of another example of tube module connection structure in the heat exchanger.

In the structure shown in FIG. 33, except for the uppermost end 62b and the lowermost end 62b of the tube modules 62A-62D, the ends 62b which are adjacent to each other in the height direction are connected to each other, and similarly, the ends 62a which are adjacent to each other in the height direction are connected to each other.

With such a structure, when the water inflow is performed through the lowermost end 62b, for example, the water can flow from bottom to top continuously through the tube modules 62D, 62C, 62B and 62A in the mentioned order to be finally discharged through the uppermost end 62b. Therefore, the water flow similar to that in a water tube comprising a single helical tube is possible, so that the time period during which water passes through the water tube 6 and is heated is increased. This structure can also be employed in the present invention.

Figure 34:
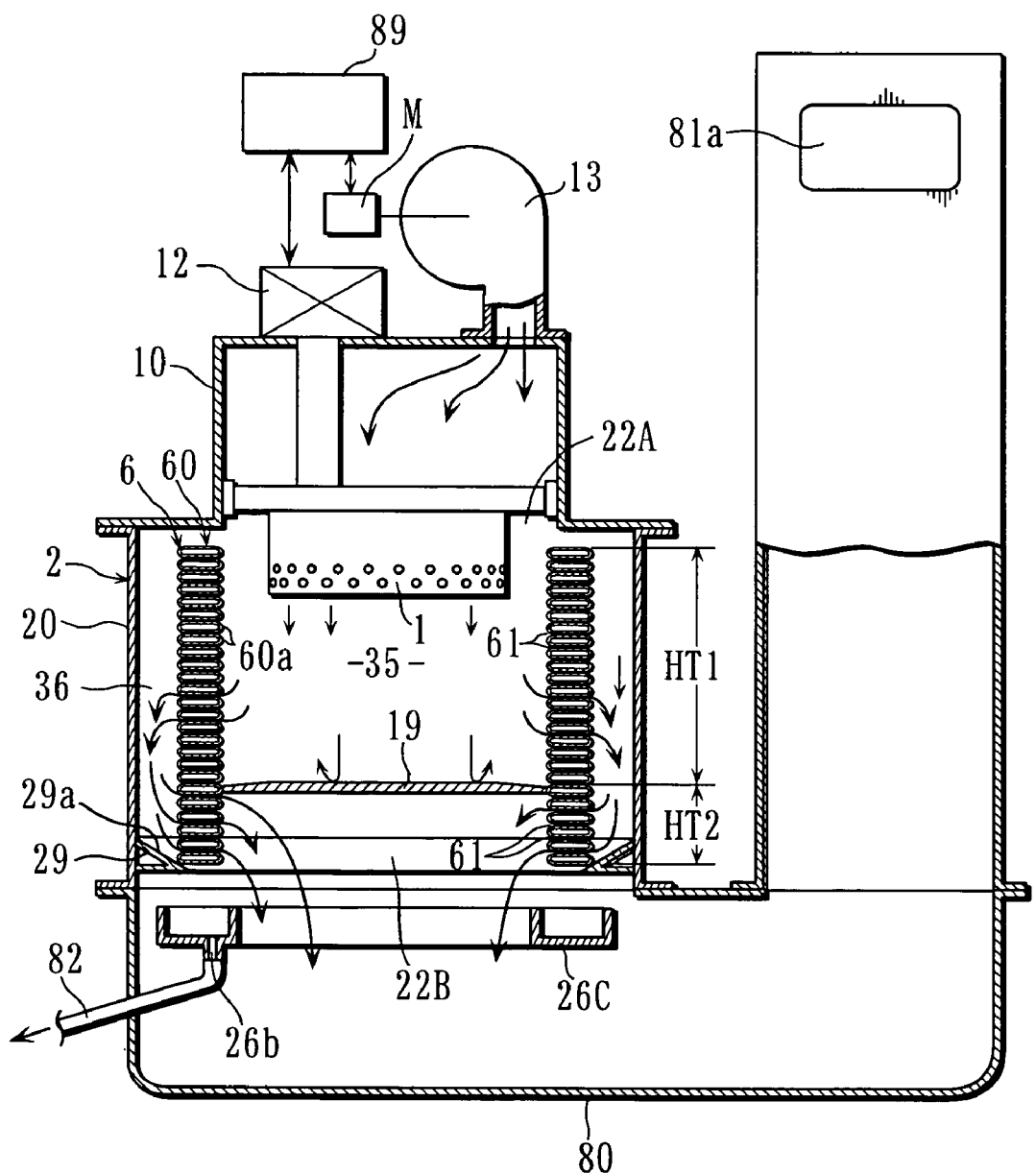
FIG. 34 is a schematic sectional view showing another example of heat exchanger and water heater incorporating the heat exchanger according to the present invention.

In the embodiment shown in FIG. 34, the partition 19 is positioned higher than the lower end of the space 35 so that the combustion gas generated by the burner 1 is prevented from directly flowing under the partition 19. In this way, in the present invention, the lower end of the space 35 may not be directly closed by the partition 19.

In the embodiment shown in this figure, a combustion gas stopper 29 for closing the bottom of the combustion gas path 36 is provided at a lower portion of the circumferential wall 20 of the housing 2. The combustion gas stopper 29 is ring-shaped and includes an inclined surface 29a which becomes lower as proceeding toward the radial center of the housing 2. The inclined surface 29a also serves as a guide for causing the drain to flow downward from the combustion gas outlet 22B. A drain receiving portion 26C for receiving the drain dropping from the combustion gas outlet 22B is provided in the bottom casing 81.

In this embodiment, the coiled tube 60 includes an upper region HT1 above the partition 19 which may be used for primary heat exchange, and a lower region HT2 below the partition which may be used for secondary heat exchange. Specifically, the combustion gas generated in the space 35 by the driving of the burner 1 flows through the clearances 61 of the upper region HT1 into the combustion gas path 36 and then passes through the clearances 61 of the lower region HT2 toward the combustion gas outlet 22B. With this structure, the sensible heat can be recovered from the combustion gas in the upper region HT1, and the latent heat can be recovered from the combustion gas in the lower region HT2.

Figure 35:
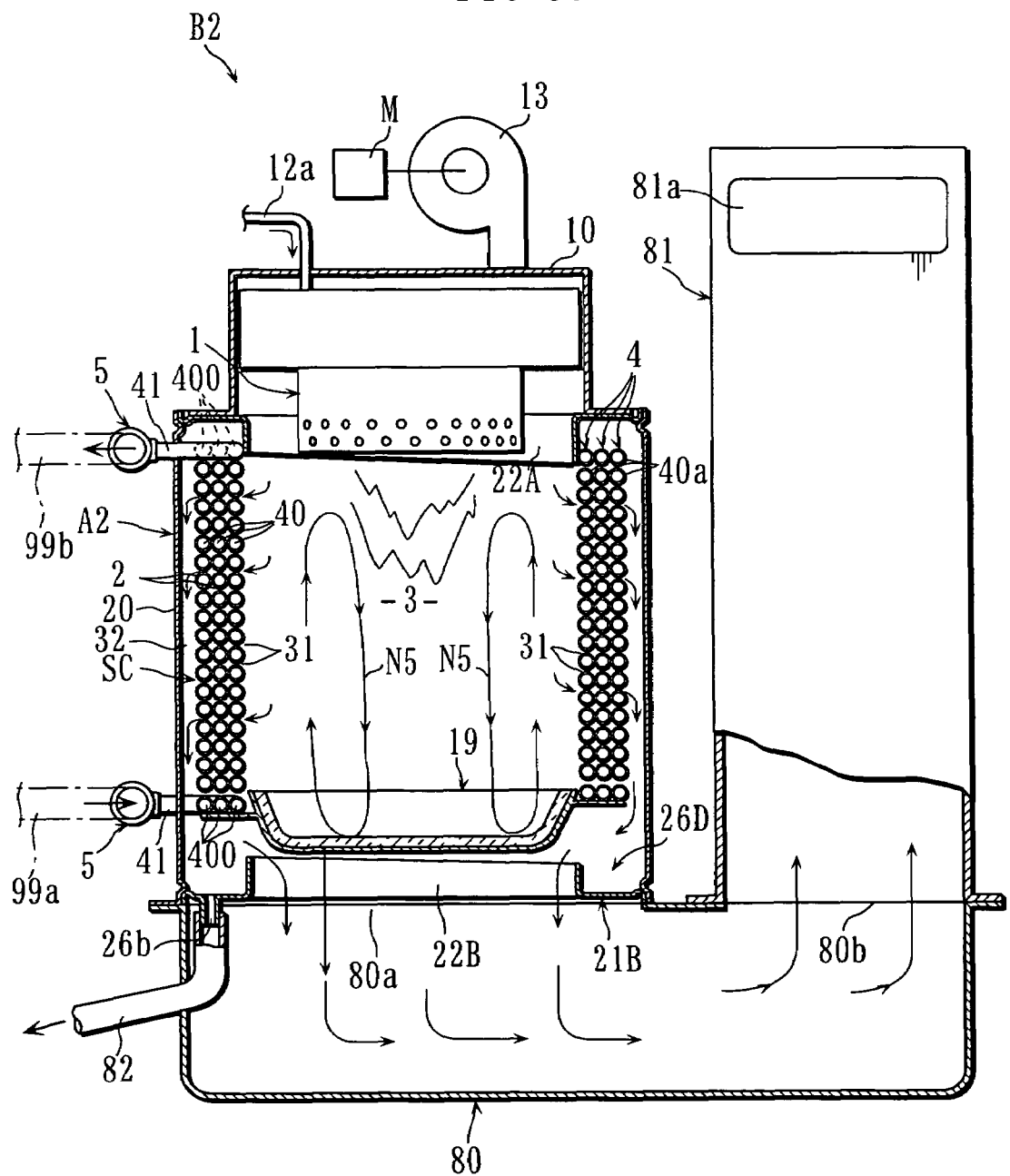
FIG. 35 is a schematic sectional view showing an example of heat exchanger and water heater incorporating the heat exchanger according to the present invention.

FIGS. 35 to 92 show a heat exchanger including a tube lap winding structure and embodiments related thereto. However, the contents of these embodiments include technical matters which are applicable to the above-described heat exchanger using a flat tube. Conversely, the technical matters described as to the heat exchanger using a flat tube are applicable to a heat exchanger using a tube lap winding structure.

FIG. 35 shows an example of heat exchanger and water heater incorporating the heat exchanger according to the present invention. FIGS. 36-39 show the structure of the heat exchanger and shown in FIG. 35 the related parts thereof. As better shown in FIG. 36, the heat exchanger A2 of this embodiment includes a housing 2, a plurality of water tubes 4, a pair of water inflow and hot-water outflow headers, and a partition 19. The plurality of water tubes 4 have a tube lap winding structure SC provided by arranging the coiled tubes 40 in a lap winding manner. Unlike the foregoing embodiments, each of the water tubes 4 comprises a round pipe.

The housing 2 includes a generally cylindrical circumferential wall 20 and a pair of covers 21A and 21B respectively mounted to an upper portion and a lower portion of the circumferential wall 20. Similarly to the foregoing embodiments, these members are made of stainless steel, for example. As will be described later, the circumferential wall 20 is formed by curving a generally rectangular stainless plate into a cylindrical shape and bonding a pair of edges 20a shown in FIG. 38 together. Each of the edges 20a is formed with a projection 20a' formed by bending the edge and projecting radially outward, and the projections 20a' are put together and welded. One or a plurality of brackets 23 for mounting the housing 2 to a desired position are welded to the outer surface of a lower portion of the circumferential wall 20.

Figure 36:
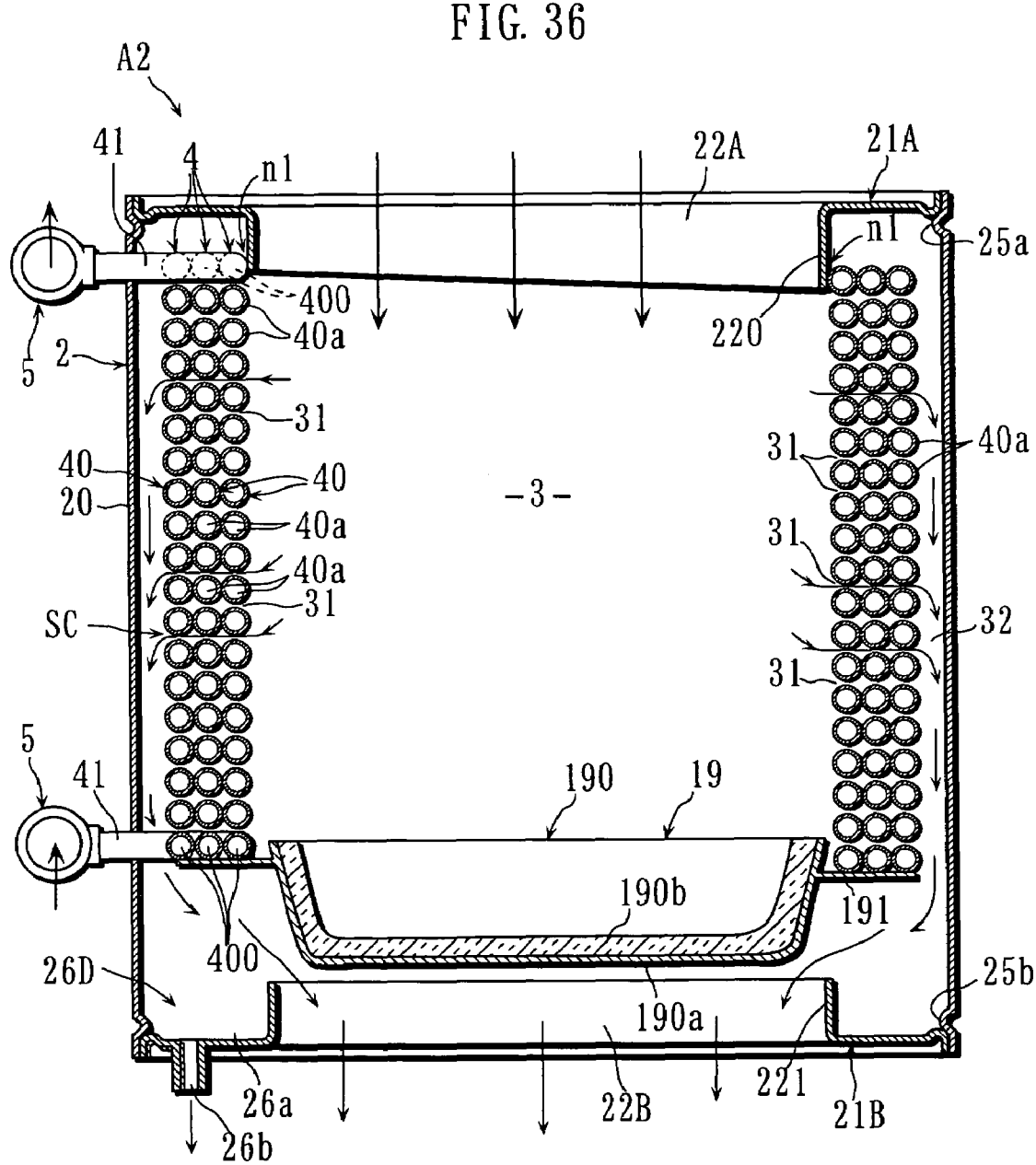
FIG. 36 is a sectional view of the heat exchanger shown in FIG. 35.
Figure 37:
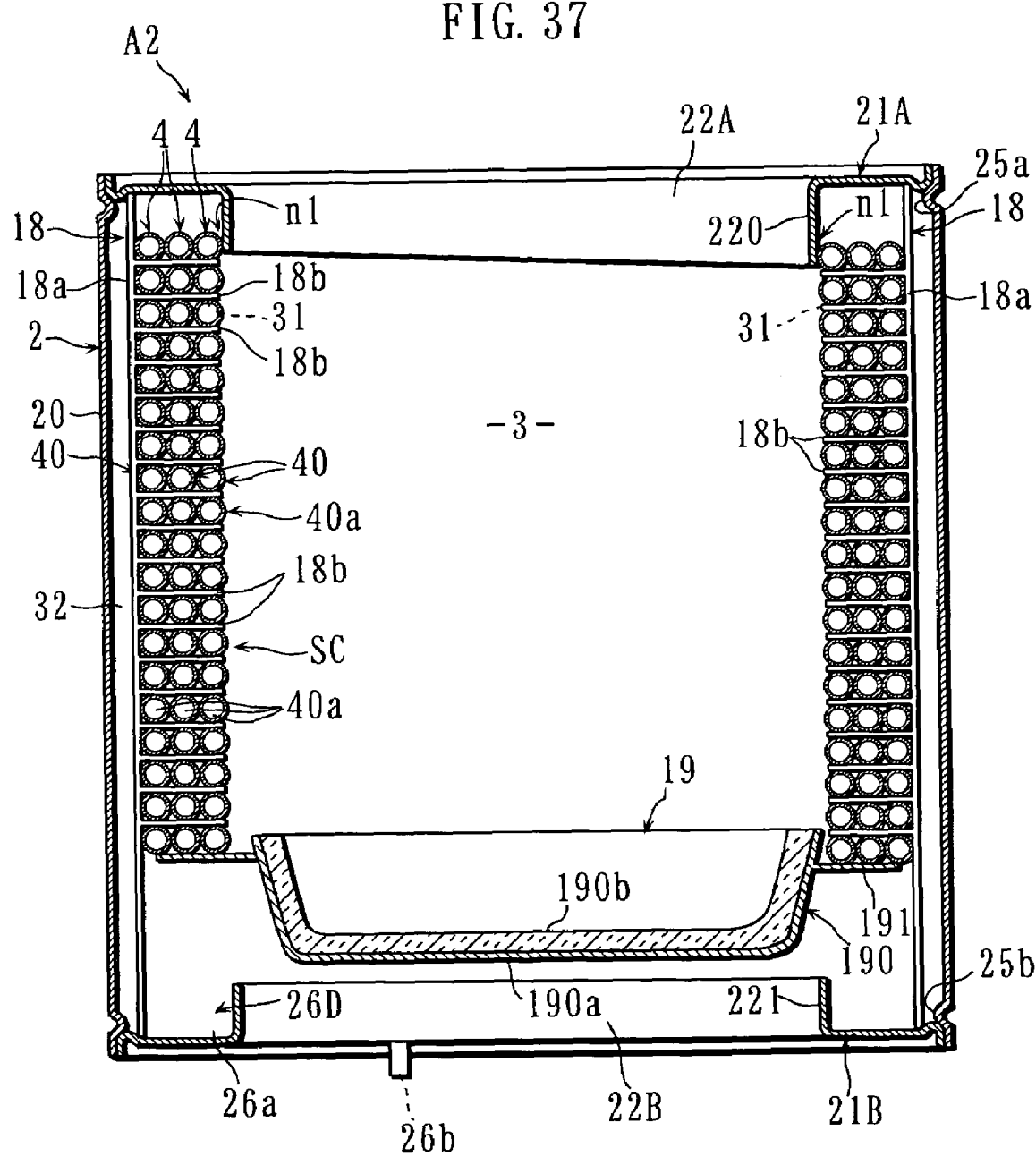
FIG. 37 is a sectional view of the heat exchanger shown in FIG. 35.

As better shown in FIGS. 36 and 37, the cover 21A comprises a generally circular plate formed with a burner opening 22A at the center thereof. Similarly to the foregoing embodiment, the burner opening 22A is utilized as a combustion gas introduction port for introducing the combustion gas generated at the burner into the housing 2 or as a portion for inserting a portion of the burner into the housing for mounting. The burner opening 22A is a burring hole including a circumferential annular wall 220 projecting downward. The cover 21A is fitted into the upper opening of the circumferential wall 20 and welded to the circumferential wall 20. A plurality of projections 25a projecting inward of the housing 2 are formed on the circumferential wall 20 at a portion close to the upper end thereof. The cover 21A is positioned by engaging the projections 25a. The projections 25a, which are formed by press working of the circumferential wall 20, are appropriately spaced from each other in the circumferential direction of the circumferential wall 20.

The cover 21B is formed with a combustion gas outlet 22B at the center thereof and comprises a generally circular plate similarly to the cover 21A. A plurality of projections 25b which are similar to the projections 25a are formed on the inner surface of the circumferential wall 20 at a portion close to the lower end. The cover 21A is fitted into the lower opening of the circumferential wall 20 to engage the projections 25b and welded to the circumferential wall 20. The combustion gas outlet 22B is a burring hole which is similar to the burner opening 22A and includes a circumferential annular wall 221 projecting upward. A drain receiving portion 26D for receiving drain dropping from the water tubes 4 is provided at the bottom of the housing 2. The drain receiving portion 26D is defined by the annular wall 221, a lower portion of the circumferential wall 20, an annular space 26a formed between the walls and the bottom portion thereof. The cover 21B is formed with a drain discharge port 26b for discharging drain received by the drain receiving portion 26D to the outside of the housing 2.

Each of the water tubes 4 includes a coiled tube 40 arranged in the housing 2 and a pair of bent tubes 41 connected to opposite ends 400 of the coiled tube. The heat exchanger 2 of this embodiment includes three water tubes 4. Each coiled tube 40 is a helical tube including a plurality of circular loops 40a stacked in the height direction of the housing 2. The coiled tubes 40 differ from each other in coil diameter, and the tube lap winding structure SC is provided by arranging the plurality of coiled tubes 40 concentrically or generally concentrically. Therefore, in the tube lap winding structure SC, the plurality of loops 40a are arranged not only along the height direction but also along the horizontal direction.

Figure 38:
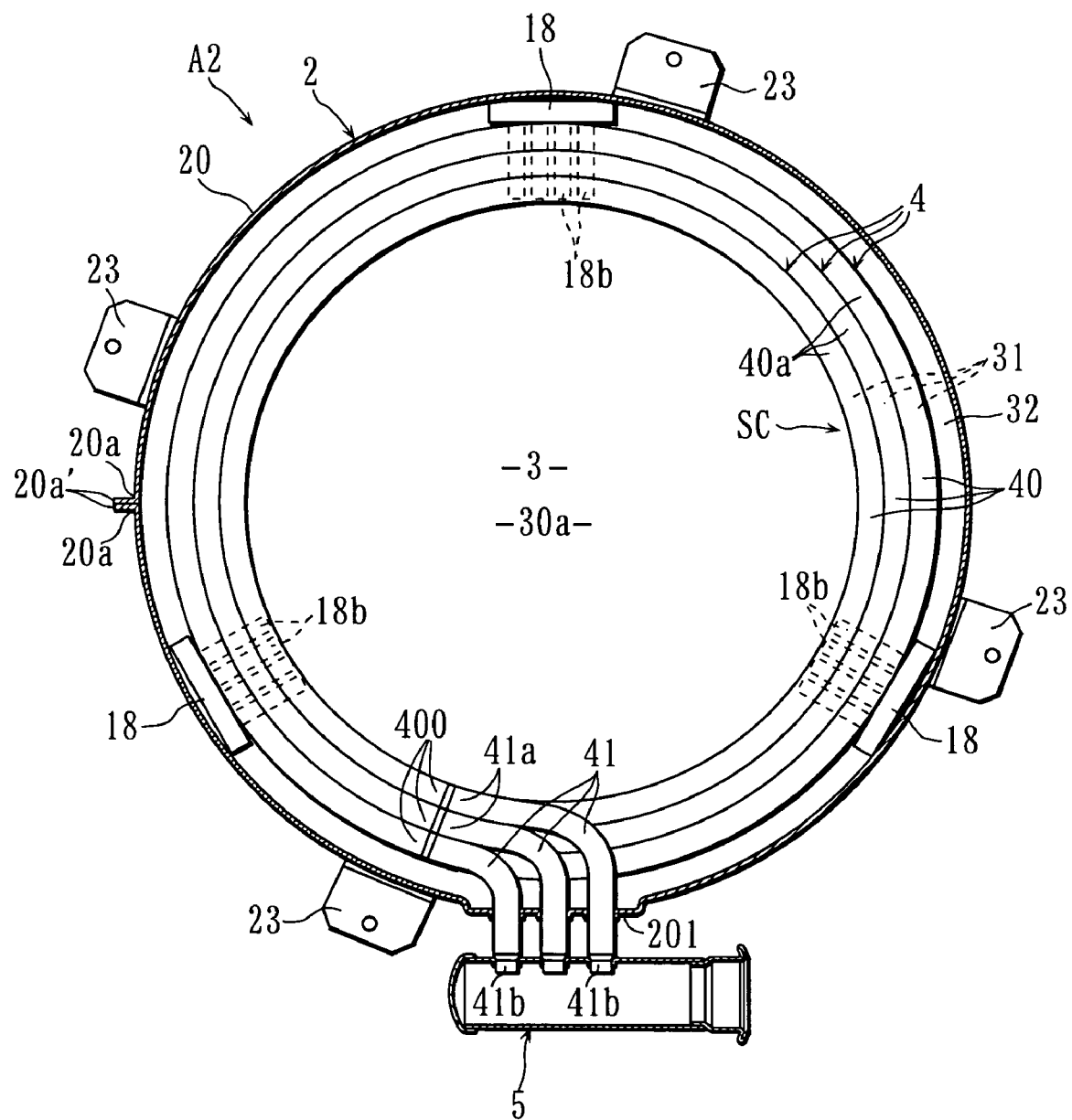
FIG. 38 is a horizontal sectional view of the heat exchanger shown in FIG. 35.
Figure 39:
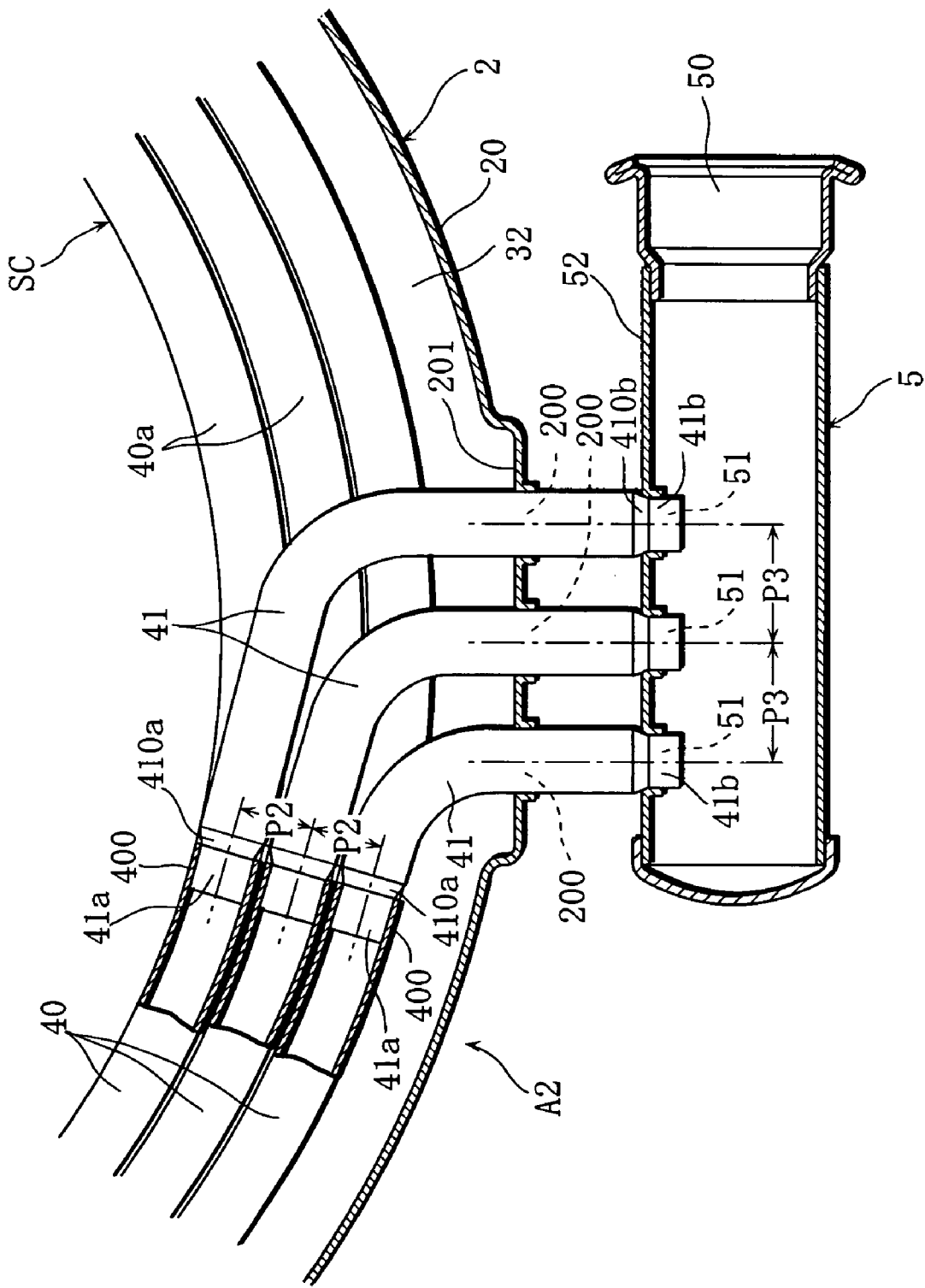
FIG. 39 is a sectional view of a principal portion of FIG. 38.
Figure 40:
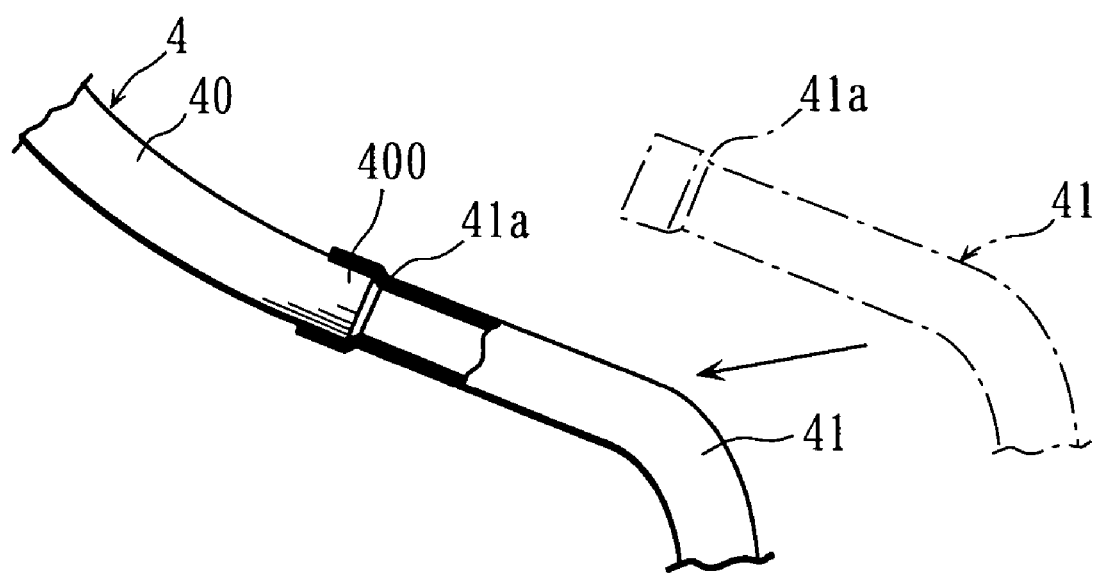
FIG. 40 is a sectional view showing a principal portion of another example of connection structure between a coiled tube and a bent tube constituting a water tube.

As better shown in FIGS. 38 and 39, the bent tubes 41 of the water tubes 4 serve as joint pipes for connecting the coiled tubes 40 to the headers 5. Each of the bent tubes 41 has an opposite pair of first and second ends 41a and 41b respectively formed with stepped portions 410a and 410b which include tapered surfaces. The portions closer to distal ends than the stepped portions 410a, 41b are smaller-diameter potions whose diameter is smaller than that of the longitudinally intermediate portion. The bent tube 41 is connected to the coiled tube 40 by fitting the smaller-diameter portion of the first end 41a to the end 400. The direction in which the smaller-diameter portion is fitted to the end 400 is the tangential direction of the loops 40a of the coiled tube 40. The tapered surface of the stepped portion 410a is held in contact with the end surface of the end 400, and the contact portion is subjected to welding or brazing. Alternatively, however, the water tube 4 and the bent tube 41 may be connected by connection means shown in FIG. 40, for example. In the connection means shown in the figure, the outermost portion of the first end 41a of the bent tube 41 is expanded and fitted around the end 400 of the water tube 4. Also by such means, the water tube 4 and the bent tube 41 can be connected properly by the fitting.

The bent tubes 41 are inserted into a plurality of openings 200 formed adjacent to upper and lower ends of the circumferential wall 20, and portions of the bent tubes 41 adjacent to the second ends 41b project out of the housing 2. The plurality of bent tubes 41 differ from each other in bending radius and total length, and the arrangement pitch P3 of the portions penetrating through the circumferential wall 20 and the second ends 41b is larger than the arrangement pitch P2 of the first ends 41a. With this structure, the connection of the headers 5 can be facilitated, and the strength of the portion formed with the openings 200 can be increased due to the large spacing between the openings 200. The portions of the bent tubes 41 adjacent to the second ends 41b extend straight in a direction perpendicular to the circumferential wall 20 and in parallel with each other. Between the portion penetrating through the circumferential wall 20 and the second end 41b of each bent tube 41, a portion which is larger in diameter than the penetrating portion does not exist. With such a structure, the insertion of the bent tubes 41 into the openings 200 of the circumferential wall 20 can be performed easily and properly.

Preferably, each of the openings 200 is a burring hole whose periphery is bent to stand, so that the periphery has an increased strength. Preferably, part of the circumferential wall 20, which includes the region formed with the openings 200, is a flat plate portion 201 which is not arcuate. The flat plate portion 201 is elongated in the height direction with a constant width and projects radially outward relative to other portions of the housing 2. With this structure, dimensioning of each of the openings 200 is easy, and the strength of the circumferential wall 20 can be enhanced. Moreover, since a large space is defined between the coiled tube 40 and the flat plate portion 201, bent tubes 41 having a relatively large radius of curvature can be used.

Each of the paired headers 5 is connected to the second ends 41b of the plurality of bent tubes 41. The header 5 may comprise a circular pipe 52, for example, and has an end formed with a connection port 50 to which a water inflow tube 99a or a hot-water outflow tube 99b shown in FIG. 35 is connected. The header 5 is formed with a plurality of openings 51. The smaller-diameter portion of the second end 41b of each bent tube 41 is fitted into a respective one of the openings 51, and the tapered surface of the stepped portion 41 is held in engagement with the periphery of the opening 51. The contact portion is subjected to welding or brazing. Therefore, the bent tube 41 and the header 5 are reliably connected to each other and watertight sealing is provided.

In FIGS. 36 and 37, the partition 19 closes the bottom opening of the space 3 surrounded by the plurality of coiled tubes 40. The partition 19 includes a main body 190 having an upper surface formed with a recess, and a flange piece 191 formed at the outer circumferential surface of the main body 190. The main body 190 may comprise a plate member 190a made of stainless steel and a heat insulating member 190b which is excellent in fire and heat resistance and laminated on the plate member. The heat insulating member 190b may be made of ceramic material, for example. The flange piece 191 is bonded to the bottom of the tube lap winding structure SC by welding or brazing, whereby the partition 19 is mounted. Since the tubes of the tube lap winding structure SC are helical and the bottom surfaces thereof are inclined, it is preferable that the flange piece 191 is helical correspondingly to the gradient. Instead of supporting the partition 19 by the water tubes 4, the partition may be supported in the housing 2 by using a support member.

A combustion gas path 32 is defined between the outermost coiled tube 40 and the circumferential wall 20. As shown in FIG. 36, clearances 31 are defined between adjacent loops 40a in the height direction of the coiled tubes 40. The space 3 and the combustion gas path 32 communicate with each other through the clearances 31, and combustion gas flows from the space 3 to the combustion gas path 32 through the clearances 31, as will be described later. As indicated by the reference sign n1, the annular wall 220 of the cover 21A is held in contact with an upper portion of the innermost coiled tube 40 to prevent combustion gas from passing therebetween to directly flow from the space 3 into the combustion gas path 32. Since the tube lap winding structure SC is made up of a plurality of helical tubes, not only the bottom surface but also the top surface is inclined. Therefore, even when the upper end of the tube lap winding structure is held in contact with a lower surface of the cover 21A, a gap is defined therebetween. The structure in which the annular wall 220 is held in contact with the innermost coiled tube 40 properly prevents the combustion gas from entering such a gap.

As shown in FIG. 37, the clearances 31 of the coiled tubes 31 are defined by using a plurality of spacers 18. The spacers 18 have a structure similar to that shown in FIG. 15. The spacer 18 includes a plurality of projections 18b which are inserted between adjacent loops 40a of the coiled tubes 40 to define the clearances 31. Therefore, the height of the clearances is equal to the thickness of the projections 18b. For example, in the heat exchanger A2, three spacers 18 are arranged at approximately regular intervals, as shown in FIG. 38.

For example, the heat exchanger A2 is manufactured by the following method.

Figure 41:
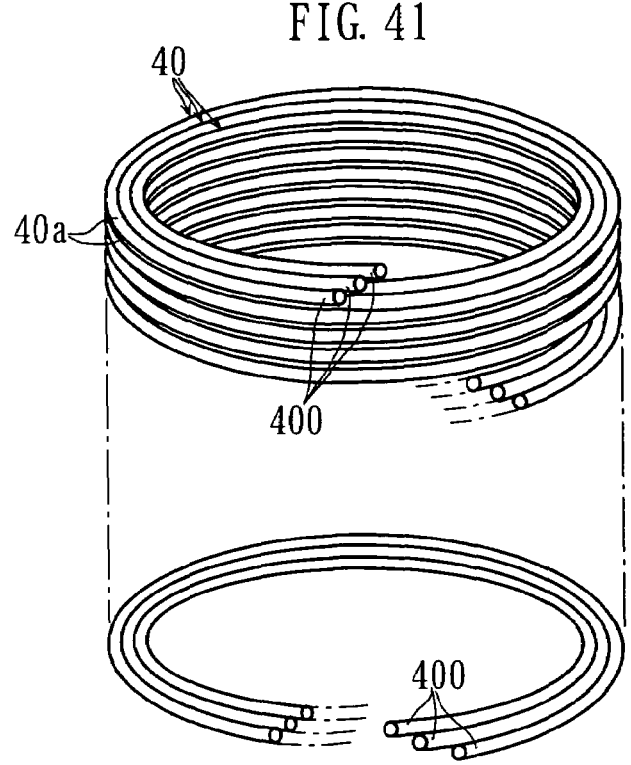
FIG. 41 is a schematic perspective view showing an example of a plurality of coiled tubes.
Figure 42:
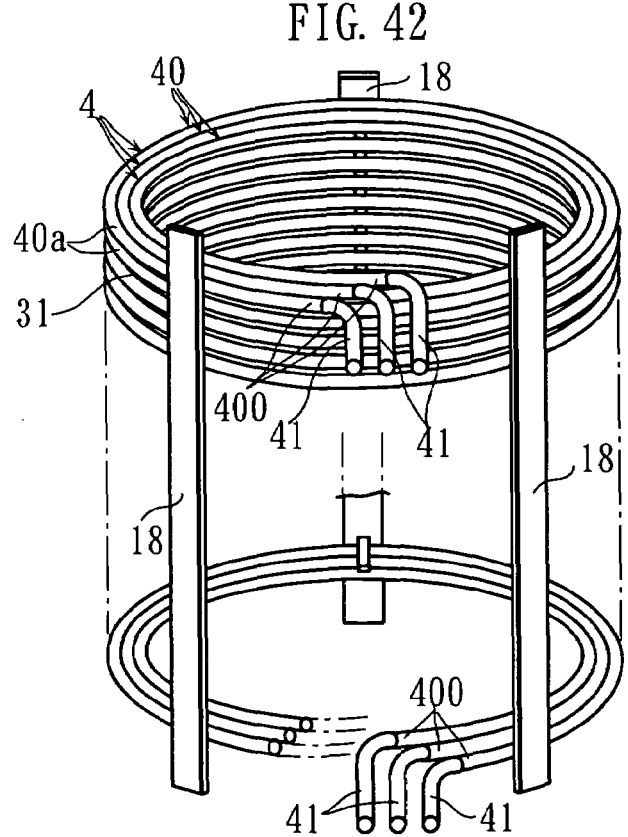
FIG. 42 is a schematic perspective view showing a process step of mounting attachments to the plurality of coiled tubes shown in FIG. 41.

First, as shown in FIG. 41, a plurality of coiled tubes 40 are arranged in a lap winding manner. Specifically, a plurality of coiled tubes 40 having different diameters are prepared by curving straight tubes into a helical shape, and then, the coiled tubes are fitted to each other. Subsequently, as shown in FIG. 42, bent tubes 41 are connected to opposite ends 400 of each coiled tube 40, whereby a plurality of water tubes 4 are completed. As described with reference to FIGS. 38 and 39, the connection of the bent tube 41 to each coiled tube 40 is performed by fitting the smaller-diameter portion of the first end 41a of the bent tube 41 into the end 400 of the coiled tube 40. Therefore, even when the arrangement pitch P2 of the ends 400 is small, the connection can be performed easily. Further, since the tapered surface of the stepped portion 410a and the end 400 are held in contact with each other and the contact portion is subjected to welding or brazing, good watertight sealing is provided.

Subsequently, as shown in FIG. 42, a plurality of spacers 18 are mounted to the coiled tubes 40. Specifically, the spacers are mounted by inserting the projections 18b of each spacer 18 between the loops 40a from the outside of the outermost coiled tube 40. By this, clearances 31 having a dimension equal to the thickness of each projection 18b are defined between the loops 40a. Each of the spacers 18 may have a structure divided into a plurality of parts in the height direction. Though not illustrated in the figure, a partition 19 is mounted to a lower portion of the coiled tubes 40.

Figure 43:
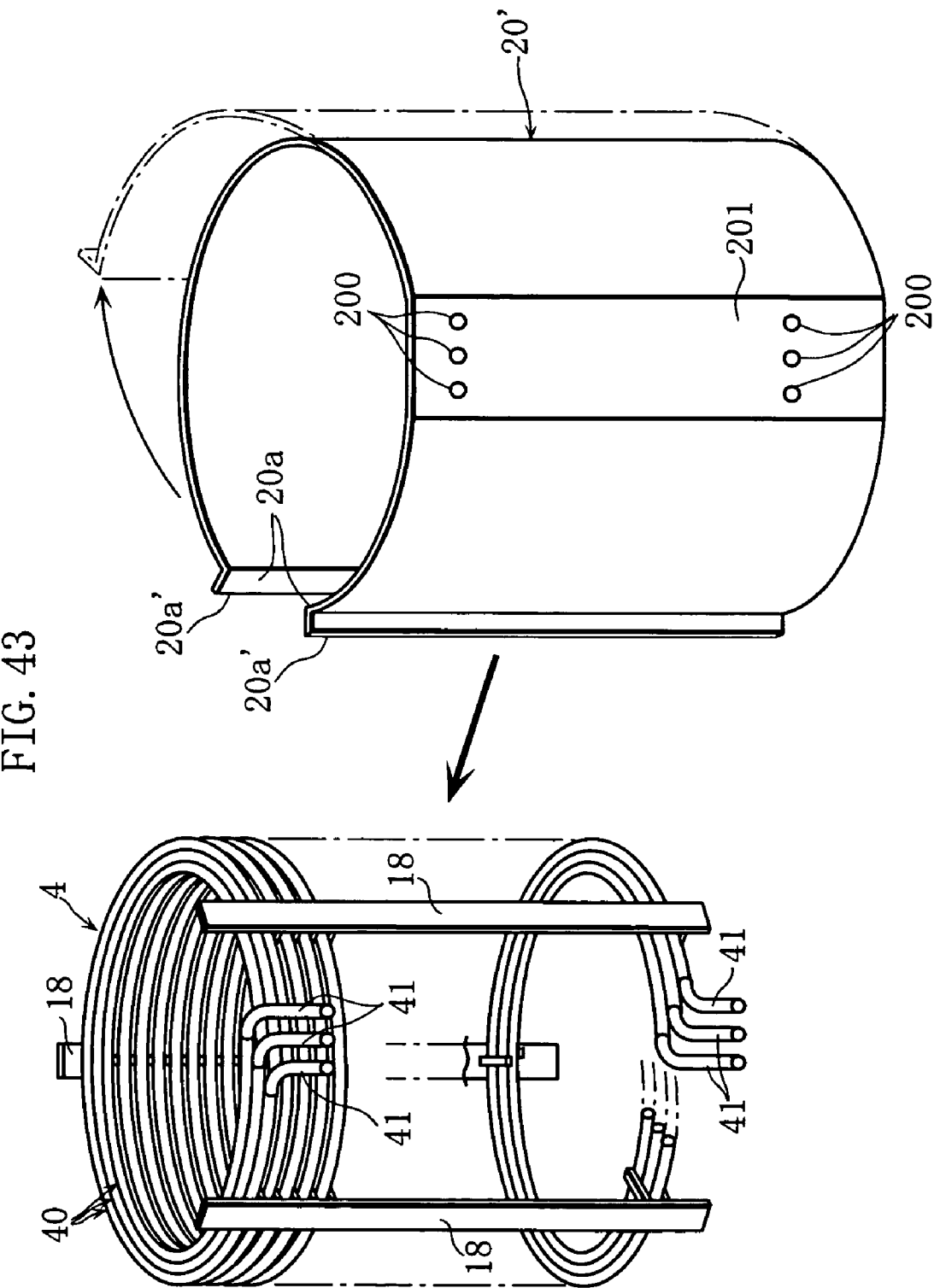
FIG. 43 is a schematic perspective view showing a process step of surrounding the coiled tubes and the attachments shown in FIG. 42 by a plate.

On the other hand, as shown in FIG. 43, a non-cylindrical plate 20' is prepared. The plate 20' is a part to become a cylindrical wall 20 of the housing 2 and made of a rectangular stainless steel plate having flexibility. Opposite edges 20a of the plate 20' are bent to form a pair of projections 20a'. Further, a plurality of openings 200 for inserting bent tubes 41 of water tubes 4 are formed. The plate 20' is curve-worked in advance so as to be easily formed into a cylindrical shape, and a flat plate portion 201 is also formed in advance.

After the plate 20' is prepared, the plate 20' is placed to surround the coiled tubes 40 by widening the space between the edges 20a. At this time, the plurality of bent tubes 41 are inserted into the openings 200 from the second ends 41b. As noted before, the portions adjacent to the second ends 41b of the bent tubes 41 extend straight and in parallel with each other, so that the insertion of these portions into the openings 200 can be performed easily and properly.

Figure 44:
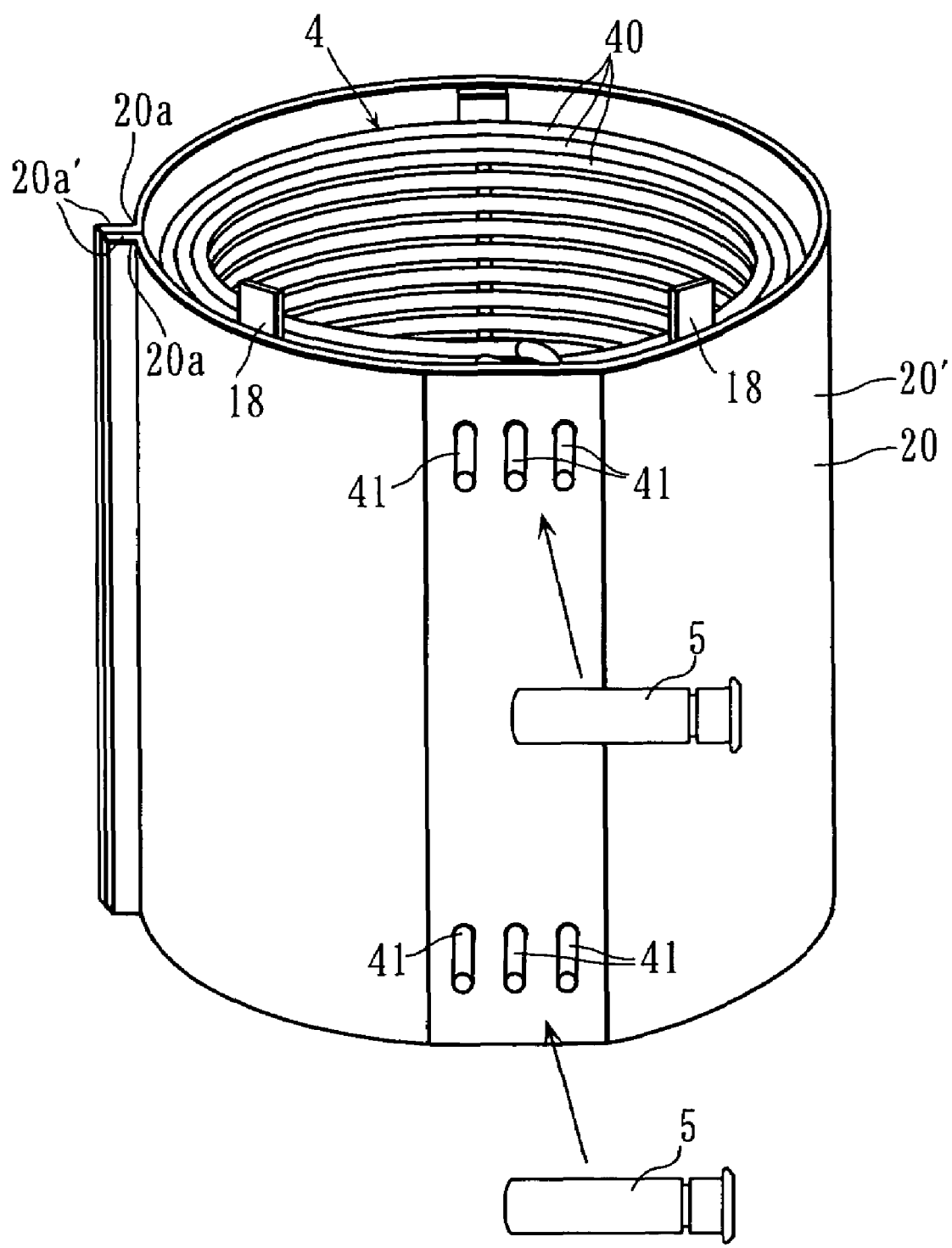
FIG. 44 is a perspective view showing the state in which the coiled tubes and the attachments shown in FIG. 42 are surrounded by the plate.

Thereafter, as shown in FIG. 44, the opposite edges 20a of the plate 20' are brought into contact with each other to make the plate 20' cylindrical. By putting the paired projections 20a' together and pinching them by using a jig (not shown), the cylindrical shape of the plate 20' can be maintained, and in this state, the projections 20a' are welded together. As a result, a circumferential wall 20 having a fixed cylindrical shape is formed. Although each of the projections 20a' in this embodiment extends along the entire length of the edge 20a, the projection 20a' may be partially provided a tone or plurality of locations of the edge 20a (at upper and lower ends of the edge 20a, for example).

Subsequently, a pair of headers 5 are connected to the bent tubes 41. As described with reference to FIG. 39, the connection of the headers 5 does not require any particular part and can be performed just by fitting the second end 41b of each bent tube 41 into the opening 51 of the header 5 and performing welding or brazing. Therefore, the cost for parts is relatively low. Further, since the arrangement pitch P3 of the second ends 41b of the bent tubes 41 and the openings 51 is large, the connection of the bent tubes 41 and the headers 5 can be performed easily.

Though not illustrated in FIG. 44, a pair of covers 21A and 21B are fitted into the upper and the lower openings of the circumferential wall 20 and welded to the circumferential wall 20. As noted before, the covers 21A and 21B can be positioned properly by utilizing a plurality of projections 25a and 25b formed at the circumferential wall 20. Therefore, the mounting of the covers is easy. Further, a plurality of brackets 23 are welded to the circumferential wall 20. However, the welding of the brackets 23 may be performed before making the plate 20' cylindrical.

By the above-described method, the heat exchanger A2 is manufactured properly. As will be understood from the above description, in the heat exchanger A2, even when the arrangement pitch P2 of the ends 400 of the coiled tubes 40 is small, the headers 5 can be easily and properly connected to the coiled tubes 40 by utilizing the plurality of bent tubes 41. Particularly in this embodiment, after the bent tubes 41 are connected to the coiled tubes 40, the coiled tubes 40 are surrounded by the circumferential wall 20 of the housing 2, which further facilitates the connection of the bent tubes 41 to the coiled tubes 40. Even when the bent tubes 41 project largely from the coiled tubes 40, the coiled tubes 40 can be properly surrounded by the plate 20' by inserting the bent tubes 41 into the openings 200 of the circumferential wall 20 (plate 20'). When the bent tubes 41 project out from the housing 2 only by a small amount, the headers 5 are positioned close to the housing 2, so that the operation such as welding for mounting the headers 5 to the bent tubes 41 may be difficult. According to this embodiment, however, part of each bent tube 41 can project largely, so that such a difficulty can be properly avoided.

The water heater B2 shown in FIG. 35 includes a burner 1, a bottom casing 80 and an exhaust duct 81 in addition to the heat exchanger A1. Though FIG. 35 indicates that the fuel supply to the burner 1 is performed via a pipe 12a, there is no substantial difference between the burner 1 of this embodiment and that of the foregoing embodiments. Since the structures of the bottom casing 80 and the exhaust duct 81 are also the same as those of the foregoing embodiments, detailed description thereof will be omitted.

In the water heater B2, the water inflow tube 99a and the hot-water outflow tube 99b are connected to the paired headers 5. Preferably, the connection is so performed that the lower header 5 is used for water inflow whereas the upper header 5 is use for hot-water outflow. In such a case, water flows upward through the water tubes 4, and this water flow direction is opposite from the direction in which the combustion gas flows (downward), which is advantageous for enhancing the heat exchange efficiency.

The operation and advantages of the water heater B2 will be described below.

First, when the burner 1 is driven, fuel burns in the space 3 to generate combustion gas. Although the combustion gas tries to flow downward, the gas cannot flow downward directly through the lower opening of the space 3, because the lower opening is closed by the partition 19. Therefore, the combustion gas passes through the clearances 31 of the tube lap winding structure SC made up of the plurality of coiled tubes 40 into the combustion gas path 32. Thereafter, the combustion gas flows downward through the combustion gas path 32 to reach the combustion gas outlet 22B. Then, the combustion gas flows through the bottom casing 80 and the exhaust duct 81 and is discharged to the outside through the exhaust port 81a. In this combustion gas flow process, the coiled tubes 40 perform heat recovery. When the combustion gas flows through the clearances 31 of the tube lap winding structure SC, the combustion gas comes into contact with the loops 40*a* arranged along a generally horizontal direction one after another. Therefore, a large amount of heat is recovered by the tube lap winding structure SC.

For example, in the heat recovery process, the two inner coiled tubes 40 maybe used for recovering sensible heat, whereas the outermost coiled tube 40 may be used for recovering latent heat. By such latent heat recovery, the heat exchange efficiency of the heat exchanger A1 is considerably enhanced. Although water is supplied from the water inflow header 5 to the plurality of coiled tubes 40 at the same time, water flows through the respective coiled tubes 40 toward the hot-water outflow header 5 without mixing. Therefore, to the outermost coiled tube 40, unheated water which has not passed through the inner coiled tubes 40 and hence has a relatively low temperature is supplied. Therefore, the outermost coiled tube 40 can recover a large amount of heat, so that the latent heat recovery can be performed properly.

Since the upper surface of the partition wall 19 is dented, the combustion gas which has flowed downward near the center of the space 3 is so reflected upward as to avoid the center or the neighboring portions. As a result, in the heat exchanger A1, combustion gas circulation as indicated by the arrows N5 in FIG. 35 is generated. Therefore, the temperature of the combustion gas within the space 3 can be made uniform, and the amount of combustion gas flowing into the plurality of clearances 31 is also made uniform, which is advantageous for enhancing the heat exchange efficiency.

When the latent heat recovery is performed, drain is generated in the tube lap winding structure SC and adheres to the surfaces of the loops 40*a*. Due to the gravity and the downward flow of the combustion gas, the drain drops downward and is duly received in the drain receiving portion 26D. Since each of the coiled tubes 40 is helical and has an inclined surface, the drain readily flows downward along the surfaces of the coiled tube 40. When the drain remains on the surfaces of the coiled tube 40, the direct contact between the coiled tube 40 and the combustion gas is hindered by the drain, which may result in a reduction in the amount of heat transfer. However, since the drain readily flows downward in this embodiment, such a problem can be avoided. The drain received by the drain receiving portion 26D is duly discharged to the outside through the drain discharge port 26*b* and the pipe 82. Therefore, the bottom casing 80 is not contaminated by the acidic drain. Therefore, the bottom casing 80 can be made of a material such as copper or iron which is inferior in acid resistance to stainless steel but less expensive than stainless steel.

Figure 45:
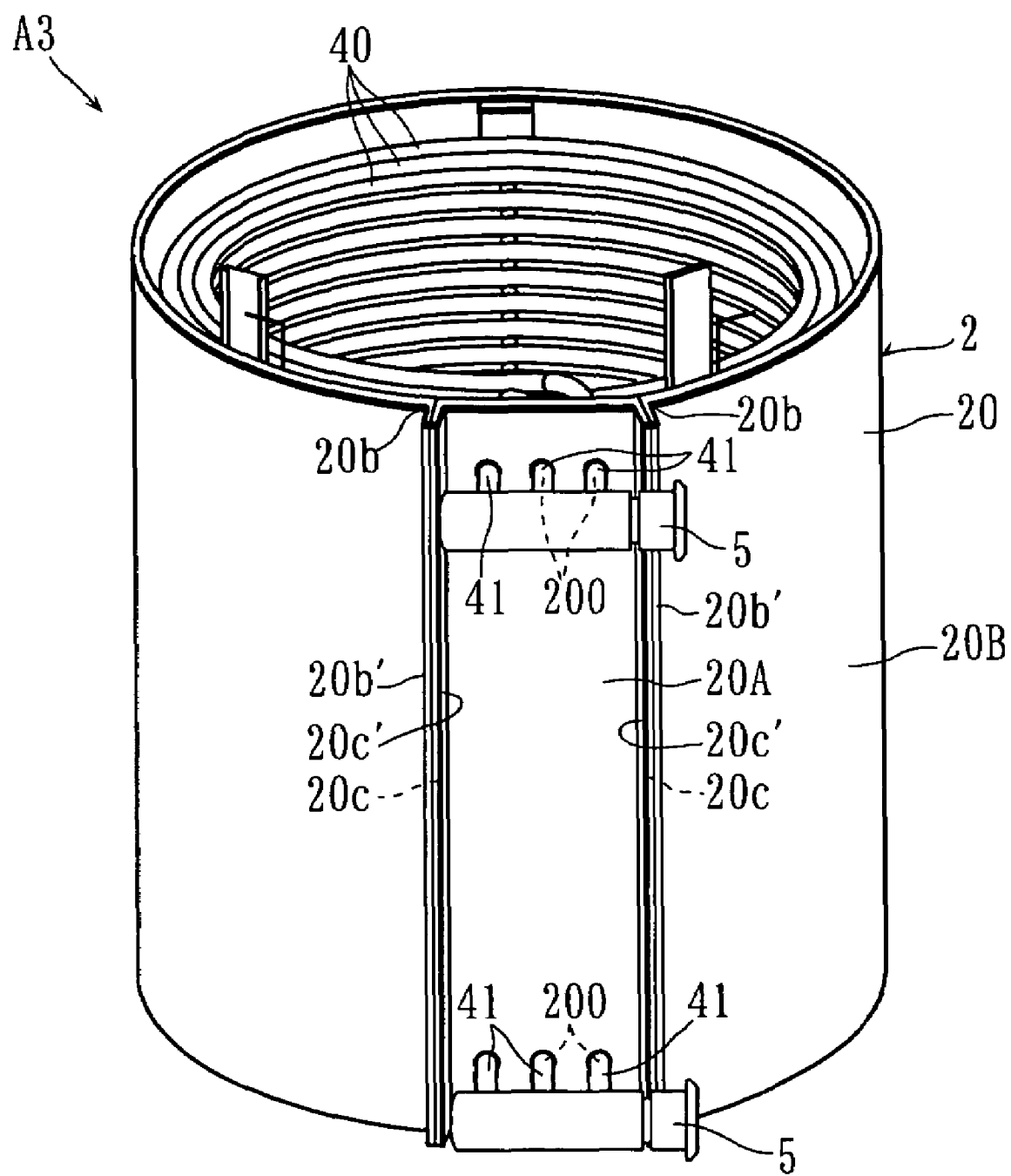
FIG. 45 is a perspective view showing another example of heat exchanger according to the present invention.
Figure 46:
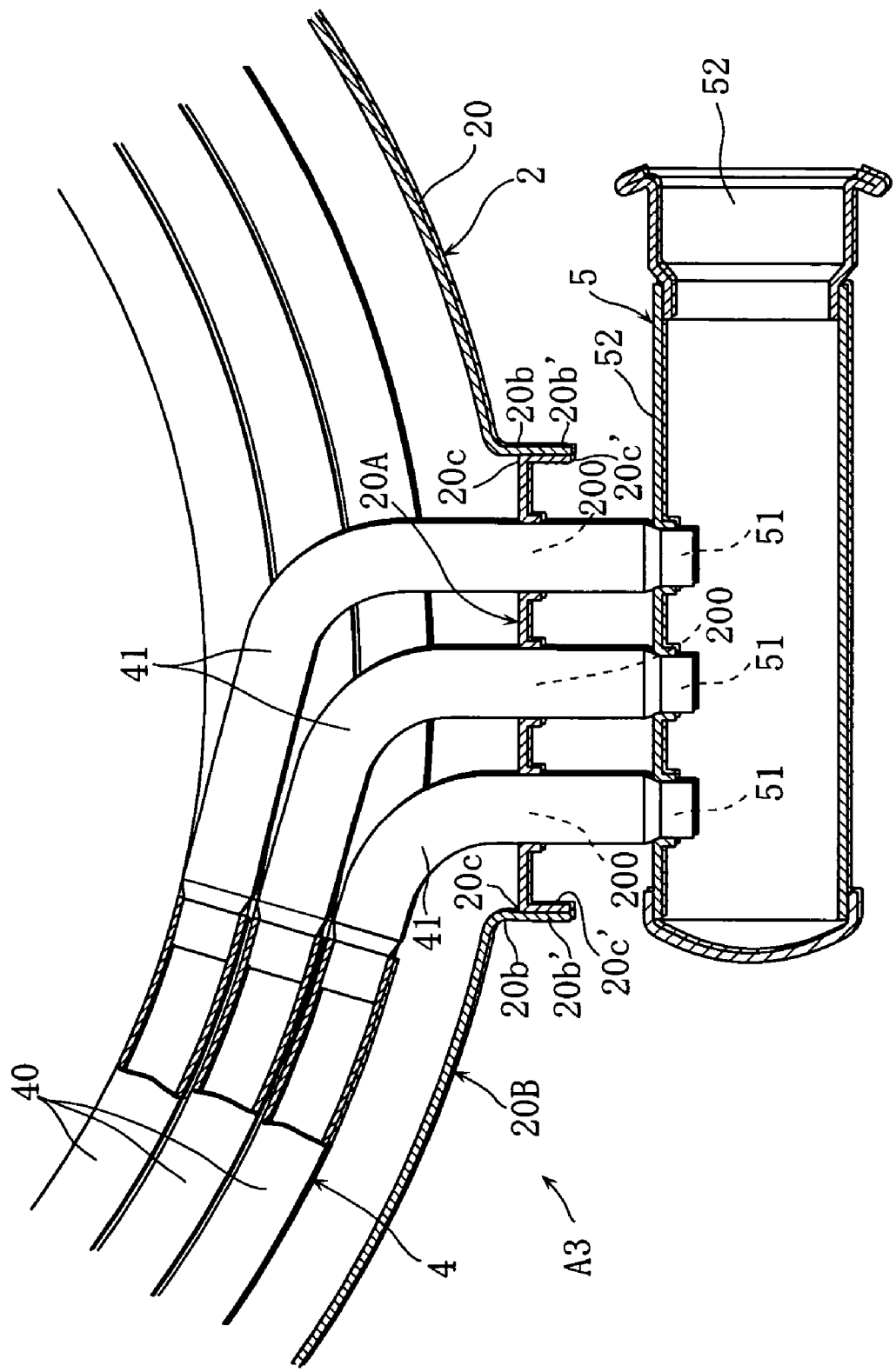
FIG. 46 is a horizontal sectional view showing a principal portion of the heat exchanger shown in FIG. 45.

The heat exchanger A3 shown in FIGS. 45 and 46 includes a circumferential wall 20 made up of a first and a second plates 20A and 20B. Both of the first and the second plates 20A and 20B are made of stainless steel. The first plate 20A is generally rectangular and has a constant width. The first plate 20A includes a plurality of openings 200 formed at portions adjacent to the upper end and the lower end thereof, and a plurality of bent tubes 41 are inserted into the openings 200. The second plate 20B is curved to surround the most part of the circumference of the helical tube 40, and opposite edges 20*b* of the second plate are bonded to widthwise-opposite edges 20*c* of the first plate 20A. The first and the second plates 20A and 20B bonded together in this way form a generally cylindrical shape surrounding the entire circumference of the helical tube 40. The opposite edges 20*b* of the second plate 20B and the opposite edges 20*c* of the first plate 20A are respectively formed with bent projections 20*b*' and 20*c*'. The above-described bonding is performed by putting these projections 20*b*' and 20*c*' together.

The heat exchanger A3 can be manufactured as follows.

Figure 47:
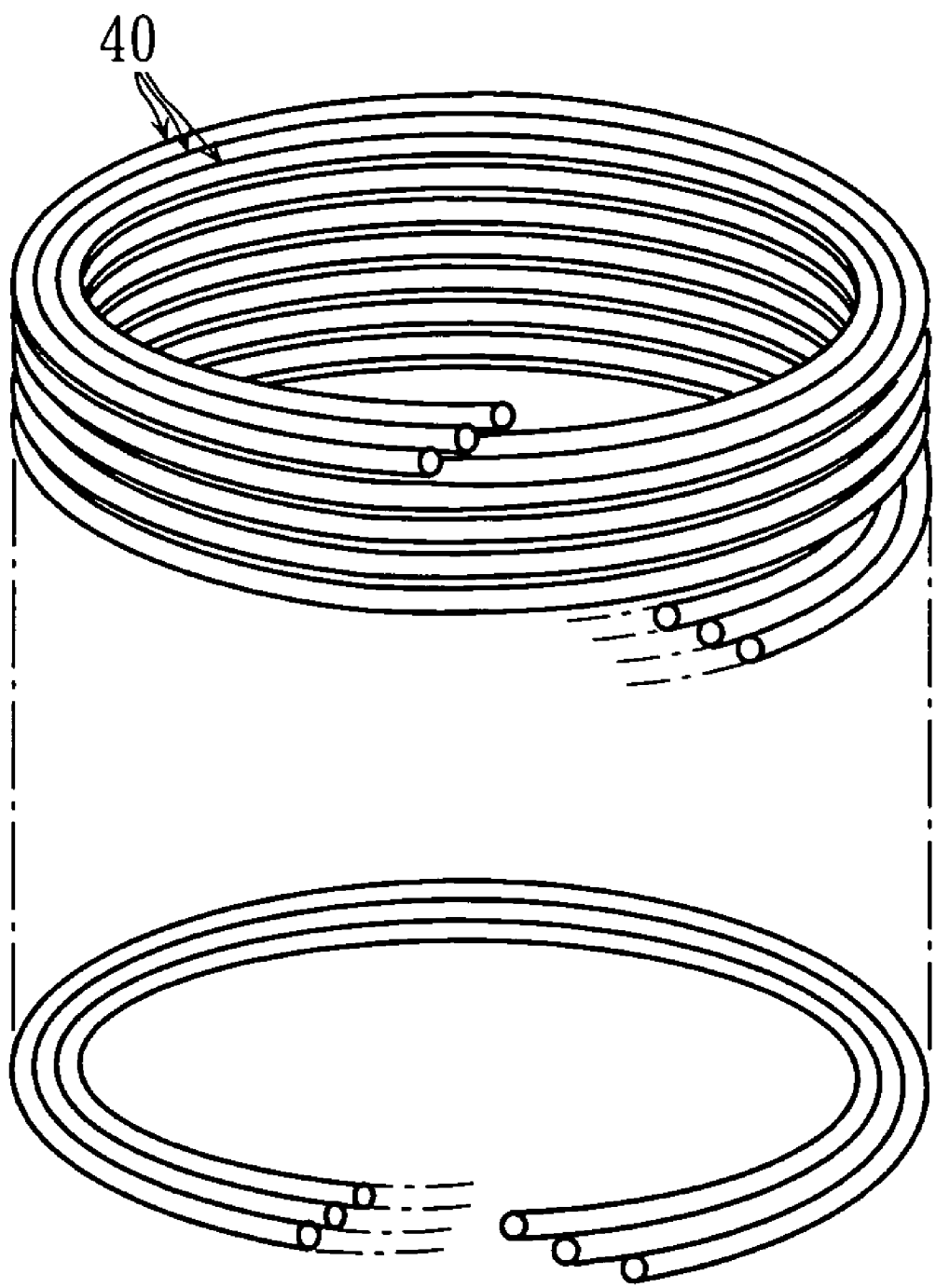
FIG. 47 is a schematic perspective view showing a plurality of coiled tubes used for manufacturing the heat exchanger shown in FIG. 45.
Figure 48:
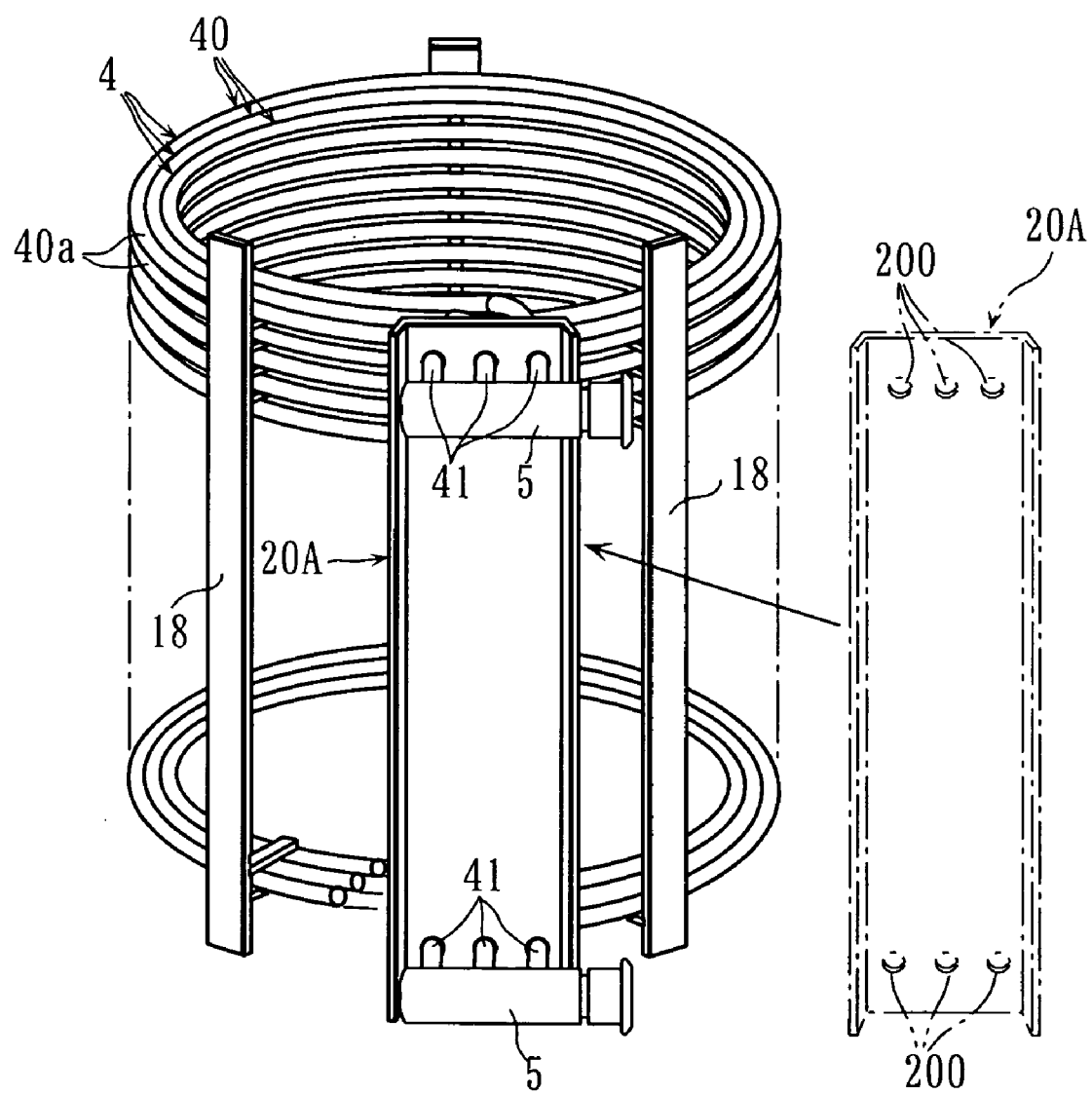
FIG. 48 is a perspective view showing the state in which related parts are mounted to the plurality of coiled tubes shown in FIG. 47.

First, as shown in FIG. 47, a plurality of helical tubes 40 are arranged in a lap winding manner, which is the same as the manufacturing method of the heat exchanger A2. Subsequently, as shown in FIG. 48, bent tubes 41 are connected to opposite ends of each of the helical tubes 40. Then, the first plate 20A is placed beside the helical tubes 40 so that the bent tubes 41 are inserted through the openings 200 of the first plate 20A. Thereafter, headers 5 are mounted to the ends of the bent tubes 41 which project from the first plate member 20A. Further, similarly to the method for manufacturing the heat exchanger A2, spacers 18 and a partition 19 are mounted to the helical tubes 40.

Figure 49:
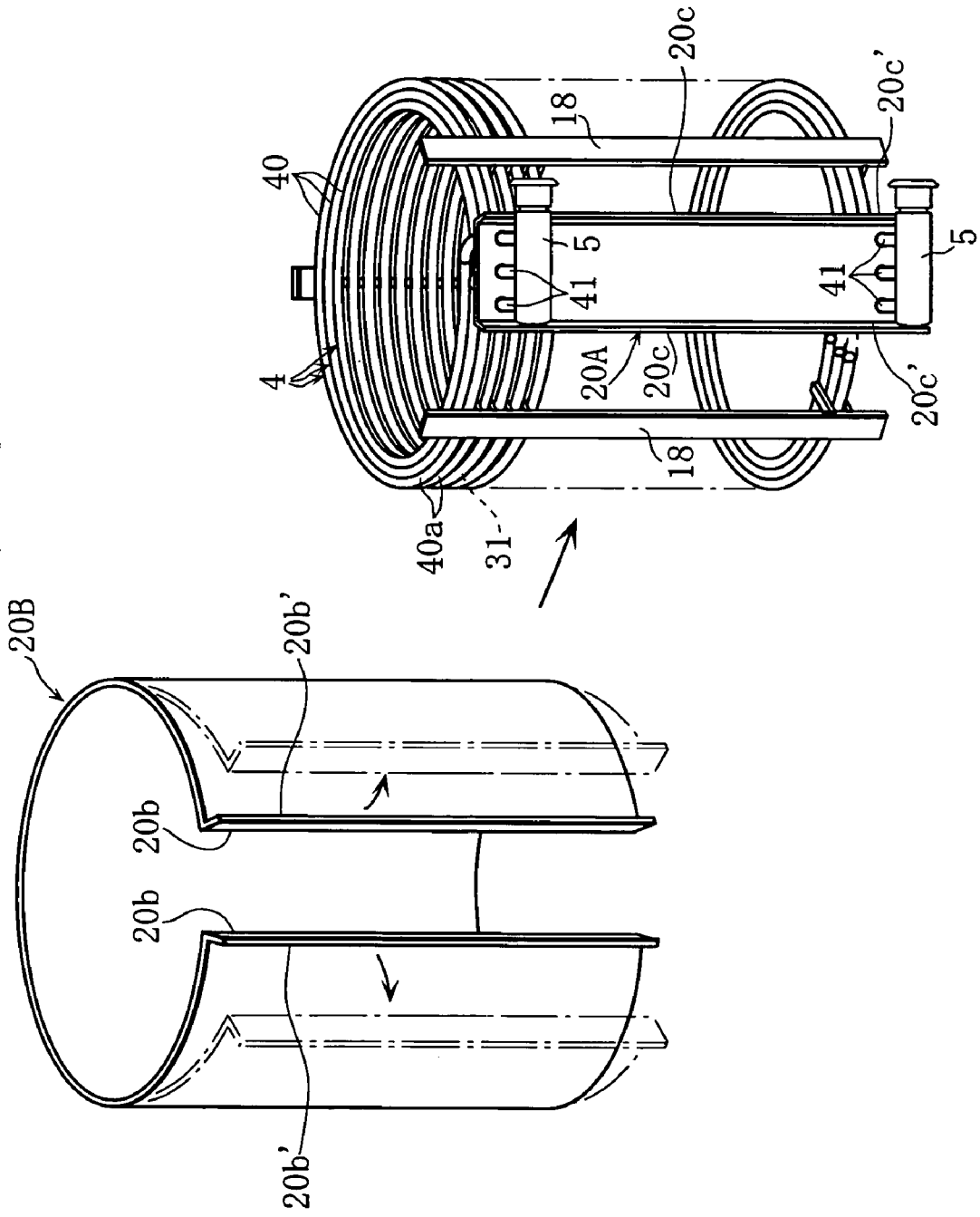
FIG. 49 is a perspective view showing a process step of surrounding the coiled tubes and the related parts shown in FIG. 48 by a plate.

Apart from the above process steps, a second plate 20B is prepared, as shown in FIG. 49. The second plate 20B is formed by bending opposite edges 20*b* of a rectangular stainless steel plate to form projections 20*b*'. Preferably, the second plate 20B is curve-worked in advance so as to be easily formed into a generally cylindrical shape. After the second plate 20B is prepared, the plate 20' is placed to surround the helical tubes 40 by widening the space between the ends 20*b*. Thereafter, the projections 20*b*', 20*c*' at the opposite edges 20*b*, 20*c* of the first and the second plates 20A, 20B are put together and bonded by welding, for example. As a result, the heat exchanger A3 as shown in FIGS. 45 and 46 is obtained. In the above-described welding process, the projections 20*b*', 20*c*' can be pinched by using a jig, similarly to the method for manufacturing the heat exchanger A2.

According to this embodiment, the plurality of bent tubes 41 can be connected to the helical tubes 40 in the state in which the helical tubes 40 are not accommodated in the housing 2. Further, the mounting of the headers 5 to the bent tubes 41 can be performed in the state in which the helical tubes 40 are not accommodated in the housing 2. Therefore, after the headers 5 are mounted, whether or not the bent tubes 41 and the headers 5 are properly mounted can be easily checked by water flow or visual inspection without being hindered by the housing 2.

Although the first plate 20A in this embodiment is in the form of a relatively narrow rectangle, the present invention is not limited thereto. For example, the first plate 20A may have a relatively large width and may be curved to be semi-cylindrical or generally semi-cylindrical. In the present invention, a first and a second plate both of which are semi-cylindrical may be bonded together.

Figure 50:
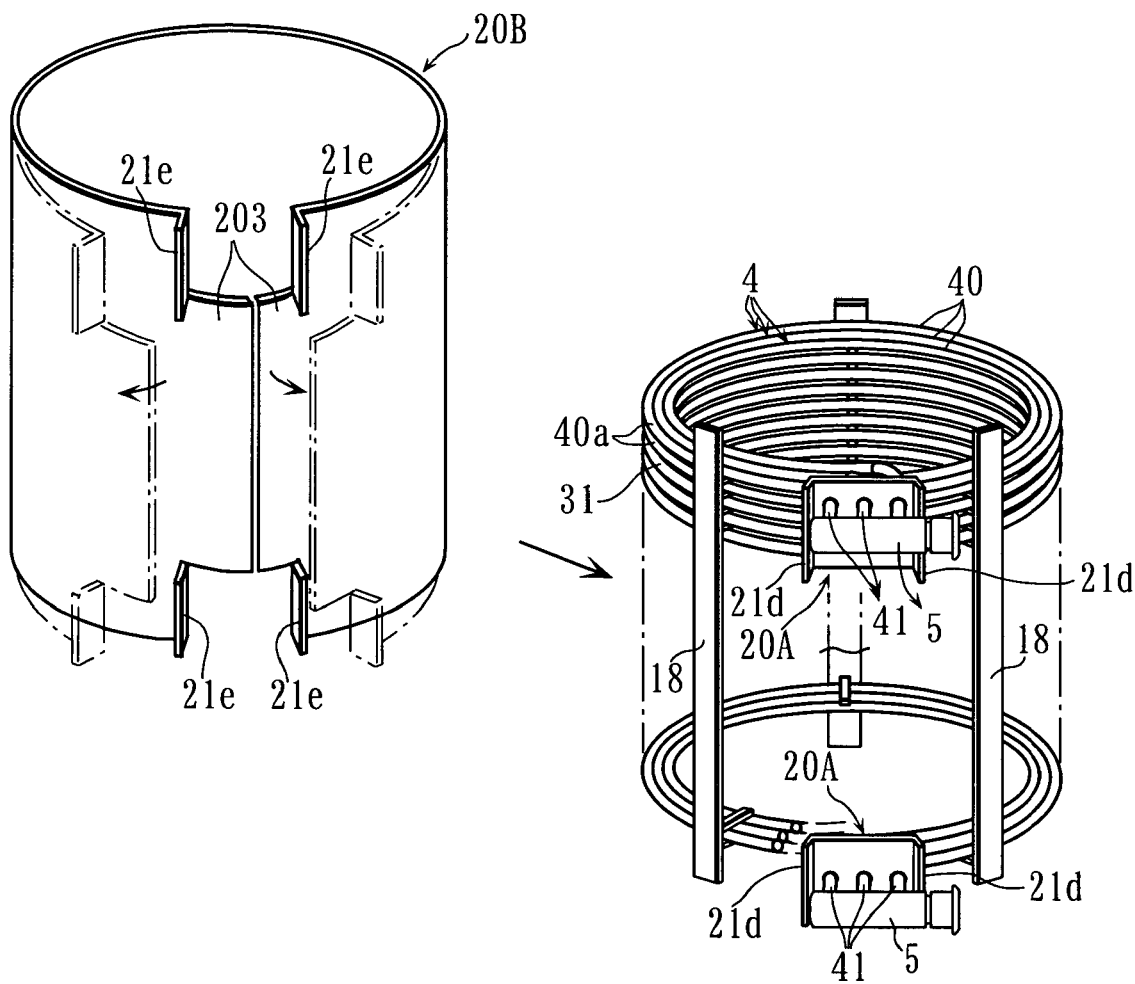
FIG. 50 is an exploded perspective view showing another example of process step for manufacturing a heat exchanger according to the present invention.

The heat exchanger of the embodiment shown in FIG. 50 includes a pair of upper and lower first plates 20A. A plurality of bent tubes 41 penetrate through each of the first plate 20A. Each of the first plates 20A has opposite edges formed with projections 21*d* for bonding. A second plate 20B has opposite edges each of which is formed, at an upper and a lower end thereof, with projections 21*e* for bonding to the first plates 20A so as to hold the first plate from opposite sides. Each edge of the second plate 20B is further formed, at an intermediate portion thereof, with an extension 203 projecting in the circumferential direction relative to the upper and the lower ends. The extensions 203 are portions to be directly bonded to each other to form a cylindrical shape without holding the first plate 20A therebetween.

Also in this embodiment, the circumferential wall 20 of the housing 2 can be properly formed by bonding the paired first plates 20A and the second plate 20B into a cylindrical shape. Further, the upper and the lower first plates 20A can be mounted individually to the upper and the lower bent tubes 41, respectively. Therefore, even when the position of the upper bent tubes 41 and that of the lower bent tubes 41 does not correspond to each other, mounting of the first plates 20A to the bent tubes can be performed easily.

Figure 51:
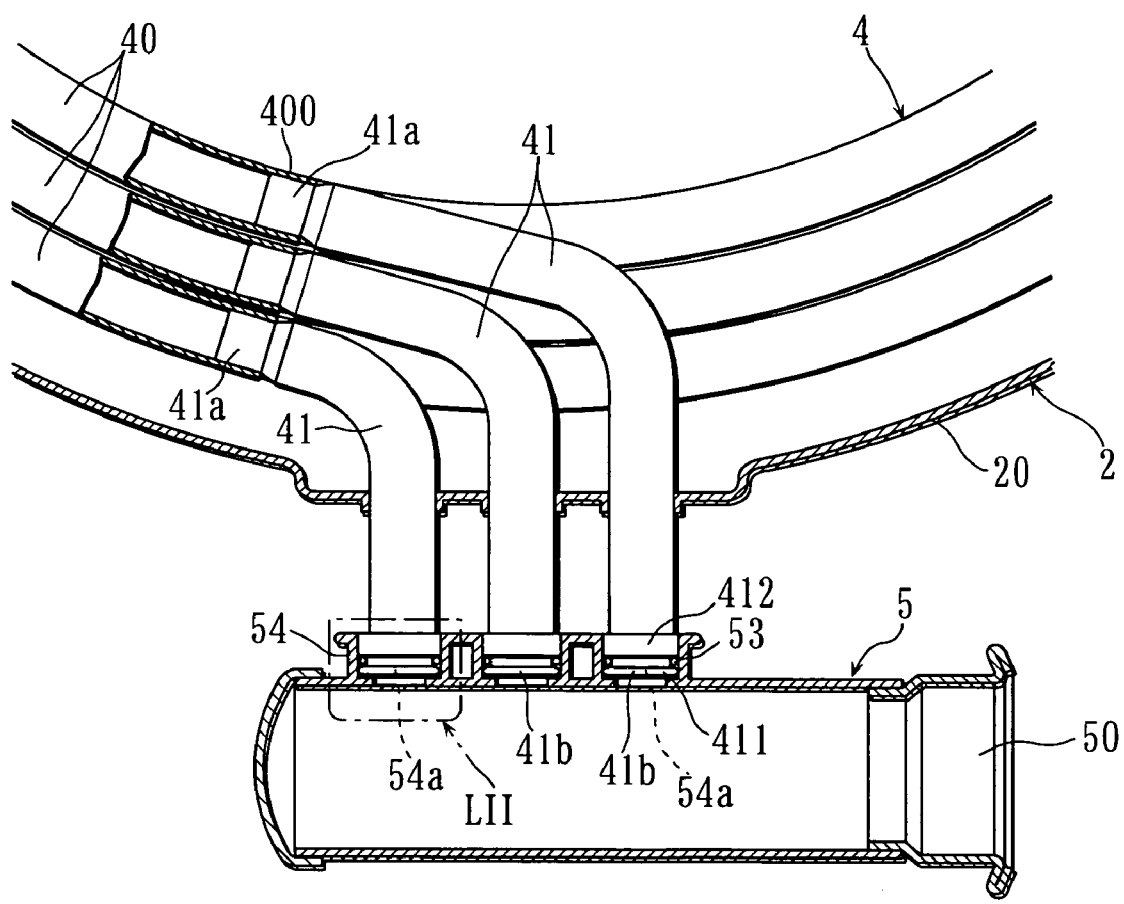
FIG. 51 is a horizontal sectional view showing a principal portion of another example of header structure of a heat exchanger according to the present invention.
Figure 52:
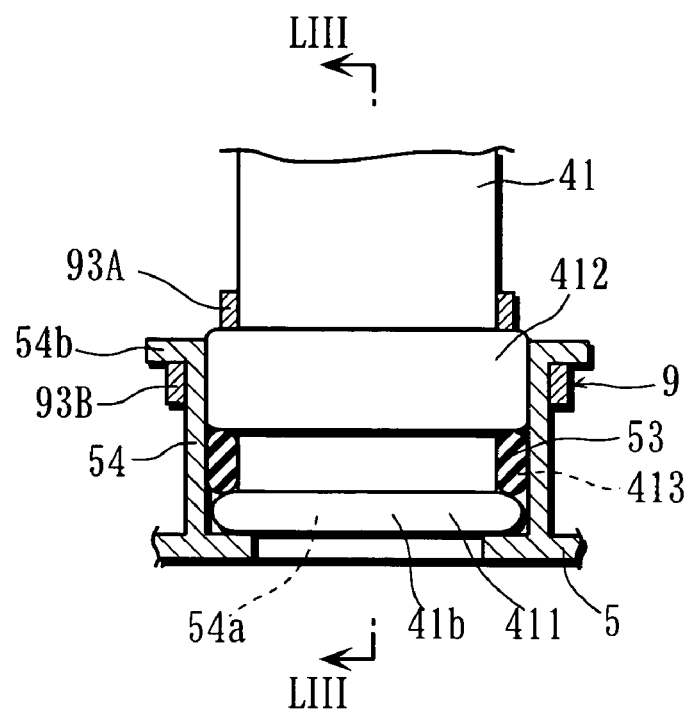
FIG. 52 is a sectional view of the portion indicated by the reference sign LII in FIG. 51.
Figure 53:
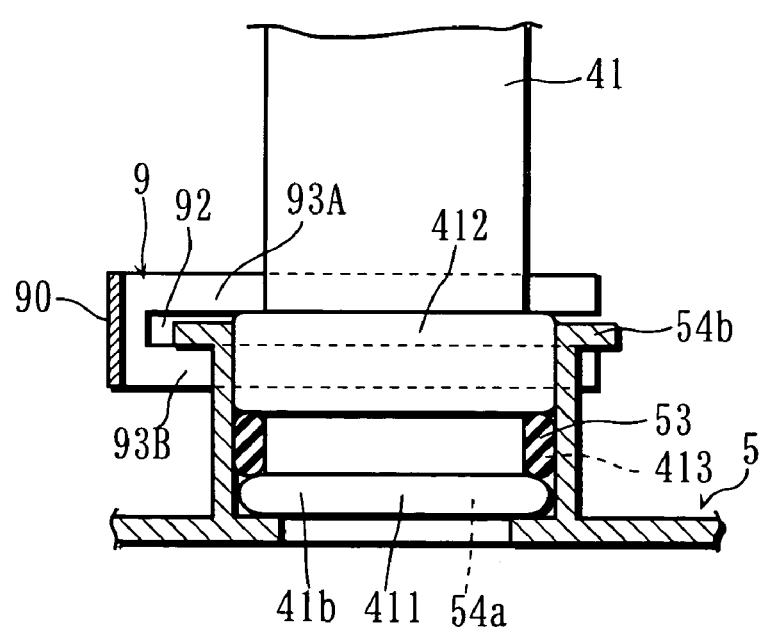
FIG. 53 is a sectional view taken along lines LIII-LIII in FIG. 52.

In the embodiment shown in FIGS. 51-53, a plurality of bent tubes 41 are connected to the header 5 by utilizing O-rings 53 and stoppers 9. Specifically, the second end 41b of each bent tube 41 is subjected to expanding process to be formed with a pair of larger-diameter portions 411, 412 and a groove 413 defined between the larger-diameter portions. The O-ring 53, which comprises an elastic member, is fitted into the groove 413. The body of the header 5 is formed with relatively short cylindrical portions 54 each defining a hole 54a, in which the second end 41b of the bent tube 41 is fitted. The O-ring 53 is in pressure contact with the inner circumferential surface of the hole 54a to provide excellent watertight sealing.

Figure 54A:
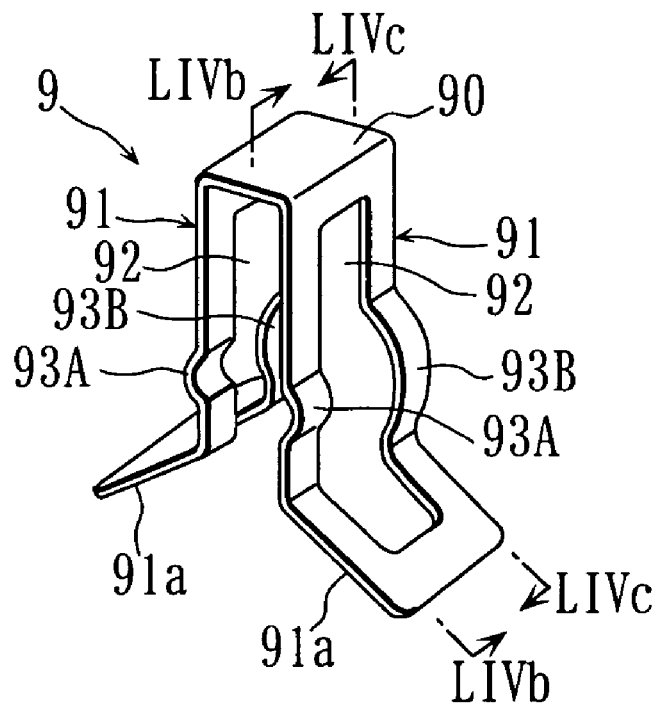
FIG. 54A is a perspective view showing an example of stopper used for header connection.
Figure 54B:
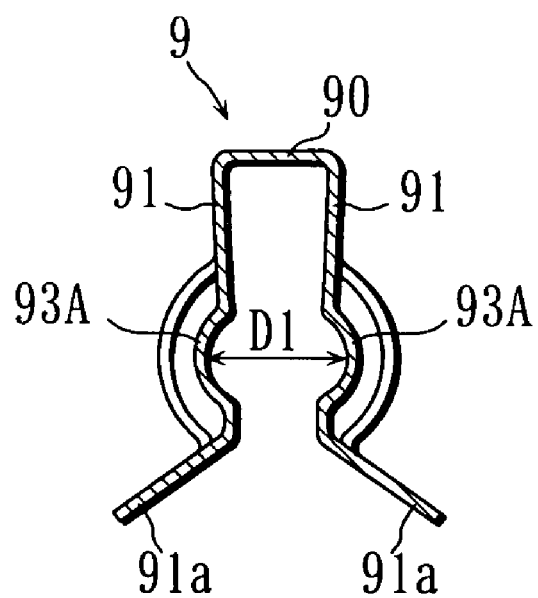
FIG. 54B is a sectional view taken along lines LIVb-LIVb in FIG. 54A.
Figure 54C:
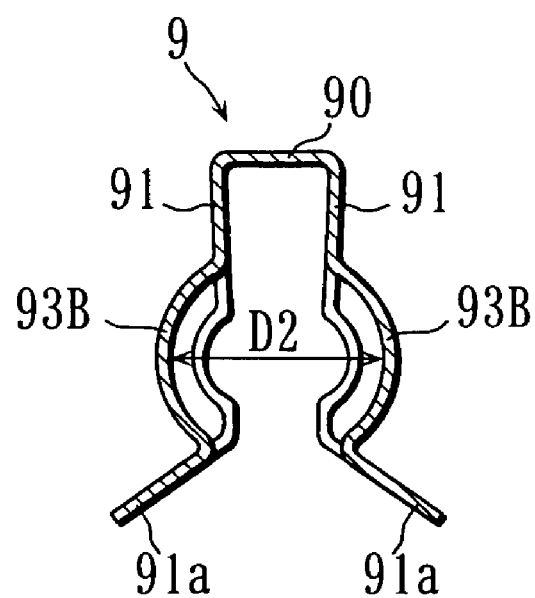
FIG. 54C is a sectional view taken along lines LIVc-LIVc in FIG. 54A.

For example, the stopper 9 may be formed by press working a thin metal plate. As shown in FIGS. 54A-54C, the stopper is in the form of a clip including a base portion 90 and a pair of legs 91 connected to the base portion. Each of the legs 91 has a distal end formed with an inclined portion 91a extending outward. Each of the legs 91 is formed with a slit 92. On one side of the slits 92 (front side in FIG. 54A), a pair of arcuate portions 93A having an inner width D1 are formed. On the other side of the slits 92 of the stopper 9, a pair of arcuate portions 93B having an inner width D2 are formed. The inner width D2 is larger than the inner width D1. As better shown in FIGS. 52 and 53, a flange 54b is formed at the distal end of the cylindrical portion 54. The stopper 9 is mounted to the cylindrical portion 54 so that the flange 54b is received in the slits 92. In this state, the arcuate portions 93B pinch the outer circumference of the cylindrical portion 54 while engaging with the flange 54b, whereas the arcuate portions 93A pinch the outer circumference of the bent tube 41 at the portion adjacent to the stepped portion 412 while engaging with a side surface of the stepped portion 412. With such a structure, the bent tube 41 does not easily drop from the hole 54a even when a force to pull out is exerted on the bent tube 41.

Figure 55:
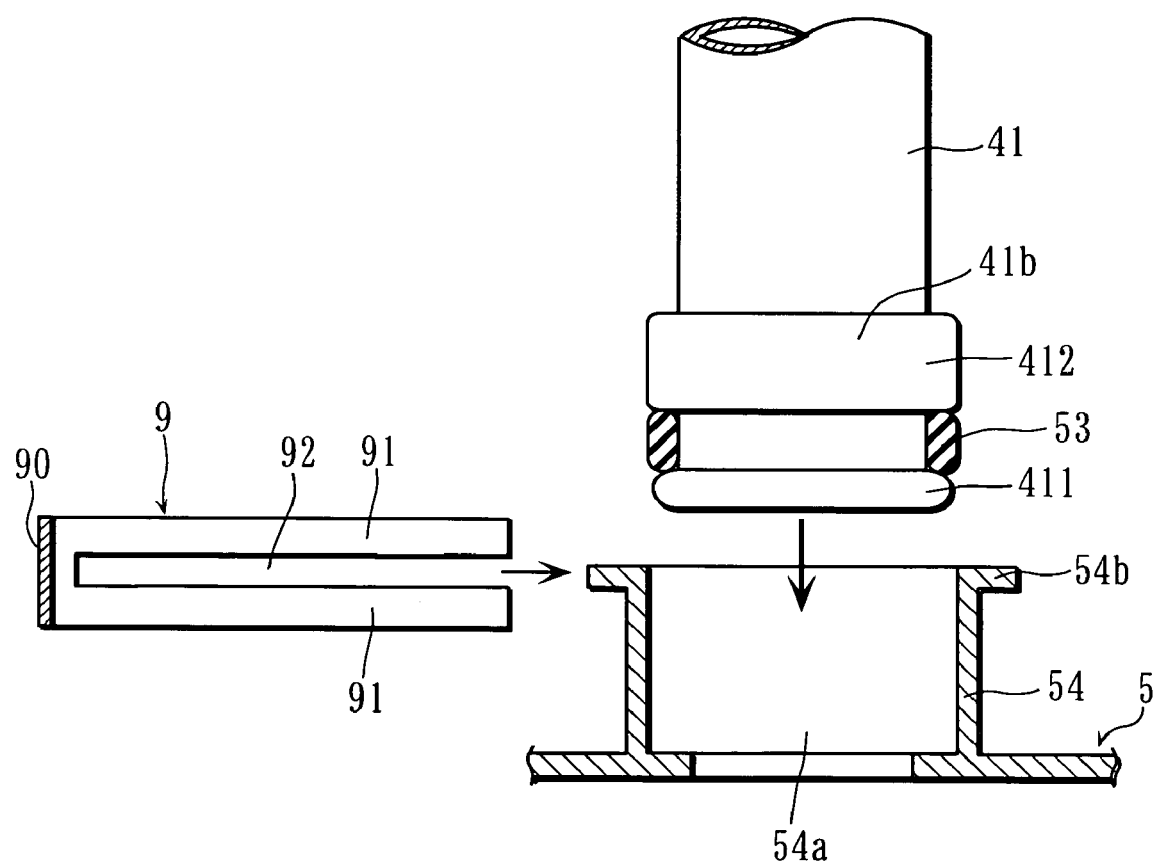
FIG. 55 is an exploded sectional view showing the header structure portion shown in FIG. 51.

In this embodiment, to connect the bent tube 41 to the header 5, the second end 41b of the bent tube 41 is inserted into the hole 54a, and then the stopper 9 is mounted, as shown in e.g. FIG. 55. The stopper 9 can be mounted just by a single operation of bringing the distal ends of the paired legs 91 into contact with the outer circumference of the cylindrical portion 54 and the bent tube 41 and pushing the stopper to expand the distal ends against the resilient force of the legs 91. Therefore, the connecting operation is very easy. Since the subsequent welding, for example, is not necessary, the assembling can be performed efficiently.

Figure 56:
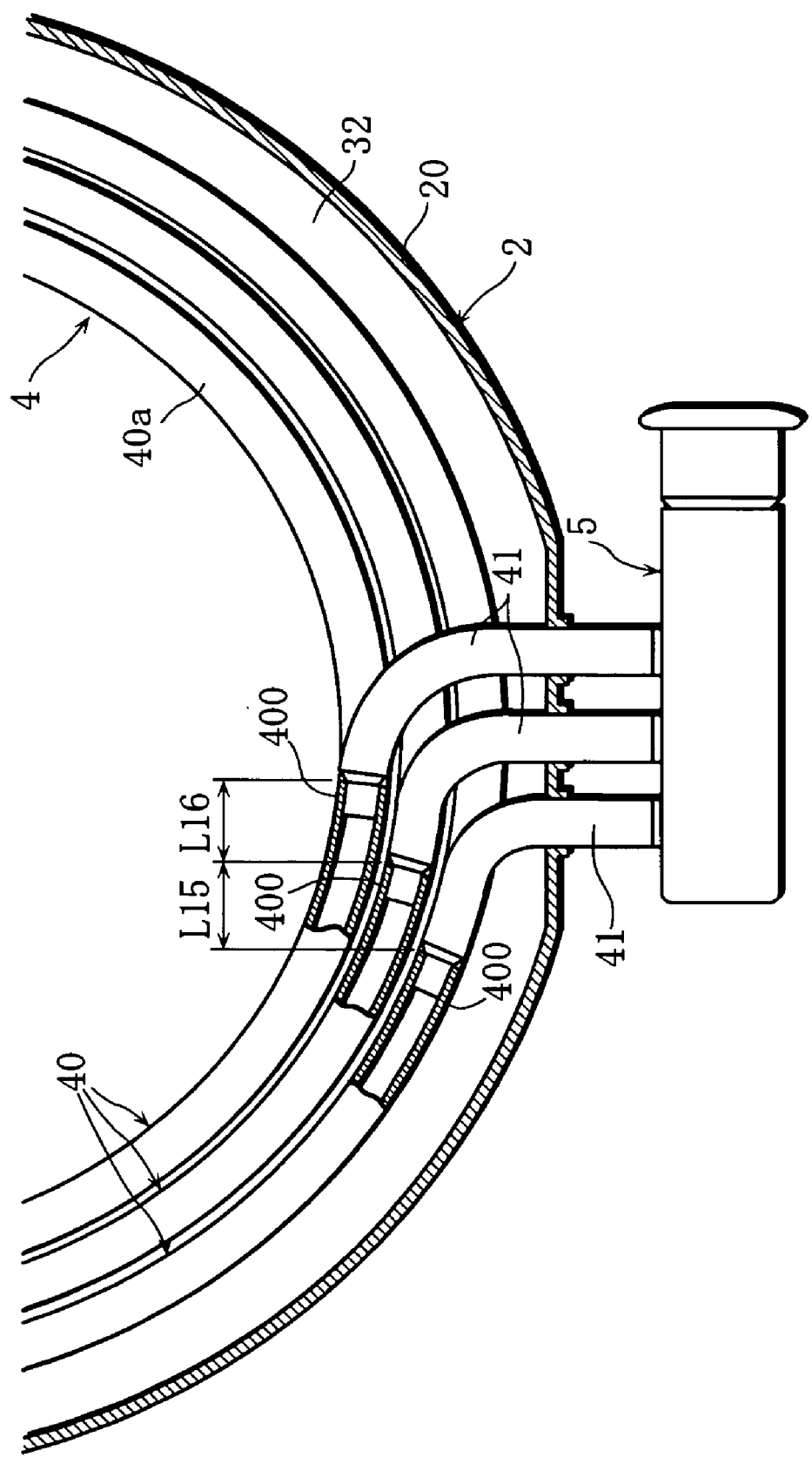
FIG. 56 is a horizontal sectional view showing a principal portion of another example of connection structure of a plurality of bent tubes used for header connection.

In the embodiment shown in FIG. 56, the ends 400 of a plurality of helical tubes 40 are positionally deviated in the circumferential direction of the helical tubes 4 by predetermined distances L15, L16. According to this embodiment, respective connection portions between the ends 400 and the bent tubes 41 are spaced from each other. Therefore, when the connection portions are to be subjected to welding, for example, the connection portions do not come into contact with each other in welding, so that the plurality of helical tubes 40 are prevented from being bonded to each other.

Figure 57:
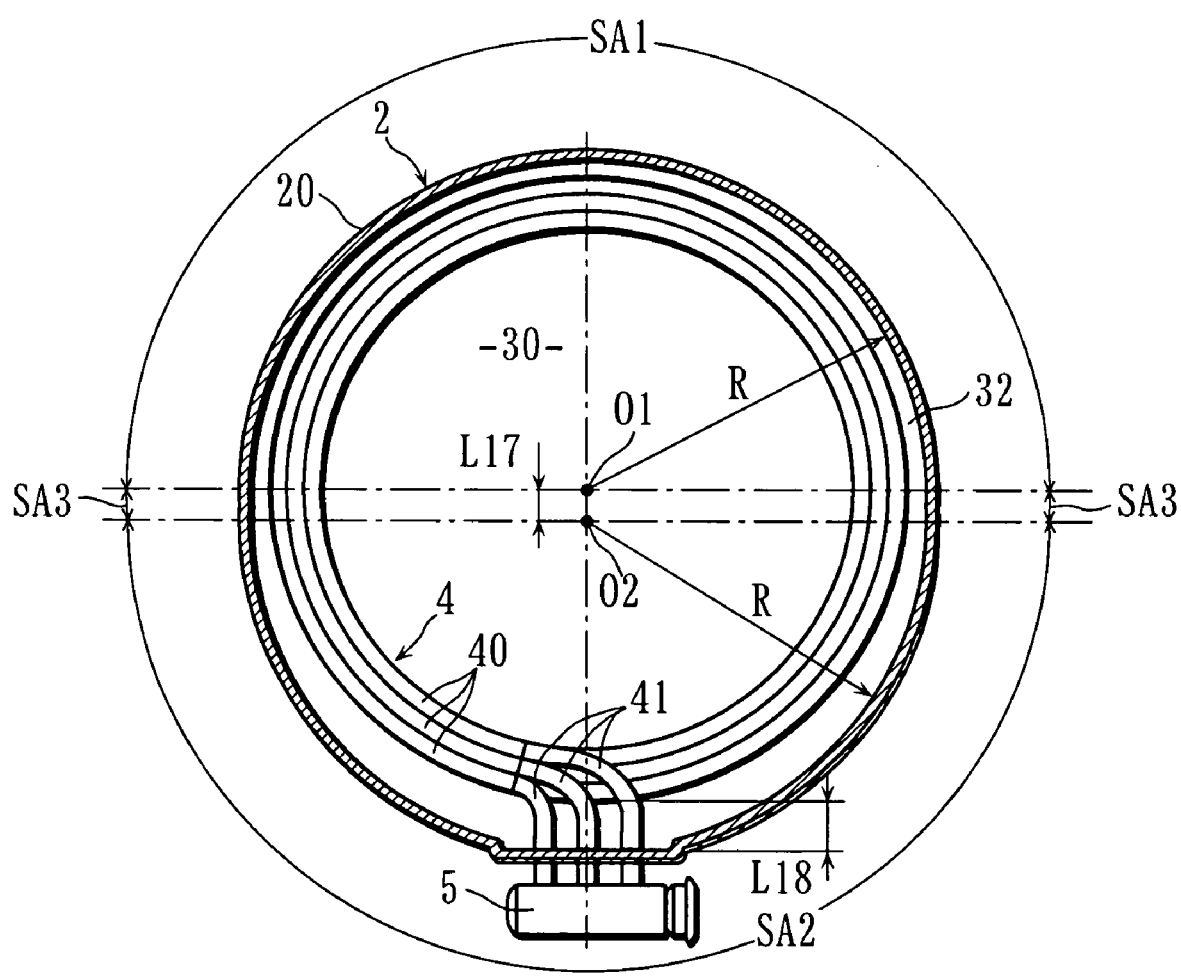
FIG. 57 is a schematic horizontal sectional view showing another example of heat exchanger according to the present invention.

In the embodiment shown in FIG. 57, the circumferential wall 20 of the housing 2 is out of round and has a generally cylindrical shape made up of a first portion SA1 and a second portion SA2 respectively having centers of curvature O1 and O2 which are offset from each other. Specifically, the center O1 corresponds to the center of the plurality of helical tubes 40, and the first portion SA1 is semicircular in cross section having a radius R from the center O1. The center O2 is offset from the center O1 toward the bent tubes 41 by a distance L17, and the second portion SA2 is semicircular in cross section having a radius R from the center O2. Opposite ends of the first portion SA1 and opposite ends of the second portion SA2 are smoothly connected to each other via third portions SA3. The plurality of bent tubes 41 penetrate through the center of the circumference of the second portion SA2.

According to this embodiment, the space between the circumferential wall 20 and the helical tubes 40 in the radial direction (corresponding to the combustion gas path 32) has a relatively large dimension L18 at the portion where the bent tubes 41 penetrate through the circumferential wall 20. When the dimension L18 is large, the second ends 41b of the bent tubes 41 can be caused to properly penetrate through the circumferential wall 20 even when the bent tubes are gently curved. According to the present invention, on the other hand, the space between the circumferential wall 20 and the helical tubes 40 in the radial direction is prevented from becoming extremely large locally. Therefore, the amount of combustion gas flowing through the combustion gas path 32 is prevented from varying largely among portions in the circumferential direction.

Figure 58:
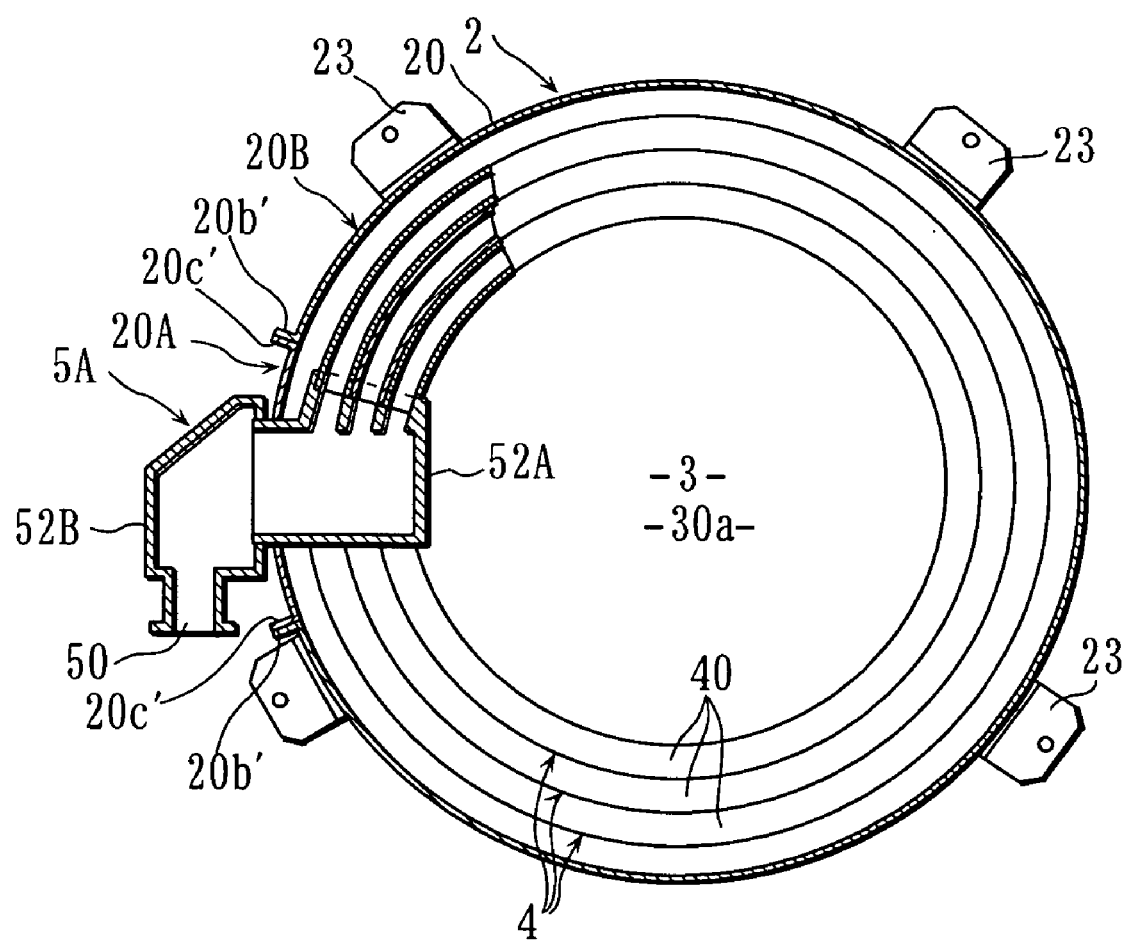
FIG. 58 is a schematic horizontal sectional view showing another example of heat exchanger according to the present invention.

In the embodiment shown in FIG. 58, a header 5A is directly connected to the ends of a plurality of helical tubes 40. The header 5A includes a first casing 52A connected to each of the helical tubes 40 and penetrating through the circumferential wall 20 of the housing 2 to partially project out from the housing 2, and a second casing 52B connected to the projecting portion of the first casing 52A and having a connection port 50 for a tube. The portion of the circumferential wall where the header 5A penetrates comprises a first plate 20A formed with a through-hole for inserting the header. A second plate 20B is bonded to opposite edges of the first plate 20A.

As will be understood from this embodiment, in the present invention, instead of the structure in which the ends of water tubes penetrate through the circumferential wall of the housing, the structure in which the header penetrates through the circumferential wall maybe employed. By connecting the header directly to the helical tubes of the water tubes, the bent tubes 41 can be eliminated.

Figure 59:
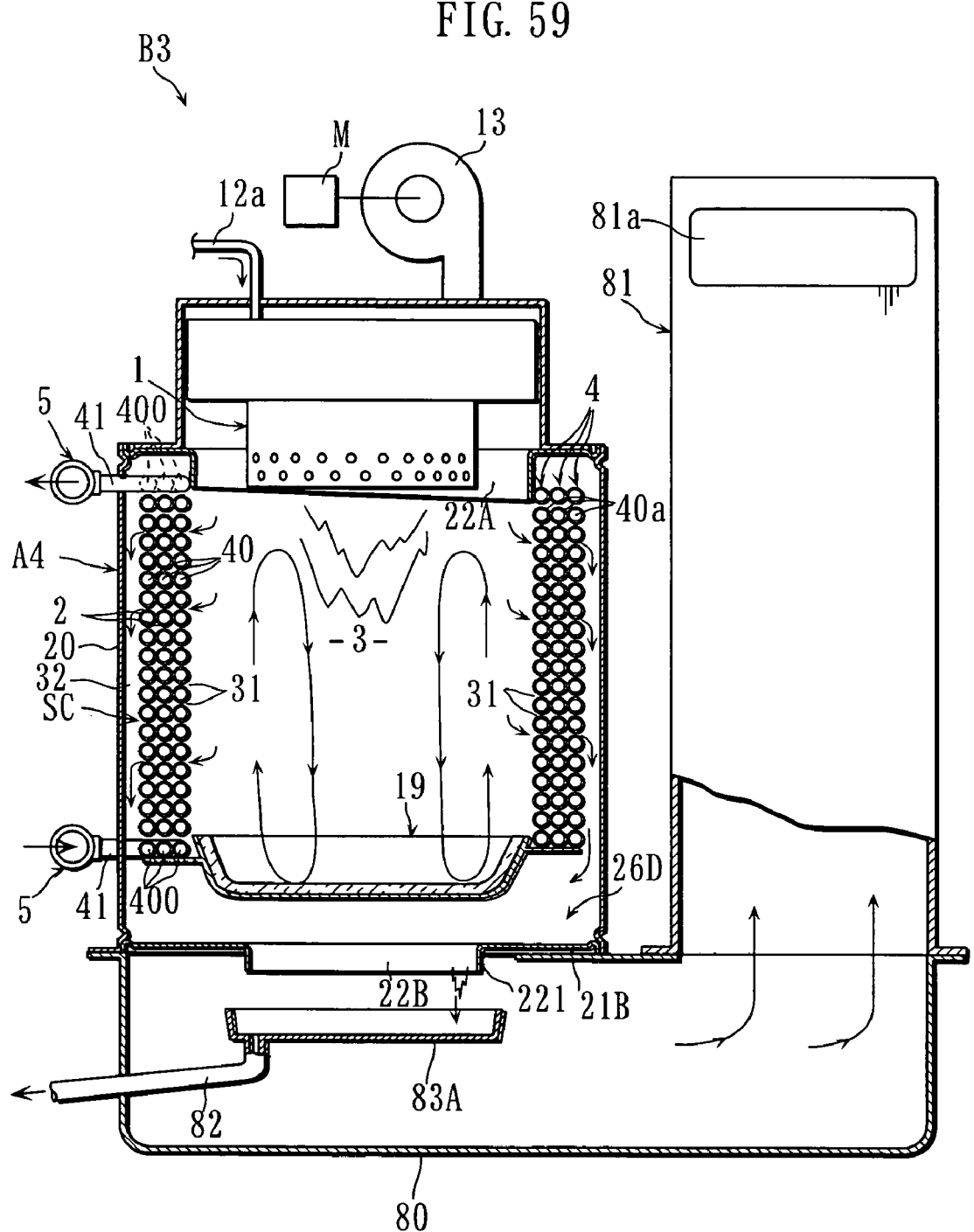
FIG. 59 is a schematic sectional view showing another example of heat exchanger and water heater incorporating the heat exchanger according to the present invention.
Figure 60:
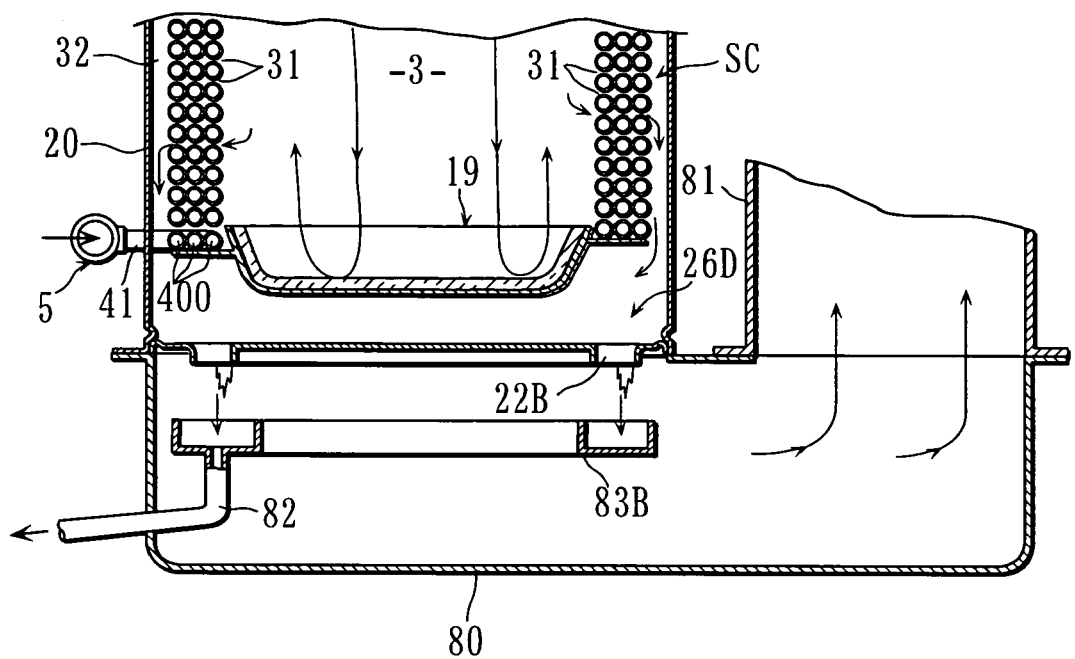
FIG. 60 is a sectional view showing a principal portion of another example of water heater.
Figure 61:
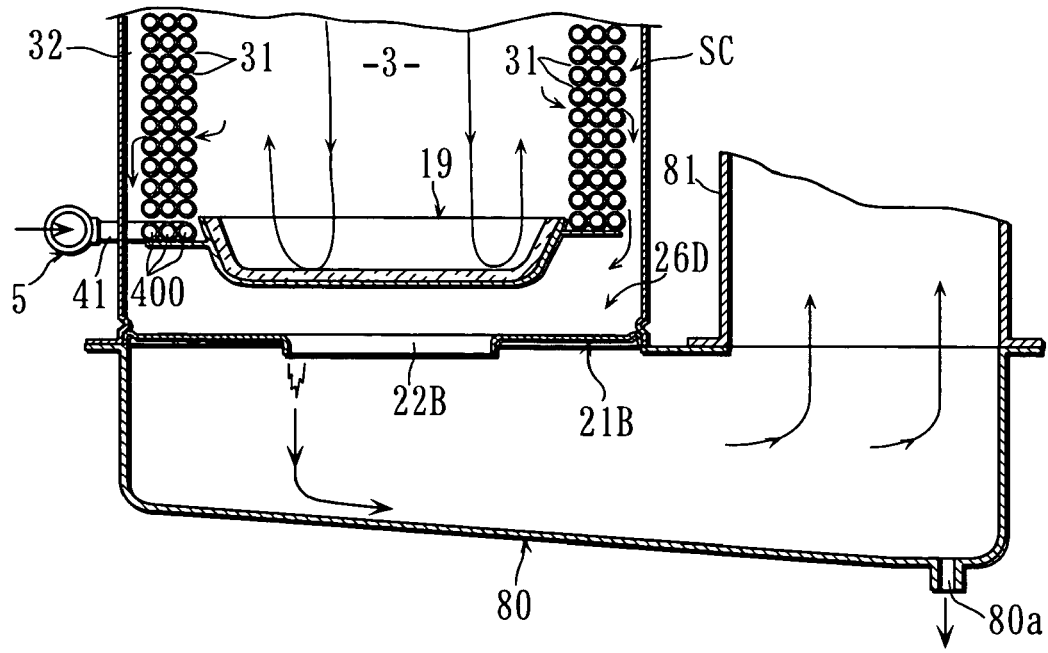
FIG. 61 is a sectional view showing a principal portion of another example of water heater according to the present invention.

FIGS. 59-61 show other examples structure for drain disposal.

In the water heater B3 shown in FIG. 59, the annular wall 221 of the heat exchanger A4 projects downward. When drain drops onto the cover 21B, the drain drops downward through the combustion gas outlet 22B. The cover 21B is an example of drain guide according to the present invention. In the bottom casing 80, a receiving member 83A in the form of a pan for receiving the drain dropping from the combustion gas outlet 22B is supported by an appropriate supporting member (not shown). The drain received in the receiving member 83A is discharged out of the bottom casing 80 through the pipe 82.

Also in this embodiment, the bottom casing 80 is prevented from being contaminated by the drain. Since the combustion gas outlet 22B also serves as a drain discharge port, a discharge port solely for discharging drain does not need to be provided in the heat exchanger A2, which is advantageous for simplifying the structure of the heat exchanger A2.

In the embodiment shown in FIG. 60, the combustion gas outlet 22B of the heat exchanger A3 is generally ring-shaped. The combustion gas outlet 22B also serves as a drain discharge port, and a ring-shaped receiving member 83B for receiving drain is arranged below the port. Also in this embodiment, the same advantages as those of the embodiment shown in FIG. 59 are obtained.

In the embodiment shown in FIG. 61, the drain dropping through the combustion gas outlet 22B of the heat exchanger A2 is received by the bottom wall of the bottom casing 80. The bottom wall is formed with a drain discharge port 80a. Preferably, the bottom wall is so inclined that the drain flows smoothly toward the drain discharge port 80a. In this embodiment, since the bottom casing 80 is utilized as a drain receiving member, a member to be used solely for receiving drain does not need to be provided, which is advantageous for reducing the number of parts. Since the bottom casing 80 needs to be prevented from being easily corroded by the acidic drain, it is preferable to make the bottom casing 80 out of stainless steel or other acid-resistant materials.

FIGS. 62-68 show other examples of water tube structure.

Figure 62:
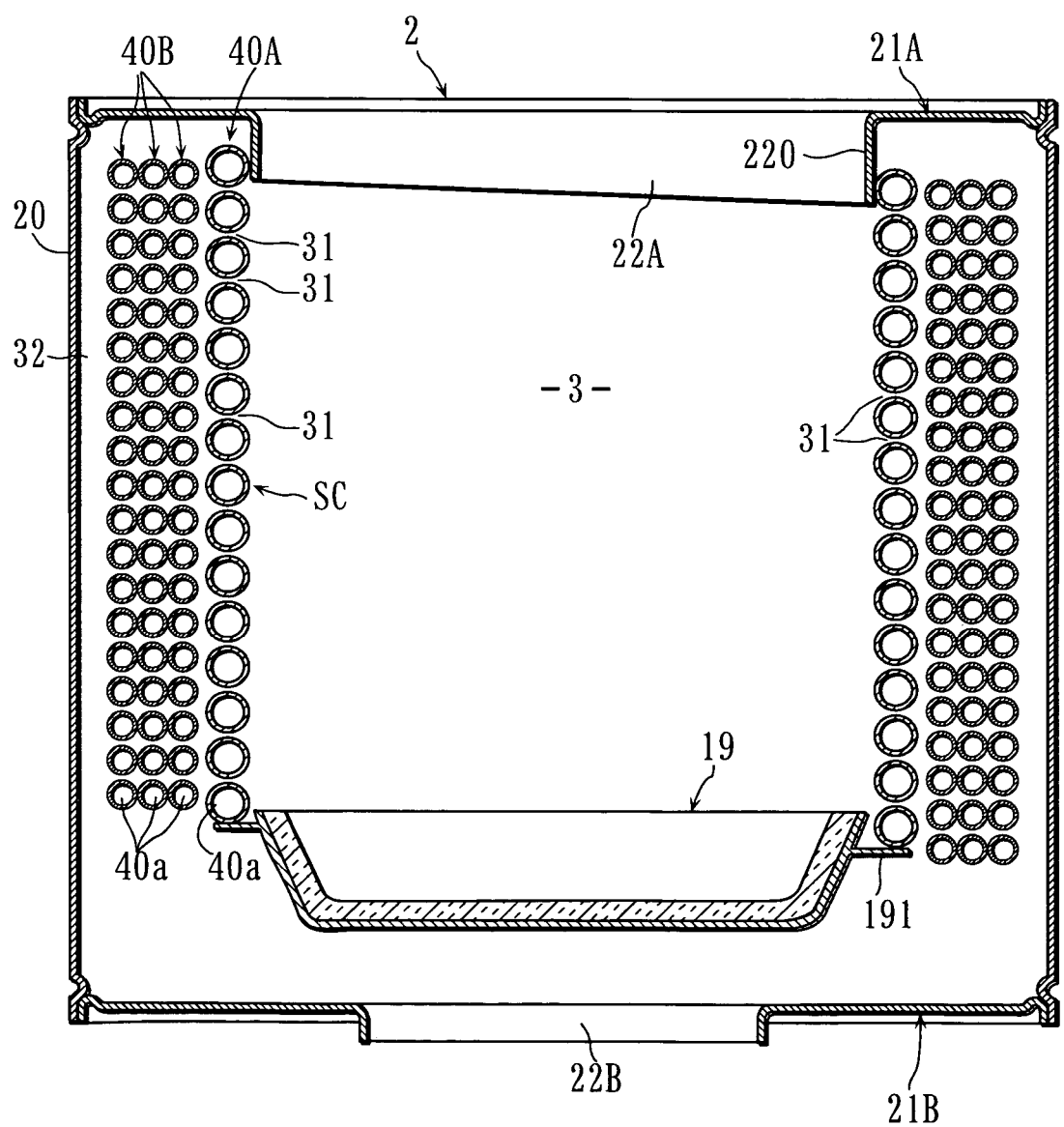
FIG. 62 is a sectional view showing another example of head exchanger according to the present invention.
Figure 63:
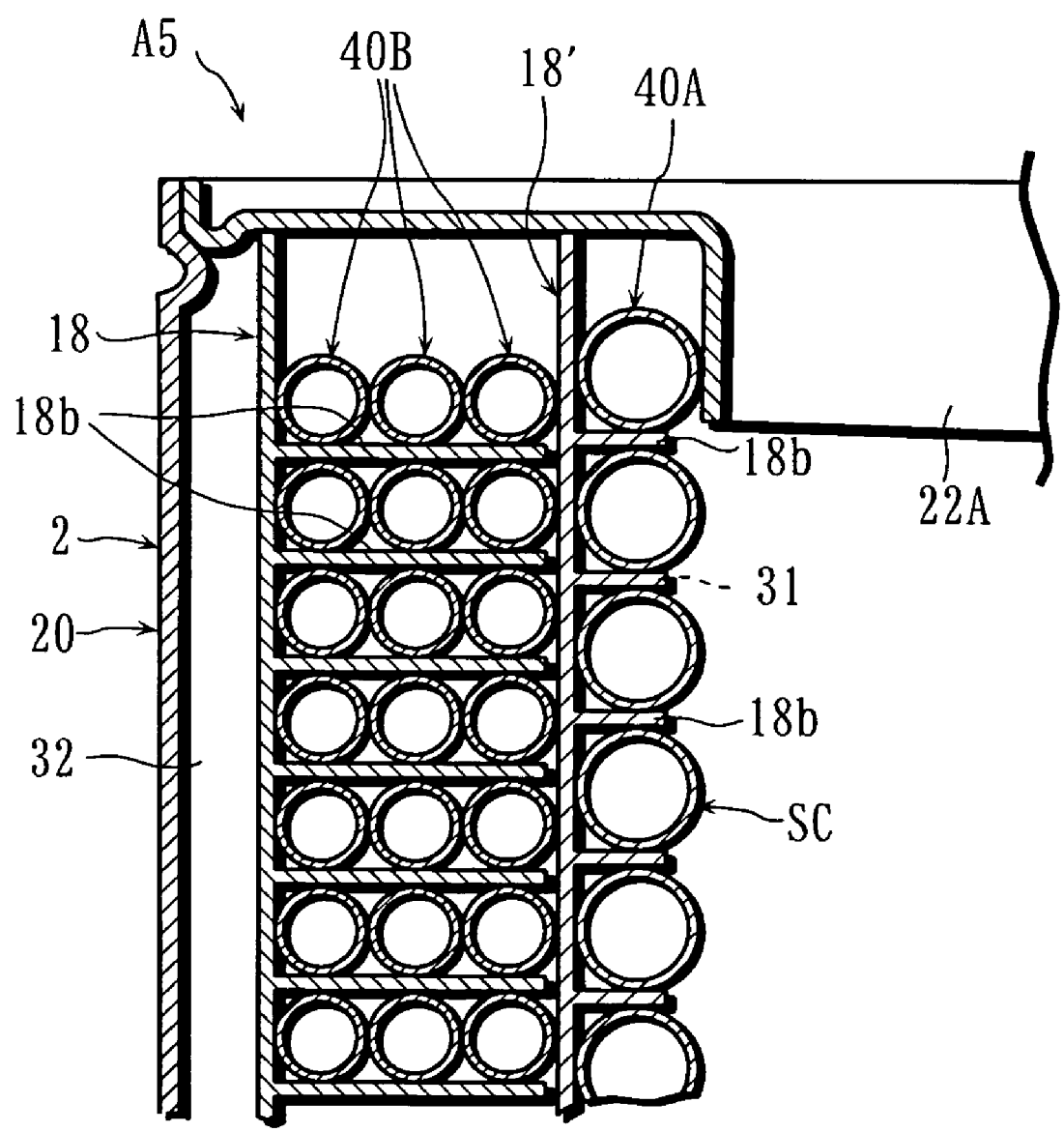
FIG. 63 is a sectional view showing a principal portion of FIG. 62.

In the heat exchanger A5 shown in FIG. 62, the plurality of coiled tubes 40 are not equal in tube diameter, and the tube diameter of the innermost coiled tube 40A(40) is larger than those of other coiled tubes 40B(40). As shown in FIG. 63, since the helical pitch of the coiled tube 40A differs from that of the coiled tubes 40B, a spacer 18' which differs from the spacer 18 in arrangement pitch of the projections 18b is used as means for forming clearances 31 between the loops 40a of the coiled tube 40A.

In this embodiment, a large amount of water flows through the coiled tube 40A having a larger tube diameter. The coiled tube 40A is the tube which is heated to a highest temperature because it directly surrounds the space 3 serving as the combustion chamber. Therefore, the amount of heat recovery by the coiled tube 40A is large, and the heat exchange efficiency can be further enhanced. Moreover, since the coiled tube 40A and coiled tubes 40B differ from each other in helical pitch due to the difference of the tube diameter, a stepped portion in the height direction is formed between each of the clearances 31 of the coiled tube 40A and the clearances 31 of the coiled tubes 40B. Therefore, the combustion gas flowing from the space 3 hits against the coiled tubes 40B after passing through the clearances 31 of the coiled tube 40A. Therefore, the degree of contact between the coiled tubes 40 and the combustion gas is increased, which further enhances the heat exchange efficiency.

As will be understood from the above-described embodiment, in the present invention, the tube diameters of the plurality of coiled tubes do not need to be equal. Contrary to the above embodiment, the coiled tube having the largest tube diameter may be placed at the outermost position so that the latent heat recovery is performed by the coiled tube. Further, all the coiled tubes may be different from each other in tube diameter.

Figure 64:
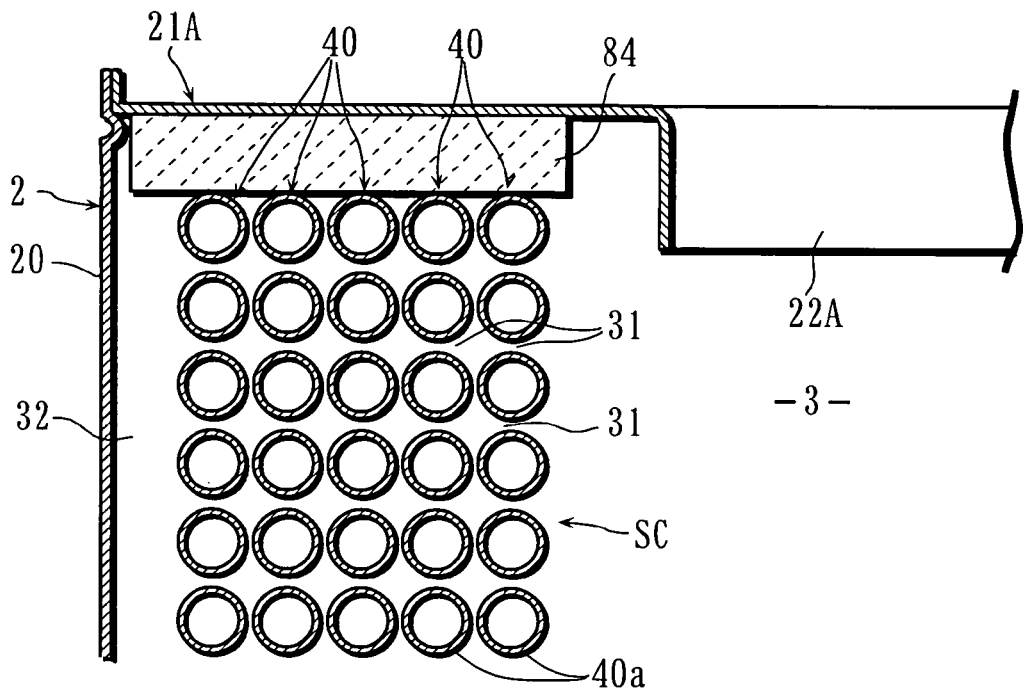
FIG. 64 is a sectional view showing a principal portion of another example of heat exchanger according to the present invention.

In the embodiment shown in FIG. 64, five coiled tubes in all are arranged in a lap winding manner. A heat insulating member 84 is interposed between the coiled tubes 40 and the cover 21. The heat insulating member 84 will be described later in detail with reference to FIG. 79. According to this embodiment, the heat exchange efficiency is enhanced by increasing the number of coiled tubes 40. As will be understood from this embodiment, according to the present invention, high heat exchange efficiency can be easily obtained by increasing the number of coiled tubes. It is only necessary that the tube lap winding structure is made up of a plurality of coiled tubes, and the number of coiled tubes is not limited.

Figure 65:
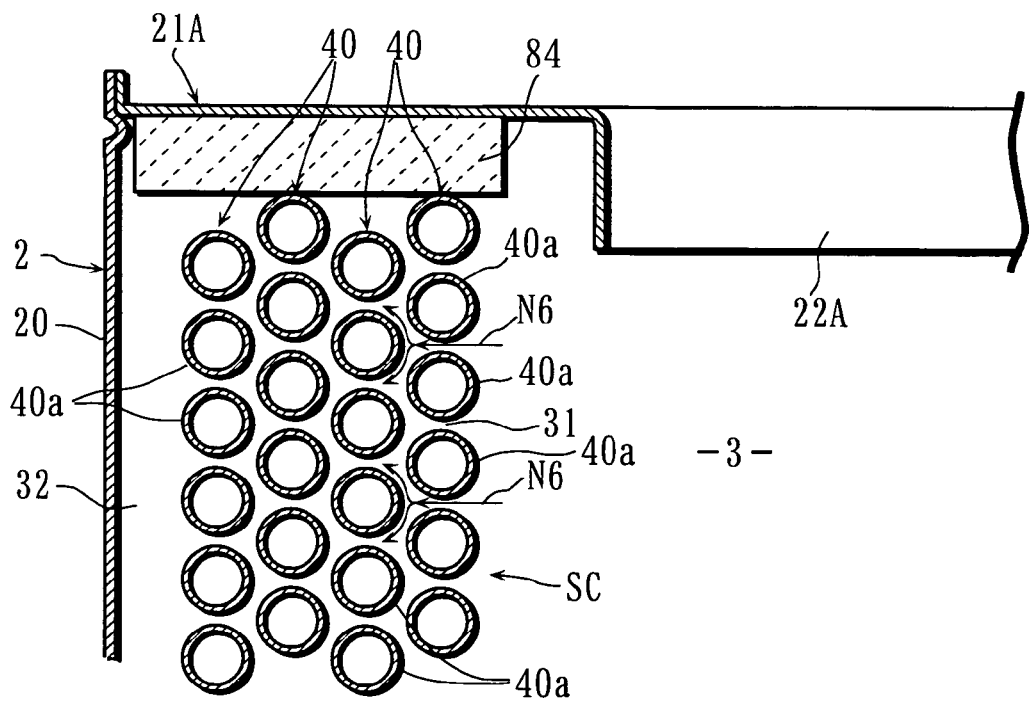
FIG. 65 is a sectional view showing a principal portion of another example of heat exchanger according to the present invention.

In the embodiment shown in FIG. 65, a plurality of coiled tubes 40 are provided in a staggered arrangement. Beside a clearance 31 between adjacent loops 40a of one coiled tube 40, a loop 40a of another coiled tube 40 exists. In this embodiment, although the coiled tubes 40 are equal to each other in tube diameter, the combustion gas passed through a clearance 31 of one coiled tube 40A hits against the loop 40a positioned beside the clearance, as indicated by the arrows N6. Therefore, the degree of contact between the combustion gas and the loops 40a is increased, whereby the amount of heat recovery is increased. As will be understood from this embodiment, in the present invention, the heat exchange efficiency can be enhanced also by contriving the arrangement of the plurality of coiled tubes 40, and the coiled tubes 40 can be arranged in various ways.

Figure 66:
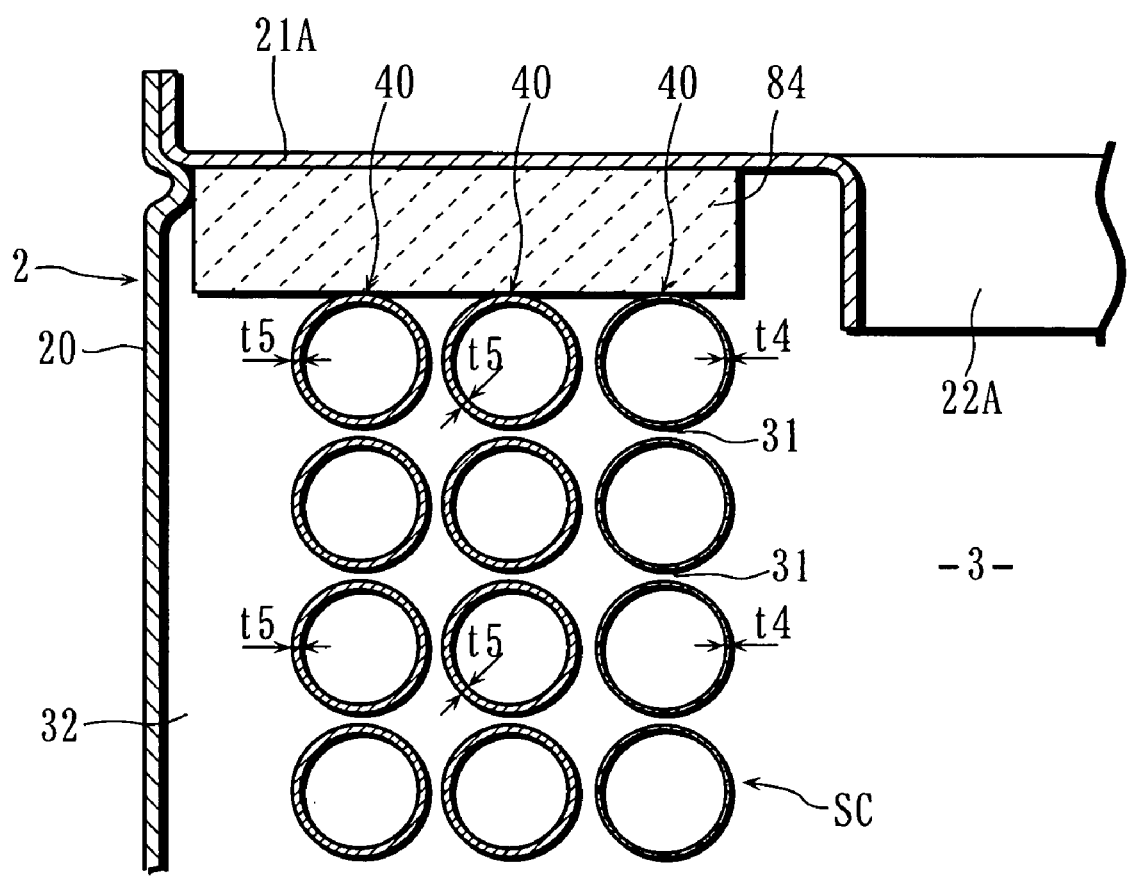
FIG. 66 is a sectional view showing a principal portion of another example of heat exchanger according to the present invention.

In the embodiment shown in FIG. 66, the plurality of coiled tubes 40 are generally equal to each other in outer diameter but have different thicknesses t4, t5. The smaller the thickness of a coiled tube 40 is, the larger the amount of heat transferred to the water in the coiled tube is. Therefore, by using the coiled tubes 40 having different thicknesses, the ratio of heat recovery of the plurality of coiled tubes 40 can be adjusted. Not only the thicknesses but also the tube diameters of the coiled tubes 40 may be made different.

Figure 67:
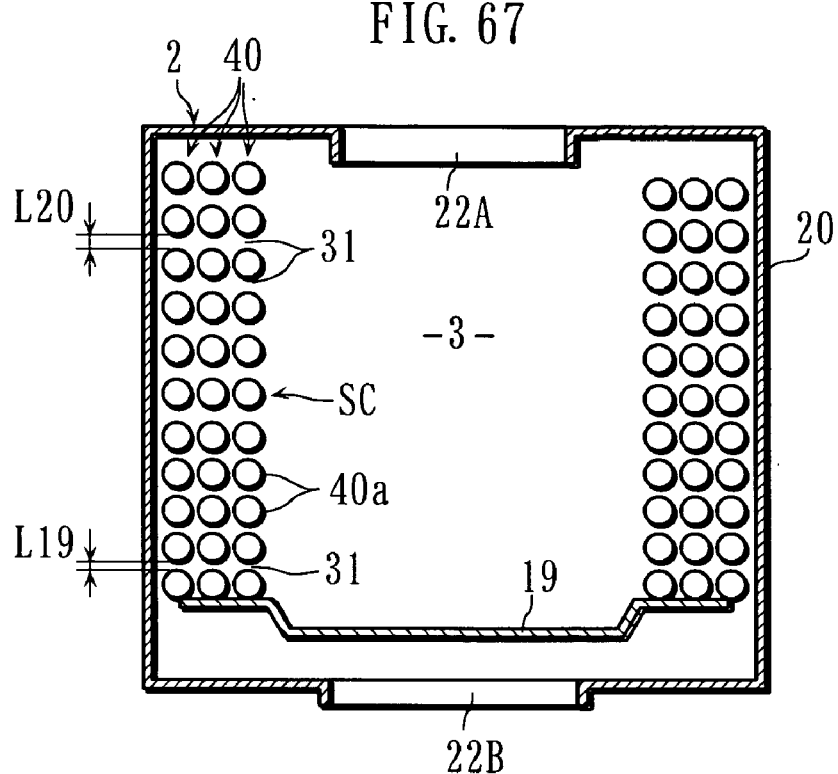
FIG. 67 is a schematic sectional view showing another example of heat exchanger according to the present invention.
Figure 68:
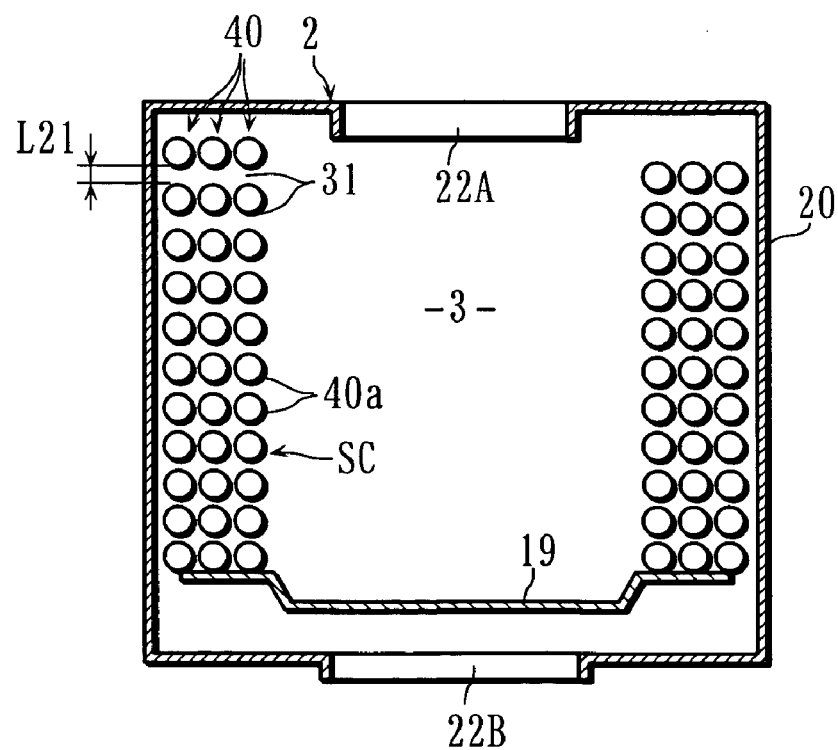
FIG. 68 is a schematic sectional view showing another example of heat exchanger according to the present invention.

In the embodiment shown in FIGS. 67 and 68, the dimensions of the clearances 31 of the coiled tubes 40 are unequal. Specifically, in the embodiment shown in FIG. 67, the dimension L19 of the clearances 31 at a lower region of the coiled tubes 40 is smaller than the dimension L20 of the clearances 31 at an upper region. In the embodiment shown in FIG. 68, the dimension L21 of the clearances 31 gradually reduces as proceeding from an upper region toward a lower region of the coiled tubes 40.

The structures of these embodiments are similar to those of the embodiments shown in FIGS. 18A and 18B. In the temperature distribution in the space 3, the temperature in a lower region tends to be higher than the temperature in an upper region, because the burner 1 performs combustion downwardly. Therefore, by making the clearances 31 smaller at the lower region which is likely to become hot, the degree of contact between the high-temperature combustion gas and the coiled tubes 40 can be increased, whereby the amount of heat recovery is increased. However, contrary to the above, the clearances 31 at the upper region of the coiled tubes 40 may be made small while the clearances 31 at the lower region may be made large.

FIGS. 69-78 show other examples of means for forming clearances between loops of a coiled tube.

Figure 69:
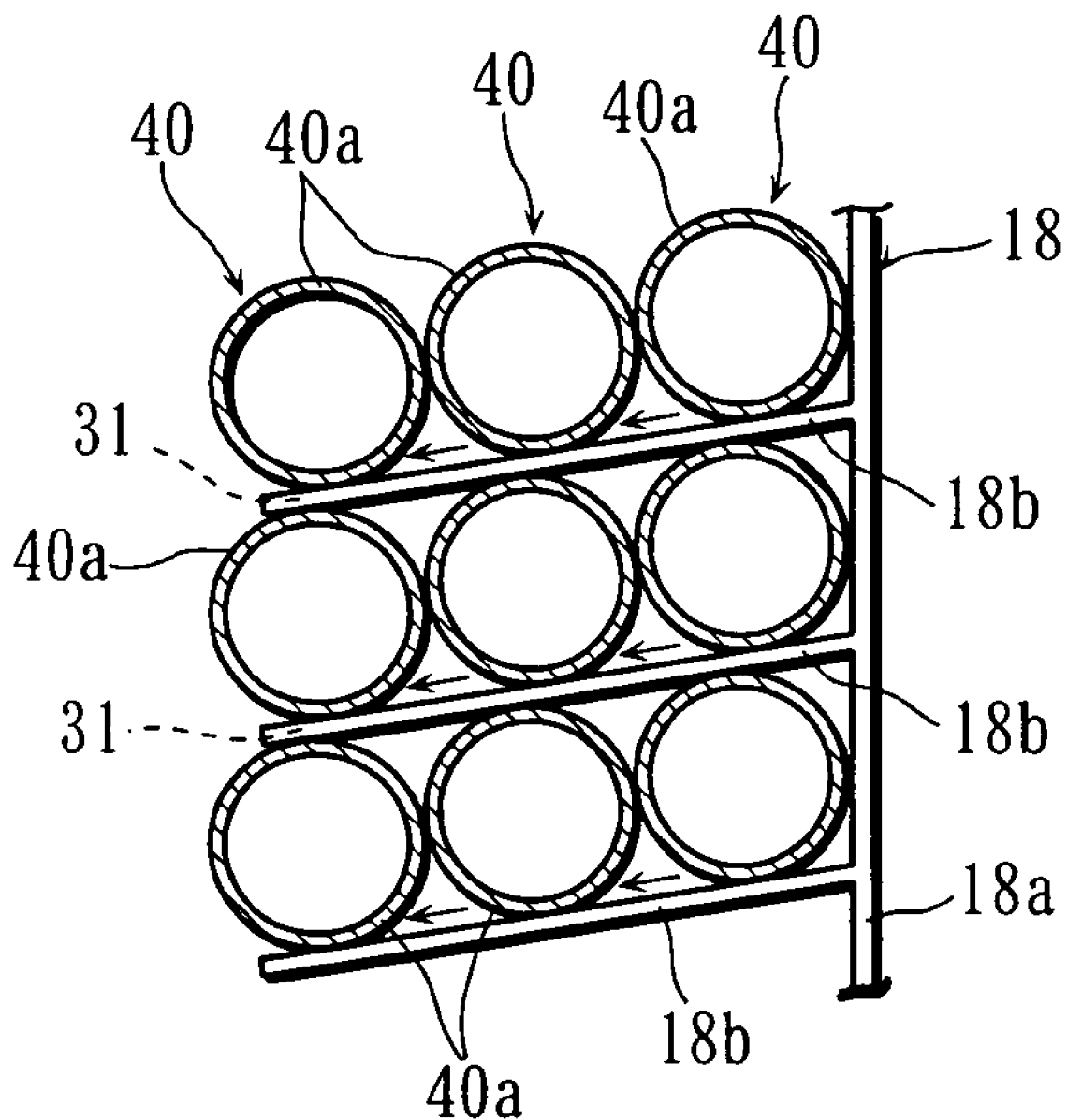
FIG. 69 is a sectional view showing a principal portion of another example of spacer used in the present invention.

In the embodiment shown in FIG. 69, each projection 18b of the spacer 18 is so inclined as to become lower as proceeding toward the distal end. A plurality of loops 40a are arranged along each projection 18b to be inclined in the predetermined direction. According to this embodiment, when the drain generated at the surfaces of the coiled tubes 40 flowed onto the each projection 18b, the drain readily flows toward the distal end of the projection 18b. In this way, the dropping of drain can be promoted.

Figure 70:
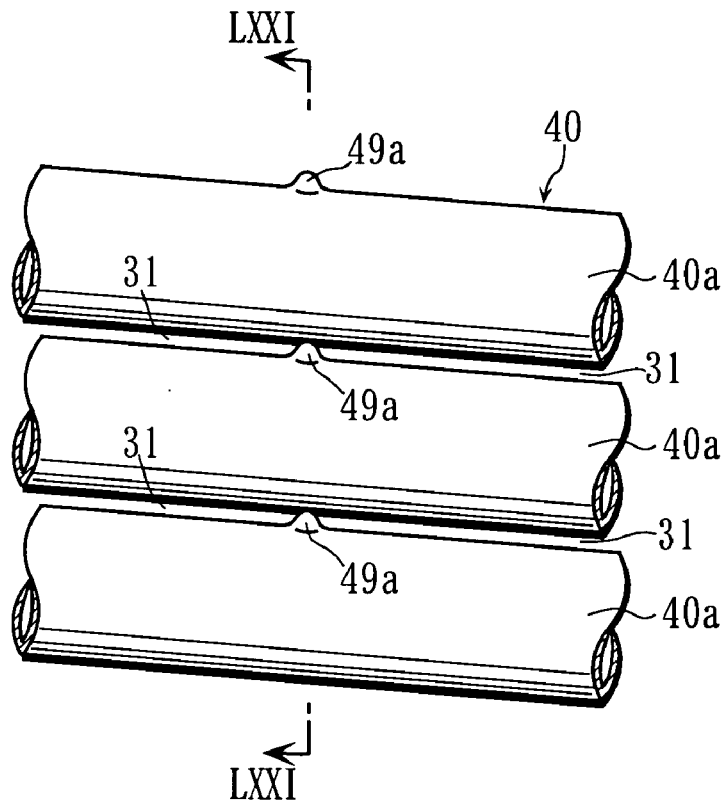
FIG. 70 is a side view showing a principal portion of another example of means for forming clearances between loops of a coiled tube in the present invention.
Figure 71:
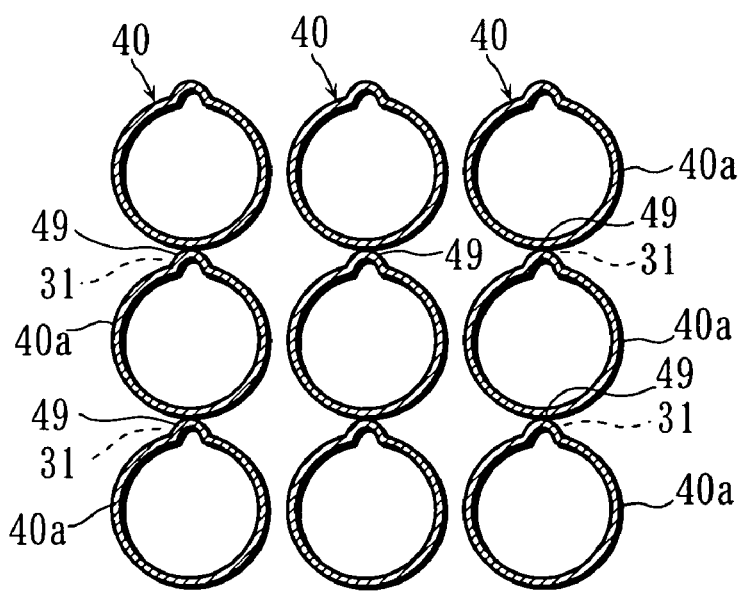
FIG. 71 is a sectional view taken along lines LXXI-LXXI in FIG. 70.

In the embodiment shown in FIGS. 70 and 71, each loop 40a of the coiled tubes 40 is formed with a projection 49a. Vertically-adjacent loops 40a are held in contact with each other via the projection 49a, whereby clearances 31 are defined.

Figure 72:
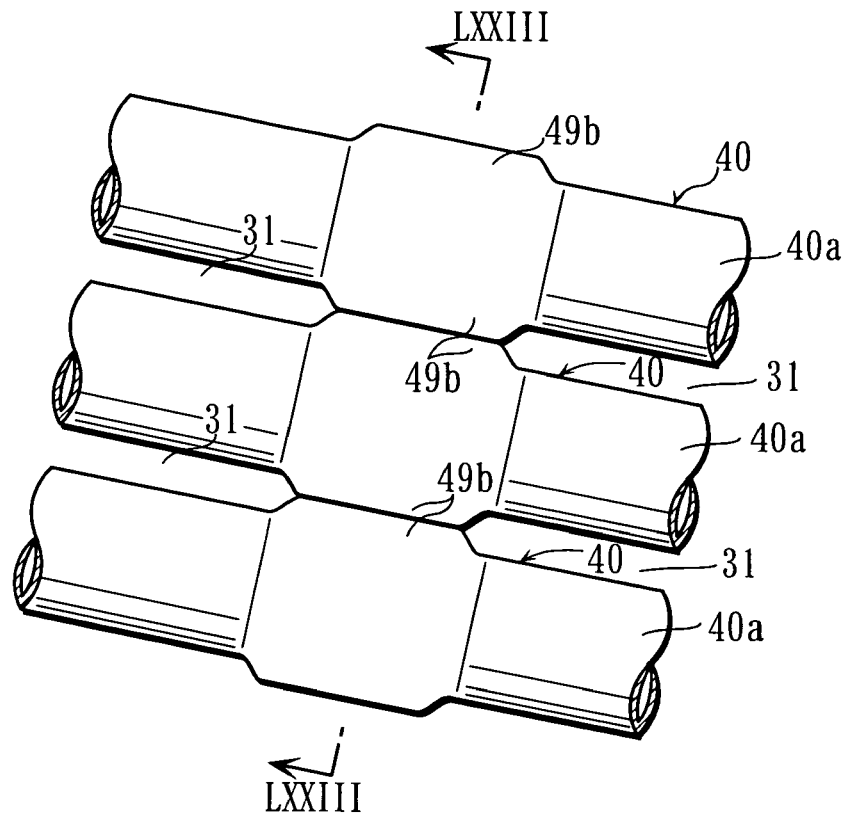
FIG. 72 is a side view showing a principal portion of another example of means for forming clearances between loops of a coiled tube in the present invention.
Figure 73:
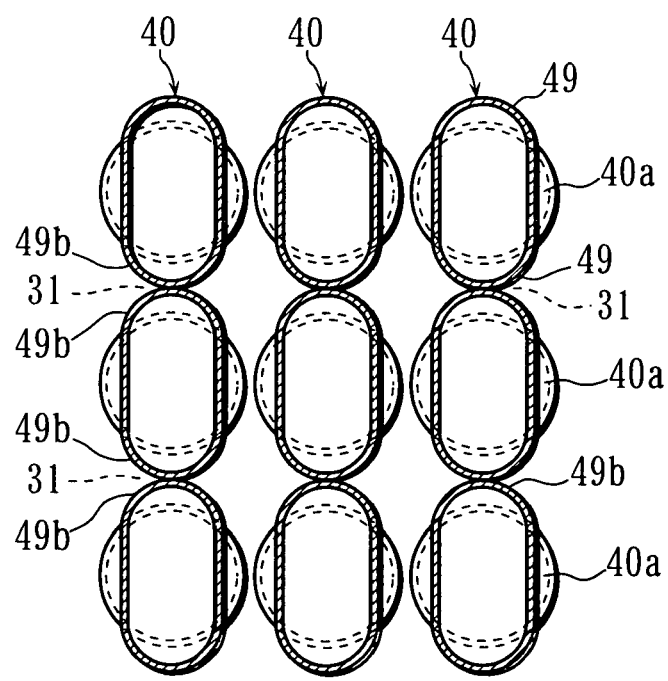
FIG. 73 is a sectional view taken along lines LXXIII-LXXIII in FIG. 72.
Figure 74:
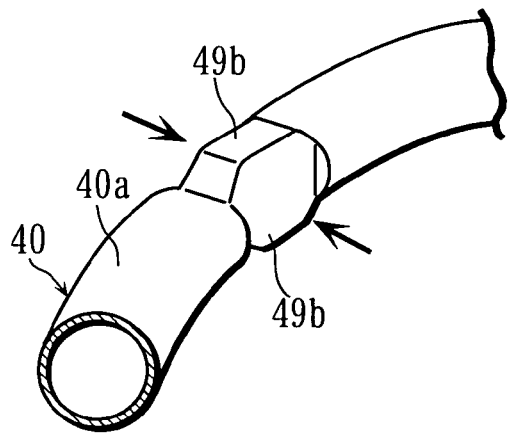
FIG. 74 is a perspective view of a coiled tube shown in FIGS. 72 and 73.

In the embodiments shown in FIGS. 72 and 73, part of the upper surface and part of the lower surface of each loop 40a are projections 49b. Adjacent loops 40a are held in contact with each other via the projection 49b, whereby clearances 31 are defined. For example, as shown in FIG. 73, each loop 40a comprises a tube which is circular in cross section but includes a portion which is not circular but flat in cross section, whereby the projections 49b are formed. As shown in FIG. 74, the projections 49b can be formed by pressing part of the coiled tube 40 from opposite sides.

Figure 75A:
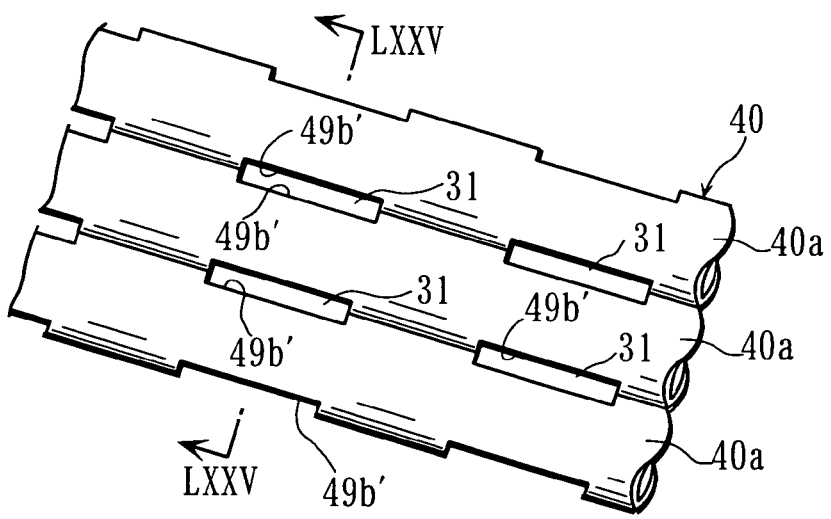
Figure 75B:
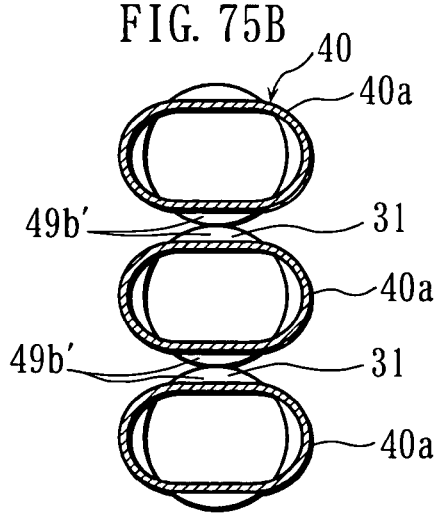
FIG. 75B is a sectional view taken along lines LXXV-LXXV in FIG. 75A.

In the embodiment shown in FIGS. 75A and 75B, a plurality of recesses 49b' are formed at each of the loops 40a. The recesses 49b' can be formed by pressing part of the coiled tube 40 from above and below to form flat surfaces. Loops 40a which are adjacent to each other in the height direction are stacked in contact with each other, but clearances 31 are defined between the loops at the locations where the recesses 41 are formed. With such a structure again, clearances 31 can be formed properly.

Figure 76:
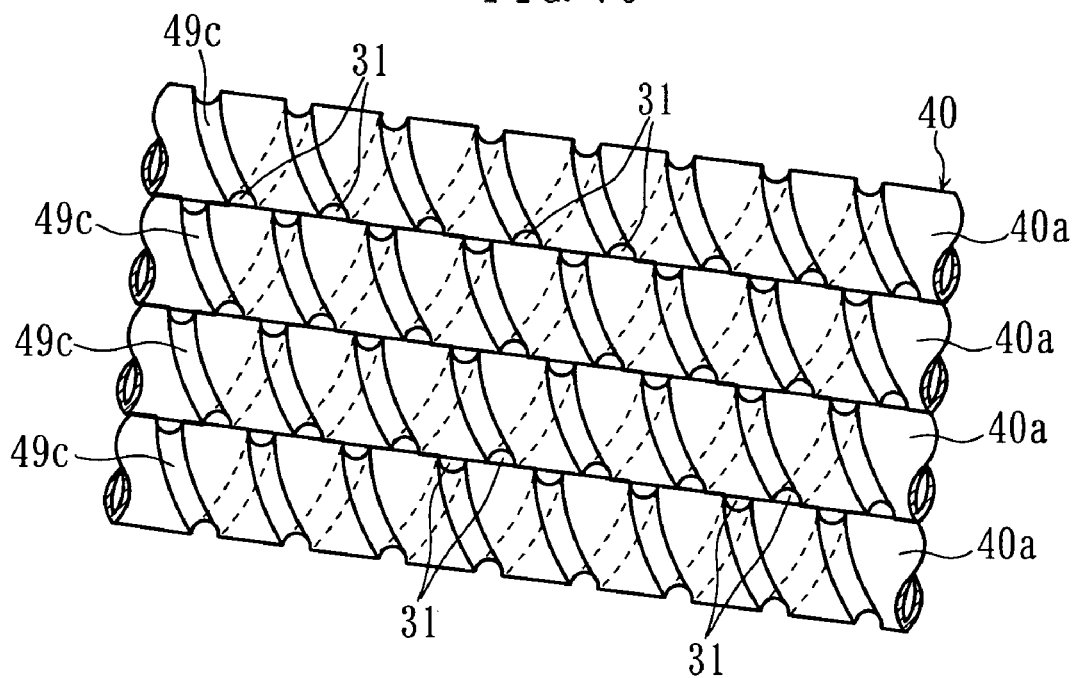
FIG. 76 is a side view showing a principal portion of another example of means for forming clearances between loops of a coiled tube in the present invention.
Figure 77:
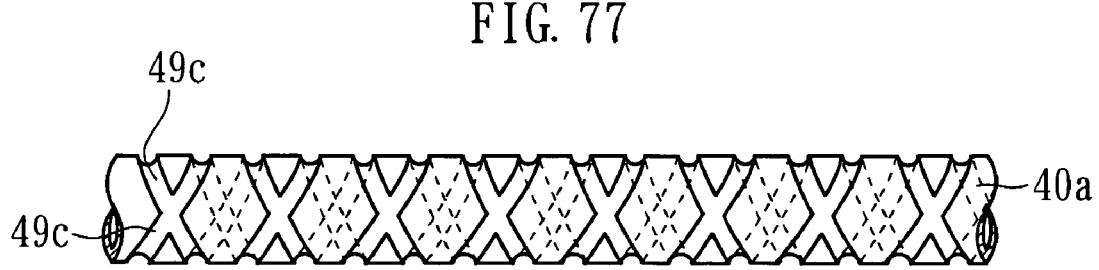
FIG. 77 is a side view showing a principal portion of another example of means for forming clearances between loops of a coiled tube in the present invention.
Figure 78:
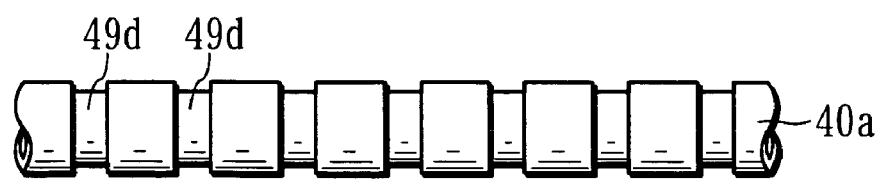
FIG. 78 is a side view showing a principal portion of another example of means for forming clearances between loops of a coiled tube in the present invention.

In the embodiment shown in FIG. 76, a helical groove 49c is formed on the outer surface of each loop 40a, and part of the groove 49c serves as a clearance 31. In the embodiment shown in FIG. 77, two strips of grooves 49c which differ from each other in direction of helix are formed. As the number of grooves 49c increases, the total size of the clearances 31 increases. Therefore, a large number of grooves 49c may be formed. In the embodiment shown in FIG. 78, a plurality of non-helical annular grooves 49 are formed on the outer surface of the loop 40a. Also by such a structure, the clearances 31 can be formed.

According to the embodiments shown in FIGS. 70-78, the clearances 31 can be formed without using a spacer 18 so that the work for mounting the spacer can be eliminated. Therefore, the assembling of the heat exchanger is facilitated.

FIG. 79-82 show other examples of means for preventing combustion gas from entering between the upper end of the tube lap winding structure SC and the cover 21A.

Figure 79:
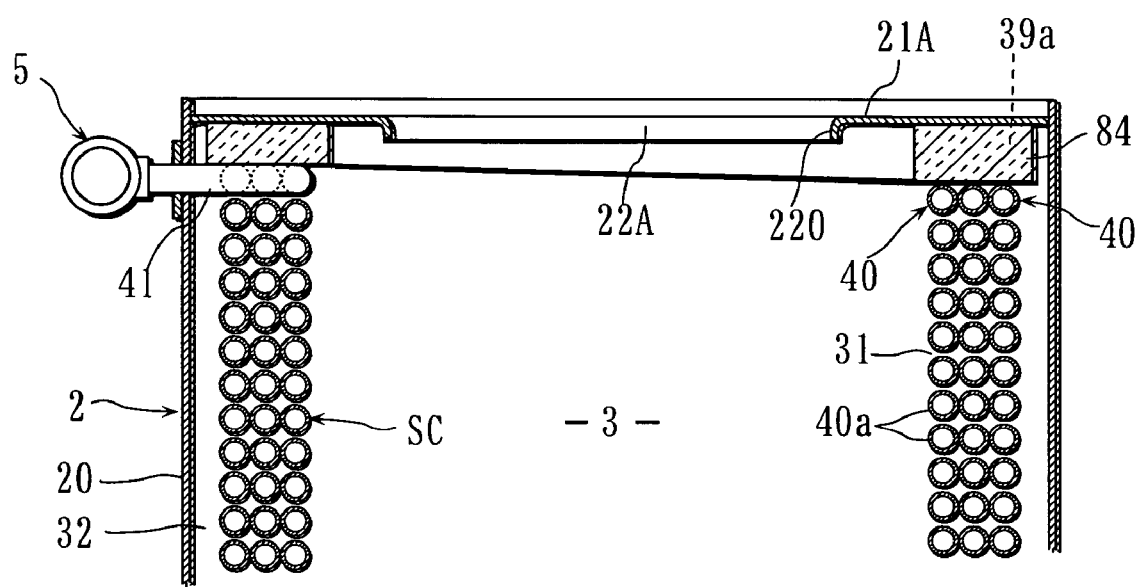
FIG. 79 is a sectional view showing a principal portion of another example of means for closing a gap above a tube lap winding structure in the present invention.

In the embodiment shown in FIG. 79, a ring-shaped heat insulating member 84 is arranged in a gap 39a between the upper end of the tube lap winding structure SC and the cover 21A to close the gap 39a. The heat insulating member 84 may be made of a flexible ceramic material, for example. As noted before, since the tube lap winding structure SC is made up of helical tubes which are inclined, the height of the gap 39a is not uniform but inclined. Accordingly, the heat insulating member 84 does not have a constant thickness, and the bottom surface thereof is inclined. According to this embodiment, unlike the foregoing embodiments, the annular wall 220 of the cover 21A does not need to be held in contact with the inner circumferential surface of the innermost coiled tube 40. With this structure, therefore, the diameter of the burner opening 22A can be made smaller than the inner diameter of the coiled tube 40.

Figure 80:
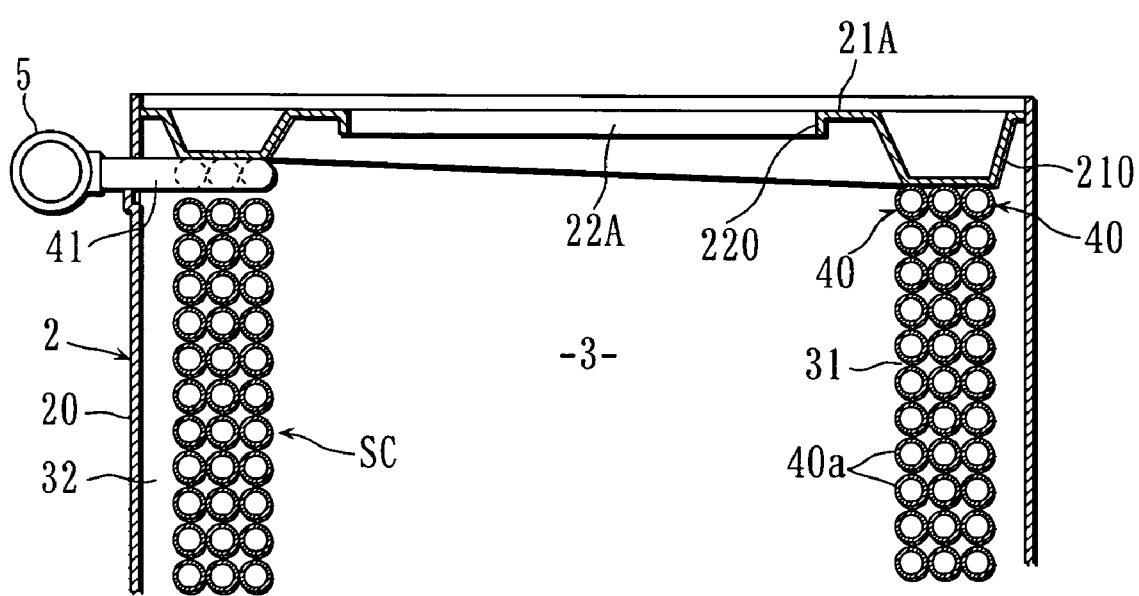
FIG. 80 is a sectional view showing a principal portion of another example of means for closing a gap above a tube lap winding structure in the present invention.

In the embodiment shown in FIG. 80, the cover 21A is formed with a downward projection 210 by press molding. The projection 210 is held in contact with the upper end of the tube lap winding structure SC. The lower surface of the projection 210 is inclined correspondingly to the upper end surface of the tube lap winding structure SC. According to this embodiment, a gap through which the combustion gas flows is prevented from being formed above the tube lap winding structure SC. Further, the heat insulating member 84 shown in FIG. 79 is unnecessary, and the annular wall 220 does not need to be held in contact with the coiled tube 40.

Figure 81:
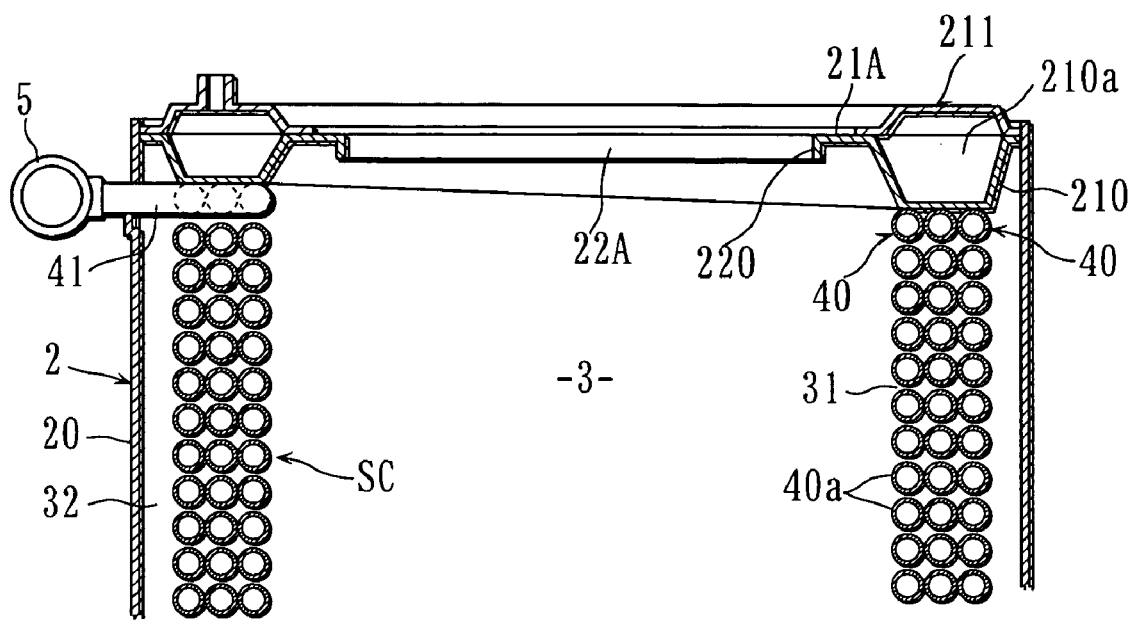
FIG. 81 is a sectional view showing a principal portion of another example of means for closing a gap above a tube lap winding structure in the present invention.

In the embodiment shown in FIG. 81, the cover 21A is formed with a downward projection 210 in which a recess 210a is defined. The upper end of the recess is closed by a ring-shaped auxiliary member 211, and water can flow through the recess. According to this embodiment, heat recovery from the combustion gas can be performed also by the water flowing through the recess 210a.

Figure 82:
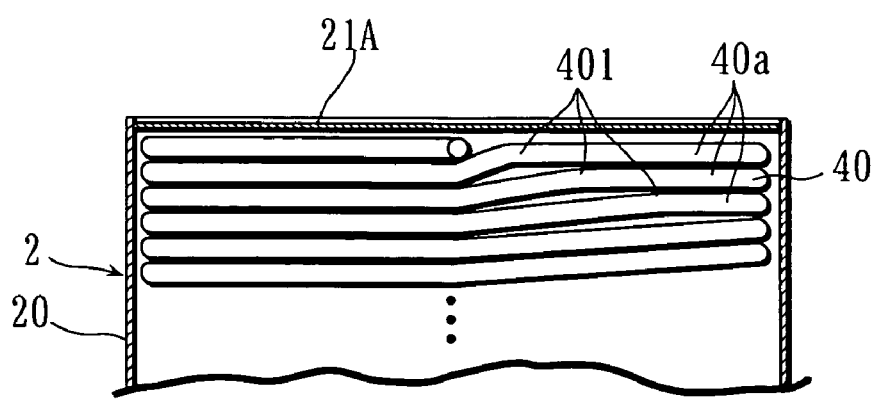
FIG. 82 is a sectional view showing a principal portion of another example of means for closing a gap above a tube lap winding structure in the present invention.

In the embodiment shown in FIG. 82, the upper end of each coiled tube 40 is horizontal. To make the upper end horizontal, a plurality of loops 40a close to the upper end of the coiled tube 40 are formed with bent portions 401. Since the upper end of the tube lap winding structure SC is flat in this embodiment, the upper end can be properly held in contact with the cover 21A so that a gap through which the combustion gas flows is not formed or the gap is very small even if formed.

Figure 83A:
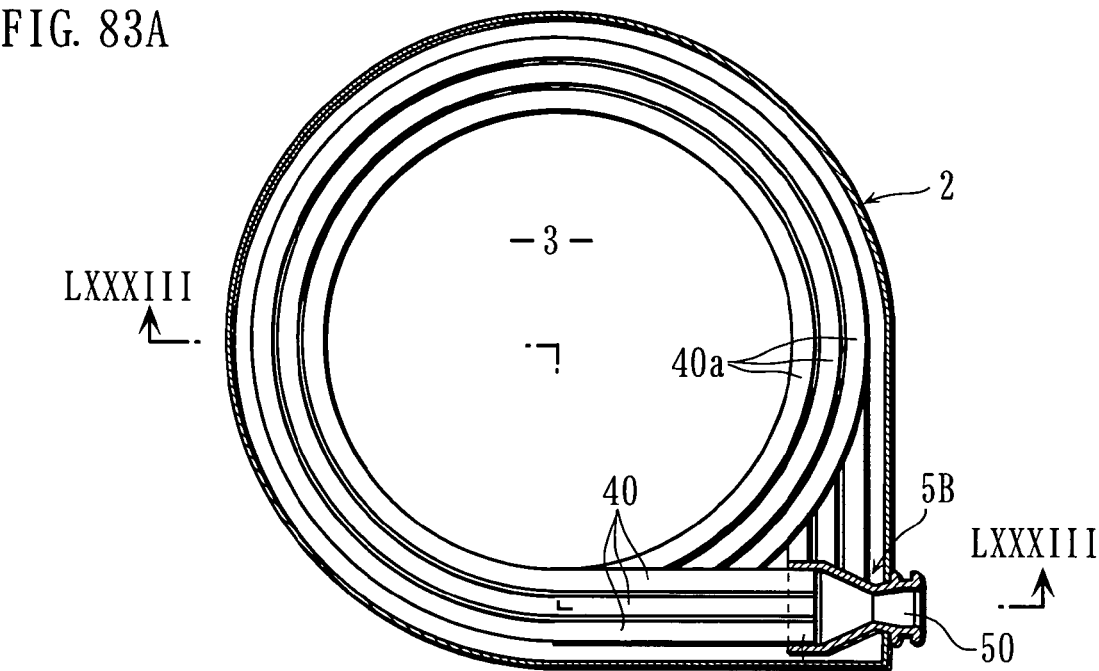
Figure 83B:
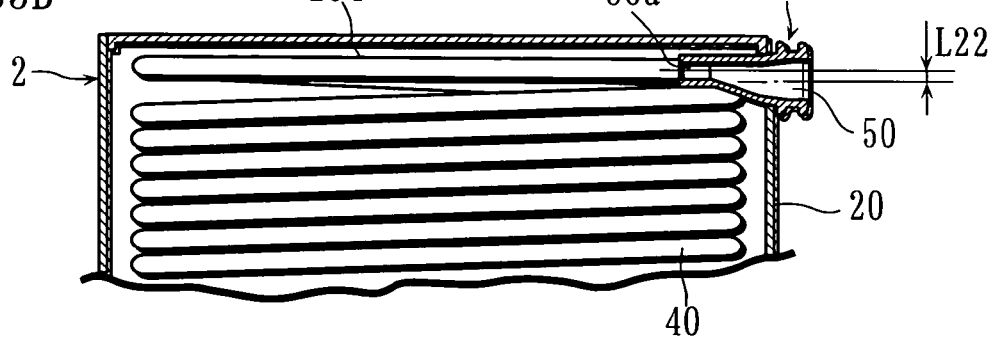
FIG. 83B is a sectional view taken along lines LXXXIII-LXXXIII in FIG. 83A.

In the embodiment shown in FIGS. 83, the circumferential wall 20 of the housing 2 is formed with an extension 203 extending outward. The upper ends of the plurality of coiled tubes 40 extend generally horizontally to reduce the gap 204 between the upper ends and the cover 21A, and the distal ends thereof project outward from the loops 40a into the extension 203. A header 5B is directly connected to the distal ends of the coiled tubes 40. The header 5B penetrates through the circumferential wall 20. In the header 5B, the connection port 50 for connecting a water inflow tube or a hot-water outflow tube is positionally deviated downward from the connection ports 50a for connecting the coiled tubes 40 by a distance L22.

In this embodiment, the plurality of coiled tubes 40 are directly connected to the header 5B collectively. Therefore, the structure is simple as compared with the above-described structure which uses a plurality of bent tubes 41. The portion of the header 5B which is exposed outside the housing 2 is deviated downward so as not to project upward from the housing 2, so that the header is not bulky. Though not illustrated, when a header 5B is connected also to the lower ends of the coiled tubes 40, the connection port 50 is deviated upward from the connection port 50a.

Figure 84:
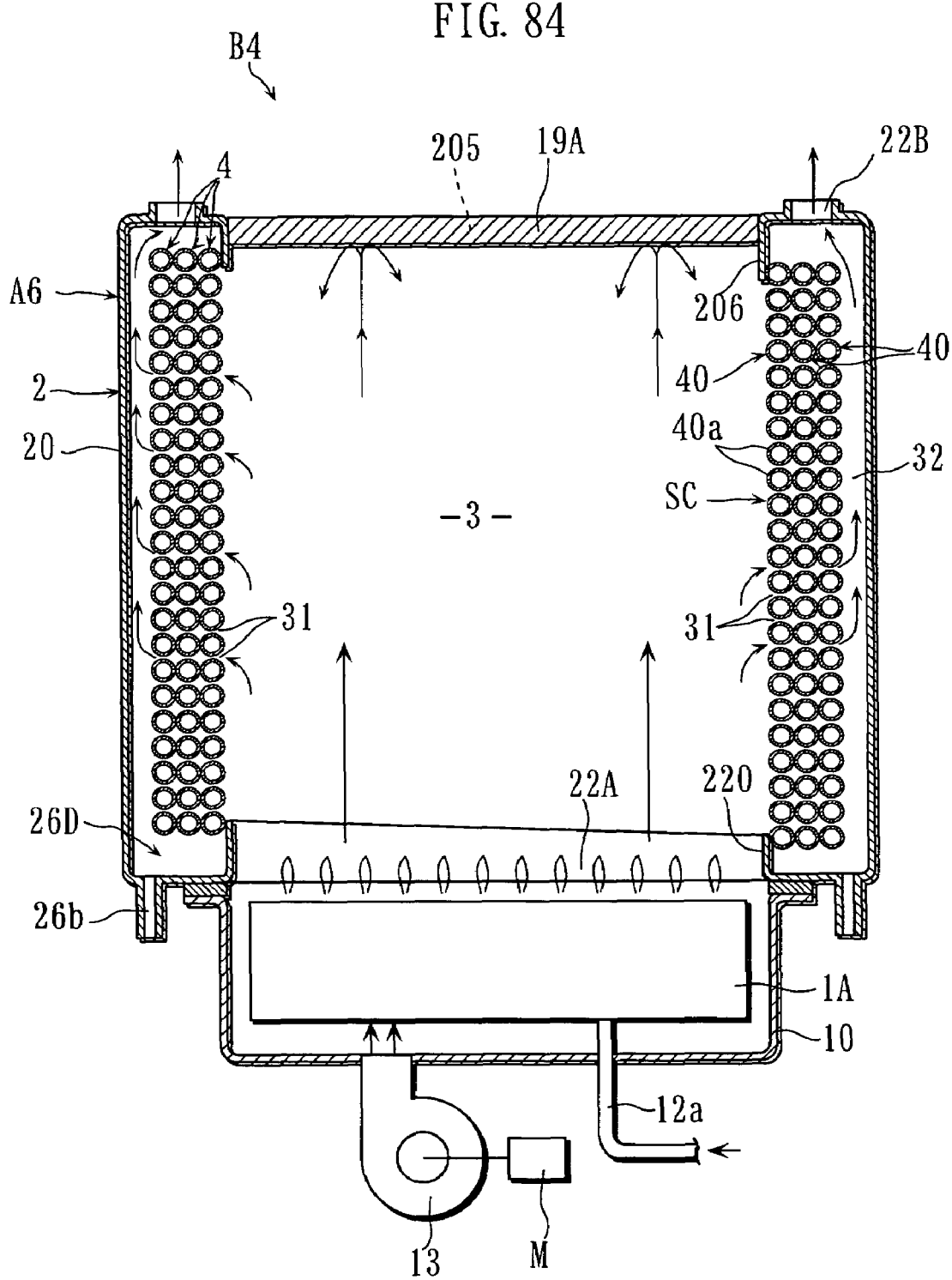
FIG. 84 is a schematic sectional view showing another example of water heater according to the present invention.
Figure 85:
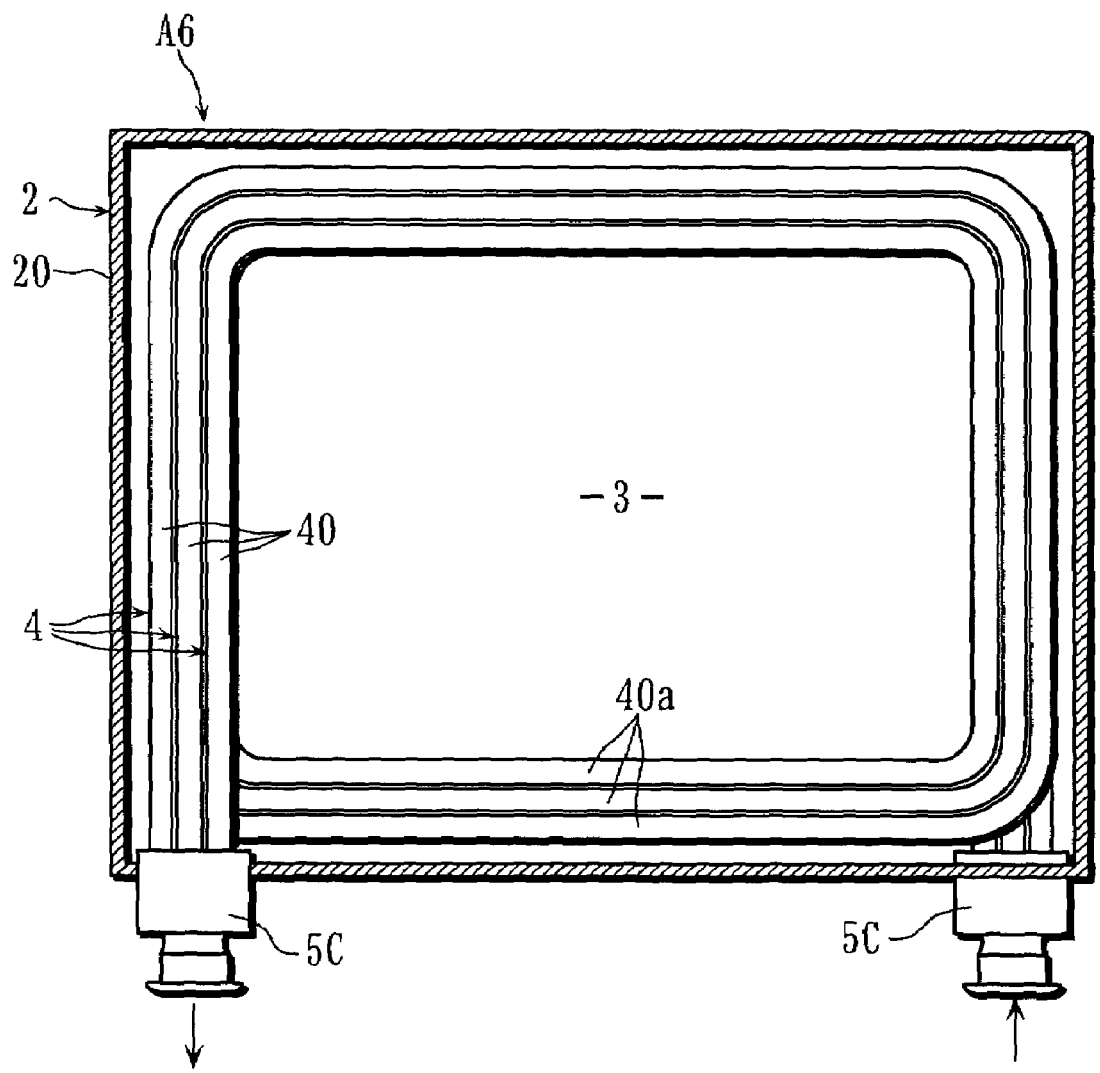
FIG. 85 is a schematic horizontal sectional view of the water heater shown in FIG. 84.

FIGS. 84 and 85 show an example of water heater which utilizes a forward-combustion burner. The water heater B4 shown in the figures includes a burner 1A and a heat exchanger A6. The burner 1 is a gas burner for upwardly burning fuel gas such as natural gas supplied through a gas supply pipe 12a. The burner is arranged in a housing 10 connected to the bottom of the heat exchanger A6. A fan 13 to supply air for combustion upward into the housing 10 is also provided.

The heat exchanger A6 includes a housing 2 formed with a burner opening 22A at the bottom thereof and directly above the burner 1A. A combustion gas outlet 22B in the form of a ring is formed at the top of the housing 2 and directly above a tube lap winding structure SC. The tube lap winding structure SC comprises a plurality of coiled tubes 40 arranged in a lap winding manner and may be designed in various ways like the foregoing embodiments. In this embodiment, however, as shown in FIG. 85, each of the coiled tubes 40 includes rectangular loops 40a helically connected to each other, and the circumferential wall 20 of the housing 2 is in the form of a hollow rectangular prism conforming to the loops. Though not illustrated in the figures, the fuel combustion portion of the burner 1A is rectangular in plan view, and the above-described structure is provided to correspond to this. Therefore, when the fuel combustion portion of the burner 1A is circular in plan view, the loops 40a and the circumferential wall 20 can be circular. Headers 5C, which are similar to the header 5B shown in FIG. 83, are connected to opposite ends of the coiled tubes 40.

As shown in FIG. 84, the upper end of the space 3 is closed by a partition 19A. For example, the partition 19A is bonded to the annular wall 206 surrounding the opening 205 at the upper end of the housing 2 so as to close the opening, whereby the partition is mounted to the housing 2. Though the partition 19A is illustrated as a simple flat plate in the figure, it is preferable that the surface which contacts the combustion gas is dented, similarly to the partition 19 used for the reverse-combustion burner. The annular wall 206 is held in contact with the inner circumferential surface of the innermost coiled tube 40 so that the combustion gas is prevented from directly flowing to the combustion gas outlet 22B by passing between the partition 19A and the innermost coiled tube 40. Similarly to the heat exchanger A2 shown in FIGS. 35-39, the annular wall 220 of the burner opening 22A is held in contact with the inner circumferential surface of the innermost coiled tube 40, and a drain receiving portion 26D is provided at the bottom of the housing 2.

In the water heater B4 of this embodiment, the combustion gas generated in the burner 1A flows upward through the burner opening 22A to enter the space 3. Then, the combustion gas passes through the clearances 31 of the tube lap winding structure SC to flow into the combustion gas path 32 and then flows upward through the combustion gas path 32 to be discharged out of the housing 2 through the combustion gas outlet 22B. When the combustion gas passes through the clearances 31 of the tube lap winding structure SC, the gas comes into contact with many loops 40a, whereby the heat exchange efficiency is enhanced. Further, similarly to the above-described water heater B2, the coiled tubes 40 on the inner side may be utilized for recovering sensible heat from the combustion gas, whereas the coiled tubes 40 on the outer side may be utilized for recovering latent heat. The drain generated accompanying the latent heat recovery flows downward along the helical gradient of the coiled tubes 40 to be received in the drain receiving portion 26D. Then, the drain is properly discharged out of the housing 2 through the discharge port 26b.

As will be understood from this embodiment, the advantages of the heat exchanger according to the present invention can be obtained also when the heat exchanger is used in combination with a forward-combustion burner instead of a reverse-combustion burner. Thus, the heat exchanger according to the present invention is effective regardless of the flow direction of the combustion gas.

FIGS. 86-89 show examples of structure of a heat exchanger with one housing and two water paths.

Figure 86:
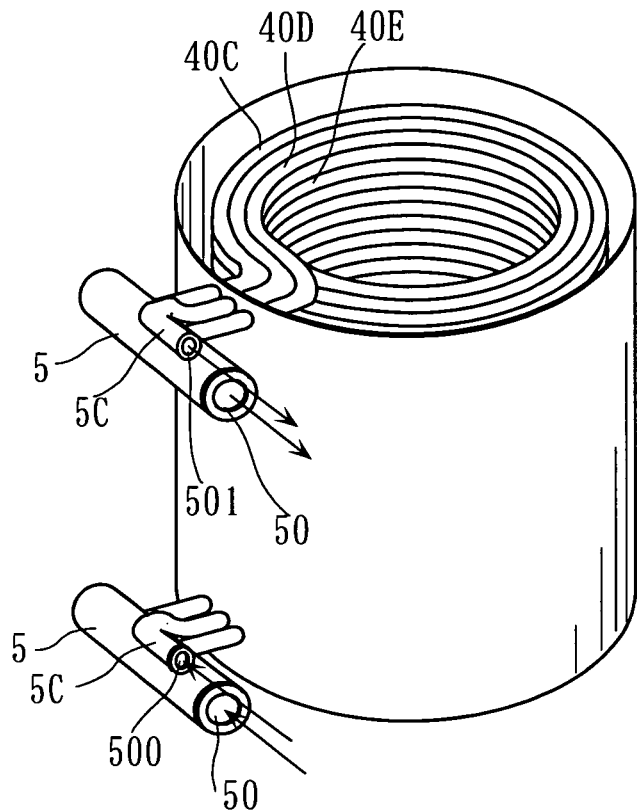
FIG. 86 is a perspective view part of which is omitted, showing another example of heat exchanger according to the present invention.

In the embodiment shown in FIG. 86, coiled tubes 40C, 40D and 40E are provided. The coiled tubes 40C and 40E are connected to a pair of water inflow header 5 and a hot-water outflow header 5. (The cover 21A is omitted in FIG. 86.) The coiled tube 40D is not connected to the headers 5, and the opposite ends thereof are connected to a pair of tube bodies 5C respectively including a water inlet 500 and a hot-water outlet 501. With this structure, the heat exchanger in this embodiment includes a first water flow path defined by the paired headers 5 and two coiled tubes 40C, 40E, and a second water flow path defined by the paired tube bodies 5C and the single coiled tube 40E, and water supply to the first and the second water flow paths can be performed individually. According to this embodiment, hot water can be supplied individually to a plurality of destinations. For example, the hot water produced by passing through the first water flow path may be supplied for general use at e.g. a kitchen or a wash basin, whereas the hot water produced by passing through the second water flow path may be supplied to a bath.

Figure 87:
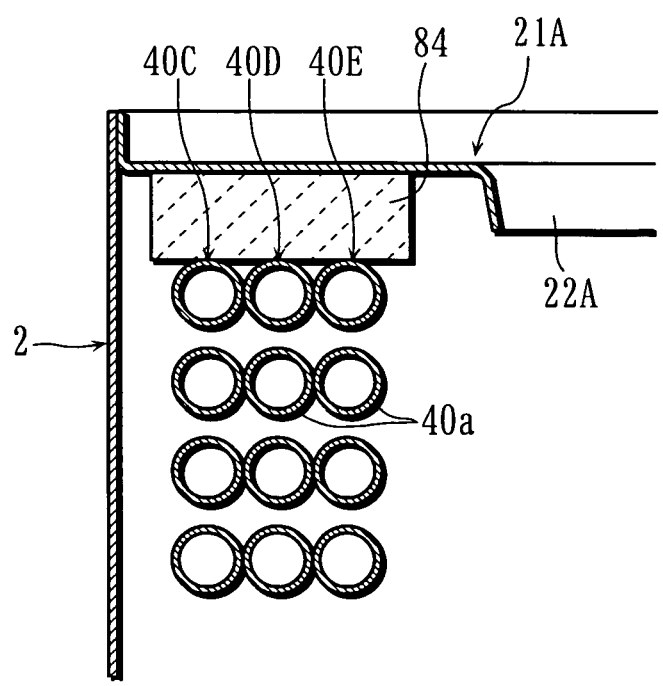
FIG. 87 is a sectional view showing a principal portion of the heat exchanger shown in FIG. 86.

Preferably, as shown in FIG. 87, the coiled tube 40D is sandwiched between the two coiled tubes 40C and 40E in contact with the two coiled tubes. With this structure, the water in each of the coiled tubes 40C-40E is prevented from boiling. Specifically, for example, when water flows only through the two coiled tubes 40C and 40E while being heated by the combustion gas to supply hot water to the kitchen, the water retained in the coiled tube 40D is also heated by the combustion gas. However, the heat which the coiled tube 40D receives can escape to the coiled tubes 40C and 40E, so that the boiling of the water in the coiled tube 40D is prevented.

Figure 88A:
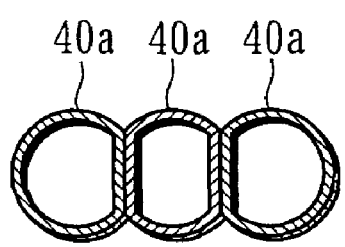
FIGS. 88A and 88B each is a sectional view showing an example of manner of bringing a plurality of coiled tubes into contact with each other.
Figure 88B:
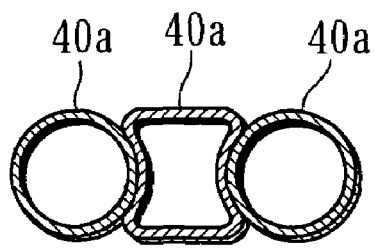

When the plurality of coiled tubes 40 are held in contact with each other, it is desirable that the contact area is as large as possible. For this purpose, the present invention can employ such structures as shown in FIGS. 88A and 88B, for example. In the structure shown in FIG. 88A, each loop 40a has a cross section which is generally circular but includes a flat surface, and the flat surfaces of adjacent loops are held in contact with each other. In the structure shown in FIG. 88B, the center loop 40a has a cross section whose opposite side surfaces include recesses, and the two loops 40a sandwiching the center loop are partially fitted in the recesses. These embodiments are advantageous for increasing the heat transfer area between the loops 40a and reliably preventing the water therein from boiling. As will be understood from these embodiments, the coiled tubes are not limited to those utilizing a round pipe, and pipes having various cross sections can be utilized.

Figure 89:
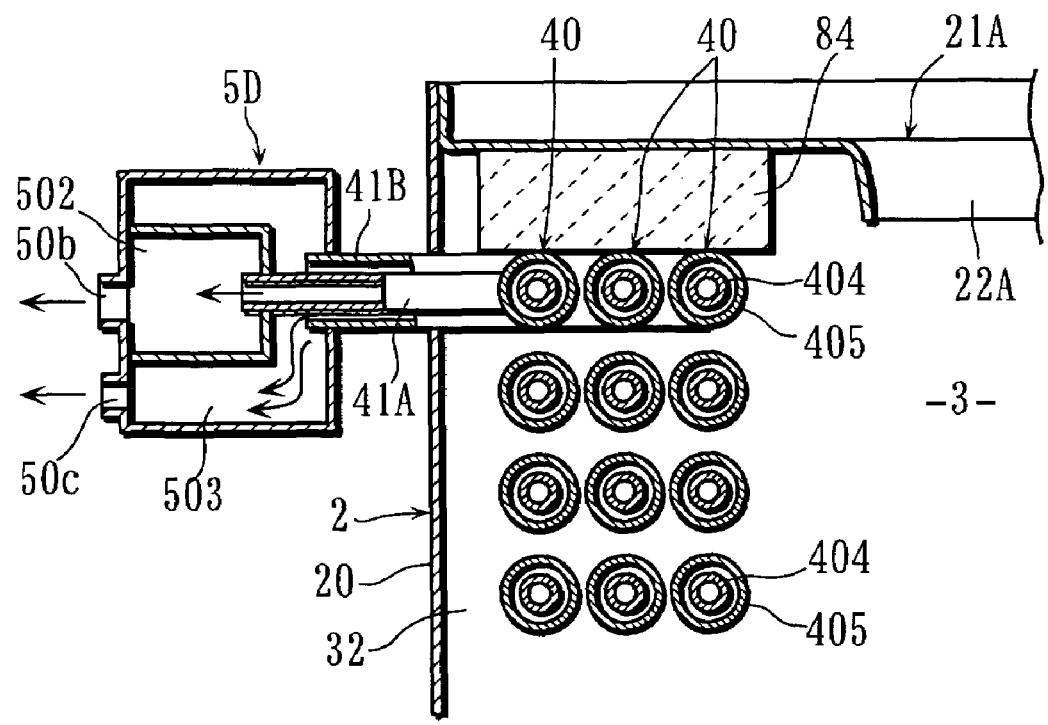
FIG. 89 is a sectional view showing a principal portion of another example of heat exchanger according to the present invention.

In the embodiment shown in FIG. 89, each of the coiled tubes 40 has a double-tube structure consisting of an inner tube 404 and an outer tube 405. To the ends of the coiled tubes 40, bent tubes 41A and 41B constituting a double-tube structure are connected. To the bent tubes 41A and 41B, a header 5D having a double-chamber structure consisting of two chambers 502 and 503 is connected. Specifically, each of the inner tubes 404 has an end connected to the bent tube 41A so that the inner tube communicates with the chamber 502 of the header 5D. Each of the outer tubes 405 has an end connected to the bent tube 41B so that the outer tube communicates with the chamber 503 of the header 5D. The chambers 502 and 503 are respectively formed with connection ports 50b and 50c for connecting a hot-water outflow pipe. Though only the structure of the hot-water outflow header is illustrated in FIG. 89, the water inflow header has the same structure as that of the hot-water outflow header.

According to this embodiment, the inner tube 404 of each of the coiled tubes 40 serves as a first water flow path, whereas the space between the inner tube 404 and the outer tube 405 serves as a second water flow path, and water flow in the first and the second water flow paths can be performed individually. Therefore, in this embodiment again, hot water can be supplied individually to a plurality of destinations. Further, heat can be transferred, via the inner tube 404, between the water in the inner tube 404 and the water in the space between the inner tube 404 and the outer tube 405. Therefore, even when the coiled tubes 40 are heated in the state in which the water flow in either one of the water flow paths is stopped, the water is prevented from boiling. This point is the same as the embodiment shown in FIGS. 29A and 29B. Although all of the coiled tubes have the double-tube structure in this embodiment, the heat exchanger with one housing and two water paths can be realized even when only part of the coiled tubes has the double-tube structure.

Figure 90:
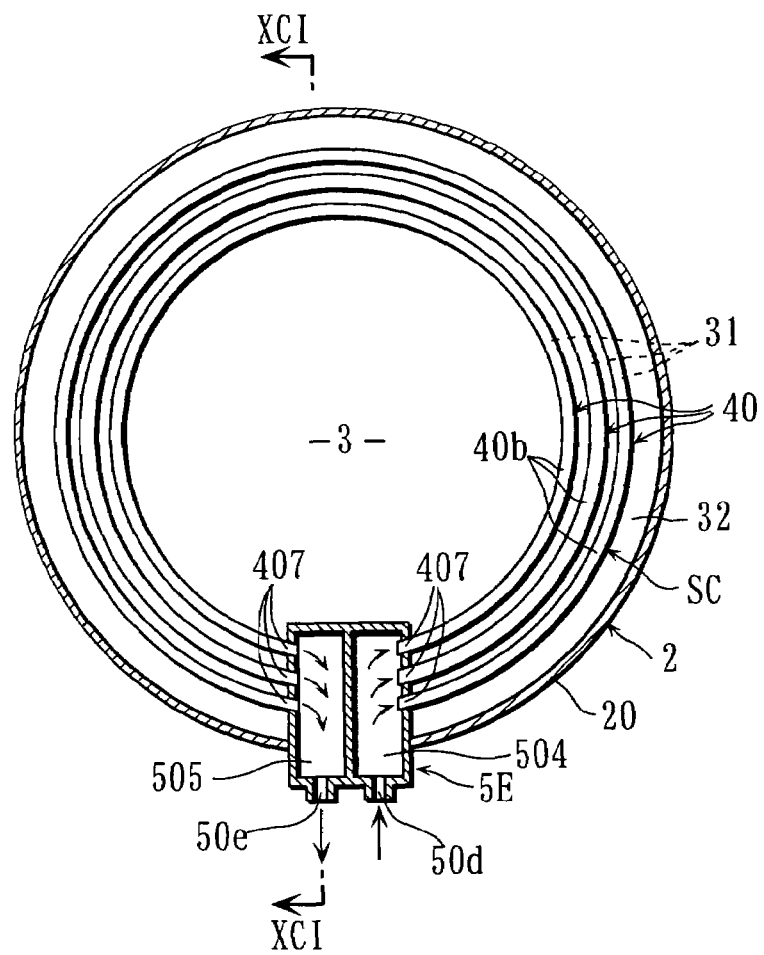
FIG. 90 is a horizontal sectional view showing a principal portion of another example of heat exchanger according to the present invention.
Figure 91:
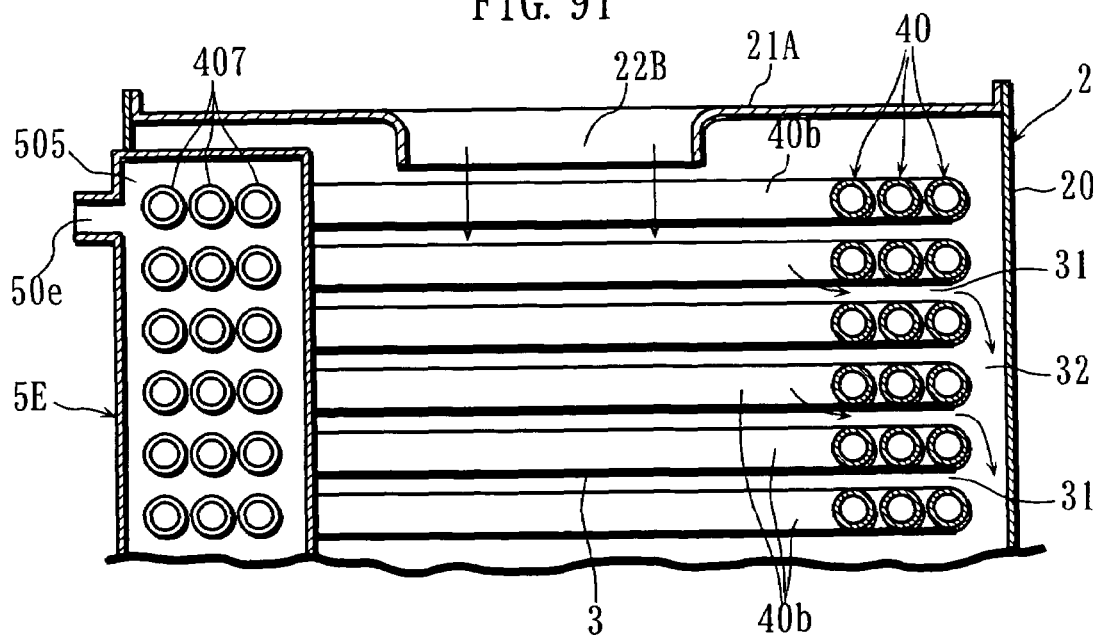
FIG. 91 is a sectional view taken along lines XCI-XCI in FIG. 90.

In the embodiments shown in FIGS. 90 and 91, the loops 40b of each coiled tube 40 are generally C-shaped. Opposite ends 407 of each of the loops 40b are connected to a header 5E. The header 5E includes a chamber 504 provided with a water inlet 50d and a chamber 505 provided with a hot-water outlet 50e and penetrates through the circumferential wall 20 of the housing 2 to be partially located in the housing and partially located out of the housing. The header 5E is elongated in the height direction of the housing 2. The opposite ends 407 of each loop 40b are connected to the chambers 504 and 505 so that water can flow through the loop. The plurality of loops 40b include those having different diameters which are arranged concentrically or generally concentrically in a lap winding manner so that loops are also arranged along the height direction via clearances 31. Thus, a tube lap winding structure SC is provided.

Also in this embodiment, when combustion gas is introduced into the space 3 surrounded by the tube lap winding structure SC, the combustion gas flows toward the combustion gas path 32 by passing through the clearances 31 of the tube lap winding structure SC. In this process, efficient heat exchange is performed between the loops 40b and the combustion gas. As will be understood from this embodiment, in the present invention, the coiled tubes can be provided by utilizing a plurality of generally C-shaped tubes instead of helical tubes. The "generally C-shape" in the present invention means a hollow shape part of which is cut away, and not only a circular shape partially cut away but also a rectangular shape partially cut away are included in the generally C-shape.

In the embodiment shown in FIG. 92, the partition 19 of the head exchanger A7 is arranged at a portion higher than the bottom opening of the space 3 to close that portion, so that the combustion gas existing in the region above the partition 19 is prevented from directly flowing to the region below the partition 19. This structure corresponds to the embodiment shown in FIG. 34.

In this embodiment, the partition 19 divides the space 3 into a first and a second regions 30a and 30b. Further, the tube lap winding structure SC is divided into a first heat exchanging portion HT1 and a second heat exchanging portion HT2 surrounding the first region 30a and the second region 30b, respectively. With this structure, the combustion gas generated by the burner 1 flows from the first region 30a of the space 3 into the combustion gas path 32 by passing through the clearances 31 of the first heat exchanging portion HT1 and then flows into the second region 30b by passing through the clearances 31 of the second heat exchanging portion HT2. Therefore, sensible heat can be recovered in the first heat exchanging portion HT1, whereas latent heat can be recovered in the second heat exchanging portion HT2. When the latent heat is recovered in the lower portion of the tube lap winding structure SC, drain is generated concentratedly in the lower portion, which is suitable for quickly and properly collecting drain.

The present invention is not limited to the foregoing embodiments. The specific structure of each portion of the heat exchanger and the water heater according to the present invention may be modified in various ways.

As the burner, various kinds of burner can be used as long as it generates combustion gas, and an oil burner or a gas burner may be used, for example. The water heater in the present invention means any apparatus having the function to produce hot water and includes various kinds of water heating apparatuses for supplying hot water for general use, for a bath, for space heating or for melting snow, and other apparatuses which produce hot water for the purposes other than hot water supply. Although it is preferable to make the housing and water tubes of the heat exchanger from stainless steel which has excellent corrosion resistance, the present invention is not limited thereto.

The invention claimed is:

1. A heat exchanger comprising:
 a housing including a cylindrical circumferential wall and axially opposite ends formed with a burner opening and a combustion gas outlet, respectively;
 a heat-exchange coiled tube including a plurality of loops arranged in the housing along the axial direction via a plurality of clearances;
 a space surrounded by the coiled tube and having one end communicating with the burner opening;
 a partition for preventing combustion gas supplied into the space from directly flowing through another end of the space and for causing the combustion gas to flow to the clearances; and
 a combustion gas path formed around the coiled tube and surrounded by the circumferential wall of the housing for guiding the combustion gas flowed thereto from the space by passing through the clearances to the combustion gas outlet;
 wherein the loops comprise a tube having a thickness in the axial direction and a width in a direction perpendicular to the axial direction, the width being larger than the thickness; and
 wherein one of the axially opposite ends of the housing is provided with a drain receiving portion for receiving drain when the drain is generated at the coiled tube;
 the drain receiving portion being in a form of a ring having a center portion formed with an opening corresponding to either one of the combustion gas outlet and the burner opening and positioned below the coiled tube and the combustion gas path.

2. The heat exchanger according to claim 1, wherein the loops comprise a flat tube.

3. The heat exchanger according to claim 1, further comprising a spacer for defining the clearances;
 wherein the spacer includes a base portion having a length in the axial direction, and a plurality of projections projecting from the base portion like teeth of a comb and interposed between the loops.

4. The heat exchanger according to claim 1, wherein each of the loops has an outer surface formed with a projection; and
 wherein adjacent loops in the axial direction are held in contact with each other via the projection to define each of the clearances.

5. The heat exchanger according to claim 1, wherein each of the loops has an outer surface formed with a recess; and
 wherein each of the clearances comprises a portion between recesses of adjacent loops in the axial direction.

6. The heat exchanger according to claim 1, further comprising an additional coiled tube including a plurality of loops held in contact with the loops of said coiled tube;
 wherein water inflow and hot-water outflow with respect to the plurality of coiled tubes are performed individually for enabling hot-water supply to a plurality of destinations.

7. The heat exchanger according to claim 6, wherein the plurality of coiled tubes overlap each other in either one of the axial direction and a direction perpendicular to the axial direction.

8. The heat exchanger according to claim 1, wherein the coiled tube has a double tube structure including an inner tube and an outer tube; and
 wherein water flow in the inner tube and water flow in a space between the inner tube and the outer tube are capable of being performed individually.

9. The heat exchanger according to claim 1, wherein the coiled tube is made of stainless steel.

10. A water heater comprising a burner and a heat exchanger for recovering heat from combustion gas generated by the burner,
 wherein the heat exchanger comprises:
 a housing including a cylindrical circumferential wall and axially opposite ends formed with a burner opening and a combustion gas outlet, respectively;
 a heat-exchange coiled tube including a plurality of loops arranged in the housing along the axial direction via a plurality of clearances;
 a space surrounded by the coiled tube and having one end communicating with the burner opening;
 a partition for preventing combustion gas supplied from the burner into the space from directly flowing through another end of the space and for causing the combustion gas to flow to the clearances; and a combustion gas path formed around the coiled tube and surrounded by the circumferential wall of the housing for guiding the combustion gas flowed thereto from the space by passing through the clearances to the combustion gas outlet;

wherein the loops comprise a tube having a thickness in the axial direction and a width in a direction perpendicular to the axial direction, the width being larger than the thickness; and wherein one of the axially opposite ends of the housing is provided with a drain receiving portion for receiving drain when the drain is generated at the coiled tube;

the drain receiving portion being in a form of a ring having a center portion formed with an opening corresponding to either one of the combustion gas outlet and the burner opening and positioned below the coiled tube and the combustion gas path.

11. A heat exchanger comprising:

a housing including a cylindrical circumferential wall and axially opposite ends formed with a burner opening and a combustion gas outlet, respectively;

a heat-exchange coiled tube including a plurality of loops arranged in the housing along the axial direction;

a space surrounded by the coiled tube and having one end communicating with the burner opening;

a partition for preventing combustion gas supplied into the space from directly flowing through another end of the space;

a combustion gas path formed around the coiled tube and surrounded by the circumferential wall of the housing for guiding the combustion gas flowed thereto to the combustion gas outlet;

at least one additional coiled tube which differs from said coiled tube in either one of diameter of the loops and width of the loops, the plurality of coiled tubes being arranged in a lap winding manner to form a tube lap winding structure in which the plurality of loops are arranged along the axial direction and along a direction perpendicular to the axial direction;

a plurality of clearances formed between the loops for passing combustion gas so that the combustion gas flows from the space to the combustion gas path by passing through the tube lap winding structure; and a drain receiving portion provided at one of the axially opposite ends of the housing for receiving drain when the drain is generated at the tube lap winding structure;

the drain receiving portion being in a form of a ring having a center portion formed with an opening corresponding to either one of the combustion gas outlet and the burner opening and positioned below the tube lap winding structure and the combustion gas path.

12. The heat exchanger according to claim 11, wherein each of the coiled tubes comprises a helical tube in which the plurality of loops are helically connected to each other.

13. The heat exchanger according to claim 11, wherein unheated water which has not passed through inner one of the coiled tubes is supplied to outer one of the coiled tubes.

14. The heat exchanger according to claim 11, further comprising a spacer for defining the clearances;

wherein the spacer includes a base portion having a length in the axial direction, and a plurality of projections projecting from the base portion like teeth of a comb and interposed between the loops.

15. The heat exchanger according to claim 11, wherein each of the loops has an outer surface formed with a projection; and wherein adjacent loops in the axial direction are held in contact with each other via the projection to define each of the clearances.

16. The heat exchanger according to claim 11, wherein each of the loops has an outer surface formed with a recess; and wherein each of the clearances comprises a portion between recesses of adjacent loops in the axial direction.

17. The heat exchanger according to claim 11, wherein each of the loops has an outer surface formed with at least one helical groove, and wherein part of the helical groove defines the clearance.

18. The heat exchanger according to claim 11, wherein dimension of the clearances is non-uniform so that dimension at a location close to the burner opening and dimension at a location away from the burner opening differ from each other.

19. The heat exchanger according to claim 11, wherein the plurality of coiled tubes are equal to each other in tube diameter of the loops, and the loops arranged along the direction perpendicular to the axial direction do not form a stepped portion in the axial direction.

20. The heat exchanger according to claim 11, wherein the loops arranged along the direction perpendicular to the axial direction form a stepped portion in the axial direction.

21. The heat exchanger according to claim 11, wherein the plurality of coiled tubes are unequal to each other in tube diameter, and the innermost coiled tube has largest tube diameter.

22. The heat exchanger according to claim 11, further comprising a water inflow header including a connection port for a water inflow tube and connected to one end of each of the plurality of coiled tubes so that water supplied to the connection port is distributed to the plurality of coiled tubes; and a hot-water outflow header including a connection port for a hot-water outflow tube and connected to another end of each of the plurality of coiled tubes so that hot water passed through the plurality of coiled tubes merges at the connection port.

23. The heat exchanger according to claim 22, wherein the hot-water outflow header is connected to one of the ends of each of the coiled tubes which is closer to the burner opening, whereas the water inflow header is connected to another one of the ends, and wherein water flow in the coiled tubes is performed from a portion away from the burner opening toward a portion close to the burner opening.

24. The heat exchanger according to claim 11, wherein the plurality of coiled tubes provide a plurality of water paths for individually performing water inflow and hot-water outflow to supply hot water produced by passing through the water paths to a plurality of destinations; and wherein the coiled tubes providing the plurality of water paths are held in contact with each other.

25. The heat exchanger according to claim 11, wherein each of the coiled tubes comprises a plurality of generally C-shaped tube portions arranged along the axial direction, and wherein at least one header for performing water flow with respect to the tube portions is connected to opposite ends of the tube portions.

26. A water heater comprising a burner and a heat exchanger for recovering heat from combustion gas generated by the burner, wherein the heat exchanger comprises:

a housing including a cylindrical circumferential wall and axially opposite ends formed with a burner opening and a combustion gas outlet, respectively;

a heat-exchange coiled tube including a plurality of loops arranged in the housing along the axial direction;

a space surrounded by the coiled tube and having one end communicating with the burner opening;

a partition for preventing combustion gas supplied from the burner into the space from directly flowing through another end of the space; and a combustion gas path formed around the coiled tube and surrounded by the circumferential wall of the housing for guiding the combustion gas flowed thereto to the combustion gas outlet;

wherein the water heater further comprises:

at least one additional coiled tube which differs from said coiled tube in either one of diameter of the loops and width of the loops, the plurality of coiled tubes being arranged in a lap winding manner to form a tube lap winding structure in which the plurality of loops are arranged along the axial direction and along a direction perpendicular to the axial direction;

a plurality of clearances formed between the loops for passing combustion gas so that the combustion gas flows from the space to the combustion gas path by passing through the tube lap winding structure; and a drain receiving portion provided at one of the axially opposite ends of the housing for receiving drain when the drain is generated at the tube lap winding structure;

the drain receiving portion being in a form of a ring having a center portion formed with an opening corresponding to either one of the combustion gas outlet and the burner opening and positioned below the tube lap winding structure and the combustion gas path.

27. The water heater according to claim 26, wherein the heat exchanger is so oriented that the burner opening is positioned higher than the combustion gas outlet; and wherein the burner is connected to an upper portion of the heat exchanger and burns fuel downward.

28. The water heater according to claim 27, wherein each of the loops is circular, and the circumferential wall of the housing is generally cylindrical to surround the loops.

29. The water heater according to claim 26, wherein the heat exchanger is so oriented that the burner opening is positioned lower than the combustion gas outlet; and wherein the burner is connected to a lower portion of the heat exchanger and burns fuel upward.

30. The water heater according to claim 29, wherein each of the loops is rectangular, and the circumferential wall of the housing is in a form of a rectangular cylinder to surround the loops.

* * * * *